US010927491B2

(12) United States Patent
Miyake et al.

(10) Patent No.: US 10,927,491 B2
(45) Date of Patent: Feb. 23, 2021

(54) MOTOR AND METHOD OF CONTROLLING MOTOR, WASHING MACHINE HAVING MOTOR

(71) Applicant: Samsung Electronics Co., Ltd, Gyeonggi-do (KR)

(72) Inventors: Hiroyuki Miyake, Kanagawa (JP); Hidekazu Funakoshi, Kanagawa (JP); Hiroshi Katsumoto, Kanagawa (JP); Kenji Kitajima, Kanagawa (JP); Masaki Oshige, Kanagawa (JP); Nakagawa Yukinori, Kanagawa (JP); Tomonori Ueno, Kanagawa (JP); Yasumasa Nagasaki, Kanagawa (JP); Yasuyuki Sonoda, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 15/881,584

(22) Filed: Jan. 26, 2018

(65) Prior Publication Data
US 2019/0032266 A1    Jan. 31, 2019

(30) Foreign Application Priority Data

Jul. 27, 2017  (JP) .............................. JP2017-145867
Dec. 27, 2017  (KR) ........................ 10-2017-0181055

(51) Int. Cl.
*B65H 77/00*       (2006.01)
*H02P 1/54*        (2006.01)
(Continued)

(52) U.S. Cl.
CPC ........... *D06F 37/306* (2013.01); *H02K 1/165* (2013.01); *H02K 1/2753* (2013.01); *H02K 7/14* (2013.01);
(Continued)

(58) Field of Classification Search
CPC ................................ H02K 11/215; H02P 6/30
(Continued)

(56) References Cited

U.S. PATENT DOCUMENTS

| 2001/0008354 A1 | 7/2001 | Minagawa |
| 2006/0042022 A1 | 3/2006 | Kim et al. |

(Continued)

FOREIGN PATENT DOCUMENTS

| CN | 105656271 A | 6/2016 |
| EP | 2360814 A1 | 8/2011 |

(Continued)

OTHER PUBLICATIONS

ISA/KR, "International Search Report," Application No. PCT/KR2018/001046, dated May 21, 2018, 3 pages.
(Continued)

*Primary Examiner* — Erick D Glass

(57) ABSTRACT

A motor has a two rotors which are independently operated using a single inverter and without being supplied with a complex current. Further the motor is capable of shifting a rotation direction of each of two rotors by performing a magnetizing operation one time and reversing polarities of the shifting magnets when a mode of the motor is shifted from a synchronous mode in which the first rotor and the second rotor rotate in the same direction to a counter mode in which the first rotor and the second rotor rotate in opposite directions, and shifting the mode of the motor to the counter mode while the magnetizing operation is performed one time times and relative positions of the first rotor and the second rotor are changed when the first rotor and the second rotor inertially rotate in the synchronous mode.

9 Claims, 40 Drawing Sheets

(51) Int. Cl.
| | |
|---|---|
| *D06F 37/30* | (2020.01) |
| *H02K 21/12* | (2006.01) |
| *H02K 7/14* | (2006.01) |
| *H02P 6/08* | (2016.01) |
| *H02K 11/215* | (2016.01) |
| *H02P 6/30* | (2016.01) |
| *H02K 1/16* | (2006.01) |
| *H02K 1/27* | (2006.01) |
| *H02K 16/02* | (2006.01) |
| *H02K 21/16* | (2006.01) |
| *H02K 21/22* | (2006.01) |
| *D06F 37/40* | (2006.01) |
| *D06F 33/00* | (2020.01) |

(52) U.S. Cl.
CPC .......... *H02K 11/215* (2016.01); *H02K 16/02* (2013.01); *H02K 21/12* (2013.01); *H02P 6/08* (2013.01); *H02P 6/30* (2016.02); *D06F 33/00* (2013.01); *D06F 37/40* (2013.01); *D06F 2204/065* (2013.01); *D06F 2204/10* (2013.01); *H02K 1/278* (2013.01); *H02K 1/2773* (2013.01); *H02K 1/2786* (2013.01); *H02K 21/16* (2013.01); *H02K 21/22* (2013.01); *H02K 2213/03* (2013.01)

(58) Field of Classification Search
USPC ............................................................ 318/7
See application file for complete search history.

(56) References Cited

U.S. PATENT DOCUMENTS

| | | | |
|---|---|---|---|
| 2012/0286616 A1 | 11/2012 | Li et al. | |
| 2013/0200744 A1* | 8/2013 | Miyamura | H02K 3/04 310/210 |
| 2013/0234540 A1* | 9/2013 | Tsutsui | H02P 6/08 310/44 |
| 2014/0049124 A1 | 2/2014 | Gandhi et al. | |
| 2018/0212484 A1* | 7/2018 | Umeda | H02K 1/27 |
| 2019/0222151 A1* | 7/2019 | Ohashi | H02P 8/12 |

FOREIGN PATENT DOCUMENTS

| | | |
|---|---|---|
| JP | H11275826 A | 10/1999 |
| KR | 10-2017-0012016 A | 2/2017 |

OTHER PUBLICATIONS

Supplementary European Search Report dated Jun. 30, 2020 in connection with European Patent Application No. 18 83 8709, 10 pages.

* cited by examiner

MOTOR AND METHOD OF CONTROLLING MOTOR, WASHING MACHINE HAVING MOTOR

CROSS-REFERENCE TO RELATED APPLICATION

This application is based on and claims priority under 35 U.S.C. § 119 to Japanese Patent Application No. 2017-145867 filed on Jul. 27, 2017 and Korean Patent Application No. 10-2017-0181055 filed on Dec. 27, 2017, the contents of which are incorporated by reference herein in its entirety.

TECHNICAL FIELD

Embodiments of the present disclosure relate to a motor and a washing machine having the motor, and more particularly, to a dual rotor motor having two rotors and a washing machine having the dual rotor motor.

BACKGROUND

A dual rotor motor is a rotary electric device in which two rotors and a single stator are coaxially disposed in a three-layer structure and a common coil configured to generate a rotating magnetic field for each of the two rotors is formed in the stator (for example, see Patent Document 1 (Japanese Patent Registration No. 3480300).

In Patent Document 1, a case in which a complex current, in which currents respectively corresponding to the two rotors are combined, is flowed to the common coil formed in the stator such that the two rotors are independently operated is disclosed.

A conventional dual rotor motor has problems in that a structure of an inverter for flowing a complex current is complicated, a size of the dual rotor motor is large, and a cost thereof is expensive. Also, there is a problem in that efficiency of the motor is low because the balance of torque is used to prevent a current at any one side of the complex current from affecting torque at the other side.

SUMMARY

Therefore, it is an aspect of certain embodiments of the present disclosure to provide a motor in which a structure is simple and two rotors are independently operated using a single inverter without being supplied with a complex current.

It is another aspect of certain embodiments of the present disclosure to provide a dual rotor motor capable of shifting a rotation direction of each of two rotors.

Additional aspects of the disclosure will be set forth in part in the description which follows and, in part, will be obvious from the description, or may be learned by practice of the disclosure.

In accordance with one aspect of certain embodiments of the present disclosure, a method of controlling a motor, which includes a stator, a first rotor and a second rotor disposed around the stator and independently rotatable, a plurality of shifting magnets disposed in at least one of the first rotor and the second rotor and whose magnetic poles are reversed by a magnetizing current, and a number-of-magnetic-poles shifter configured to receive the magnetizing current, reverse the magnetic poles of the shifting magnets, and shift the number of magnetic poles of at least one of the first rotor and the second rotor, includes performing a magnetizing operation one time and reversing polarities of the shifting magnets when a mode of the motor is shifted from a synchronous mode in which the first rotor and the second rotor rotate in the same direction to a counter mode in which the first rotor and the second rotor rotate in opposite directions, and shifting the mode of the motor to the counter mode while the magnetizing operation is performed one or more times and relative positions of the first rotor and the second rotor are changed when the first rotor and the second rotor inertially rotate in the synchronous mode.

According to certain embodiments of the above-described method of controlling the motor, the magnetizing operation performed one time may include repeating a partial magnetization process, in which the magnetizing current is supplied to a portion of the shifting magnets, for several times.

According to certain embodiments of the above-described method of controlling the motor, the partial magnetization process may begin from an end at any one side in a circumferential direction of the shifting magnets.

According to some embodiments of the above-described method of controlling the motor, the partial magnetization process may include a long magnetization process in which a length of time during which the magnetizing current is supplied is long and a short magnetization process in which a length of time during which the magnetizing current is supplied is short, and in the shifting magnets, the long magnetization process may be performed at a position closer to a central portion in the circumferential direction of the shifting magnets in comparison to the short magnetization process.

According to certain embodiments of the above-described method of controlling the motor, the long magnetization process may be performed when the number of simultaneous rotations of a rotor corresponding to magnetization, which is subject to the magnetizing operation, of the first rotor and the second rotor exceeds a predetermined number of rotations.

According to some embodiments of the above-described method of controlling the motor, the short magnetization process may be repeatedly performed when the number of simultaneous rotation of a rotor corresponding to magnetization, which is subject to the magnetizing operation, of the first rotor and the second rotor is equal to or less than the predetermined number of rotations.

According to certain embodiments of the above-described method of controlling the motor, the partial magnetization process may include a strong magnetization process in which the magnetizing current is relatively large and a weak magnetization process in which the magnetizing current is relatively small, and in the shifting magnets, the weak magnetization process may be performed at a position closer to an end in the circumferential direction of the shifting magnets in comparison to the strong magnetization process.

According to certain embodiments of the above-described method of controlling the motor, by an initial phase of a rotor corresponding to magnetization, which is subject to the magnetizing operation, of the first rotor and the second rotor being set as an initial value and a movement amount of the shifting magnets being calculated, the magnetizing operation may be performed while a current-carrying phase of the magnetizing current is shifted in accordance with movement of the rotor corresponding to magnetization.

According to certain embodiments of the above-described method of controlling the motor, the rotor corresponding to magnetization, which is subject to the magnetizing operation, of the first rotor and the second rotor may include a plurality of fixing magnets whose magnetic poles are not reversed when the magnetizing current is supplied, and the shifting magnets and the fixing magnets may be differentiated by reduction in magnetic force of the shifting magnets being detected when the shifting magnets are magnetized so that a magnetic force thereof is temporarily reduced.

According to certain embodiments of the present disclosure, a motor includes a stator, a first rotor and a second rotor disposed around the stator and independently rotatable, a plurality of shifting magnets disposed in at least one of the first rotor and the second rotor and whose magnetic poles are reversed by a magnetizing current, and a number-of-magnetic-poles shifter configured to receive the magnetizing current, reverse the magnetic poles of the shifting magnets, and shift the number of magnetic poles of at least one of the first rotor and the second rotor, wherein a magnetizing operation is performed one time and polarities of the shifting magnets are reversed when a mode of the motor is shifted from a synchronous mode in which the first rotor and the second rotor rotate in the same direction to a counter mode in which the first rotor and the second rotor rotate in opposite directions, and the mode of the motor is shifted to the counter mode while the magnetizing operation is performed one time, and relative positions of the first rotor and the second rotor are changed when the first rotor and the second rotor inertially rotate in the synchronous mode.

According to certain embodiments of the above-described motor, the stator may include a plurality of teeth corresponding to magnetization opposing a rotor corresponding to magnetization, which is subject to the magnetizing operation, of the first rotor and the second rotor in a diametrical direction, and a circumferential length of the shifting magnets may be larger than a pitch of each of the plurality of teeth corresponding to magnetization.

According to certain embodiments of the above-described motor, the rotor corresponding to magnetization, which is subject to the magnetizing operation, of the first rotor and the second rotor may include a plurality of fixing magnets whose magnetic poles are not reversed when the magnetizing current is supplied, and a magnet discriminator configured to discriminate the shifting magnets and the fixing magnets.

According to some embodiments of the above-described motor, the magnet discriminator may include a position sensor disposed opposite the shifting magnets, and a portion of the shifting magnets opposing the position sensor may be differentiated from a portion of the fixing magnets opposing the position sensor.

According to some embodiments of the above-described motor, the magnet discriminator may differentiate the shifting magnets and the fixing magnets by detecting reduction in magnetic force of the shifting magnets when the shifting magnets are magnetized so that the magnetic force thereof is temporarily reduced.

According to some embodiments of the above-described motor, the magnet discriminator may include a magnetic sensor disposed opposite the shifting magnets, and a shape of a portion of the shifting magnets opposing the magnetic sensor may be differentiated from a shape of a portion of the fixing magnets opposing the magnetic sensor.

According to certain embodiments of the above-described motor, the magnet discriminator may include a magnetic sensor disposed opposite the shifting magnets, and a magnetization state of a portion of the shifting magnets opposing the magnetic sensor may be differentiated from a magnetization state of a portion of the fixing magnets opposing the magnetic sensor.

According to some embodiments of the above-described motor, the number-of-magnetic-poles shifter may be teeth disposed at the stator and have coils wound therearound, and the number of windings of coils wound around one end of the teeth toward the rotor having the shifting magnets may be larger than the number of windings of coils wound around the other end of the teeth.

According to certain embodiments of the above-described motor, the number-of-magnetic-poles shifter may be teeth disposed at the stator and have coils wound therearound, and the teeth may include a fine width portion so that a width of one end of the teeth toward the rotor having the shifting magnets may be thinner than a width of the other end of the teeth.

According to certain embodiments of the above-described motor, the number-of-magnetic-poles shifter may be teeth disposed at the stator and having coils wound therearound, and one end of the teeth toward the rotor having the shifting magnets may be smaller than the other end of the teeth.

According to certain embodiments of the present disclosure, a washing machine includes a motor and a controller, wherein the motor includes a stator, a first rotor and a second rotor disposed around the stator and independently rotatable, and a plurality of shifting magnets disposed in at least one of the first rotor and the second rotor and whose magnetic poles are reversed by a magnetizing current, and the controller is configured to apply the magnetizing current and reverses the magnetic poles of the shifting magnets to shift the number of magnetic poles of at least one of the first rotor and the second rotor, performs a magnetizing operation one time and reverses polarities of the shifting magnets when a mode of the motor is shifted from a synchronous mode in which the first rotor and the second rotor rotate in the same direction to a counter mode in which the first rotor and the second rotor rotate in opposite directions, controls the motor so that the mode of the motor is shifted to the counter mode while the magnetizing operation is performed one or more times and relative positions of the first rotor and the second rotor are changed when the first rotor and the second rotor rotate in the synchronous mode, and performs a washing process in the counter mode and performs a spin-dry process in the synchronous mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 40, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments according to the present disclosure will be described with reference to the accompanying drawings. Embodiments as described below are merely illustrative and are not intended to limit the present disclosure, applications thereof, or uses thereof.

Figure 1:
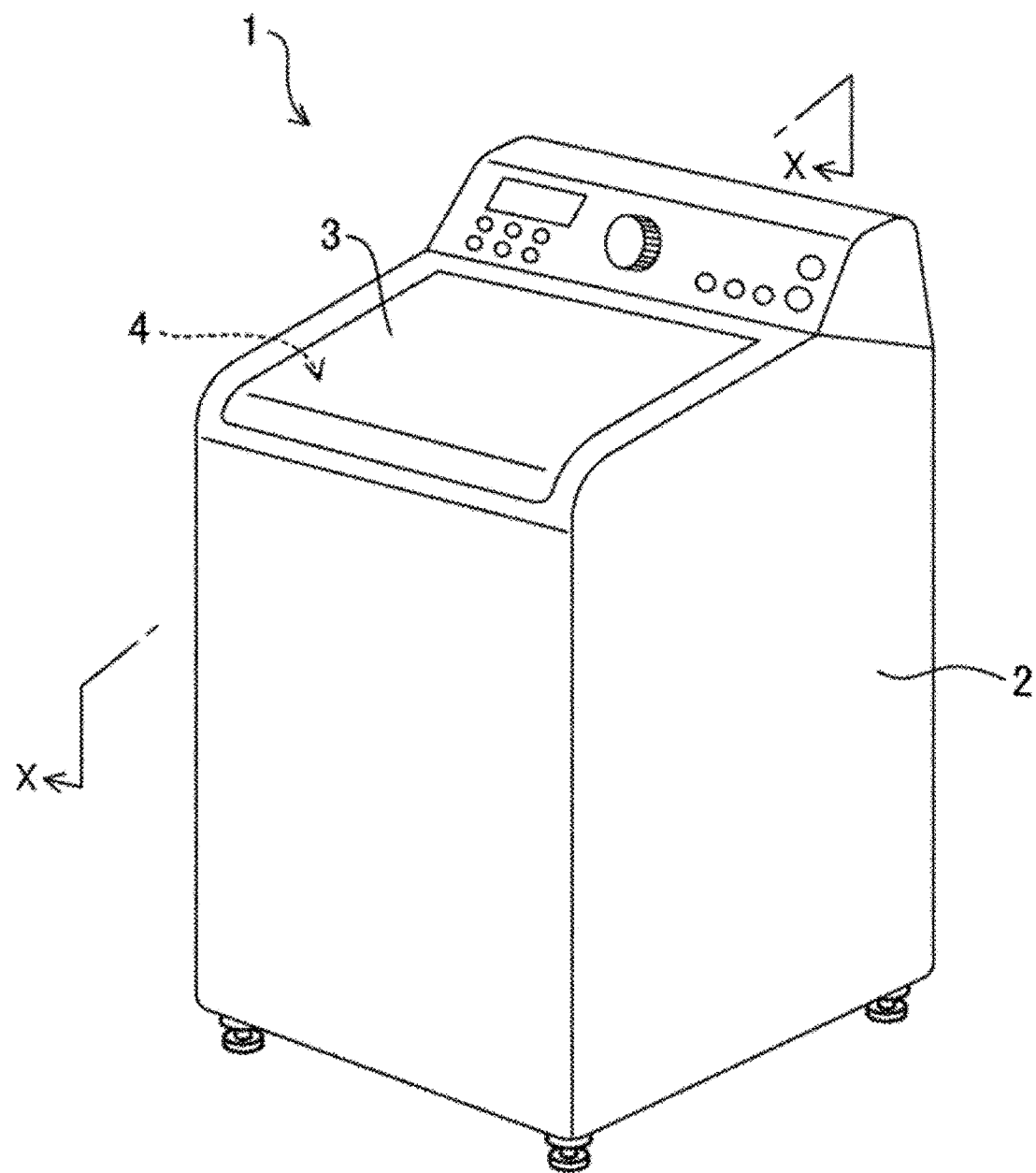
FIG. 1 illustrates a washing machine according to certain embodiments of the present disclosure.

FIG. 1 illustrates a washing machine according to some embodiments of the present disclosure. A washing machine 1 illustrated in FIG. 1 is a fully-automatic washing machine in which processes such as washing, rinsing, and spin-drying are performed by automatic control. According to some embodiments, washing machine 1 has a housing 2 formed in the shape of a rectangular box which is vertically long, and an inlet 4 opened and closed by a cover 3 is formed above the housing 2. Laundry is put in and taken out through the inlet 4 (so-called vertical type washing machine). A display unit or various switches that may be manipulated by a user are installed behind the inlet 4.

Figure 2:
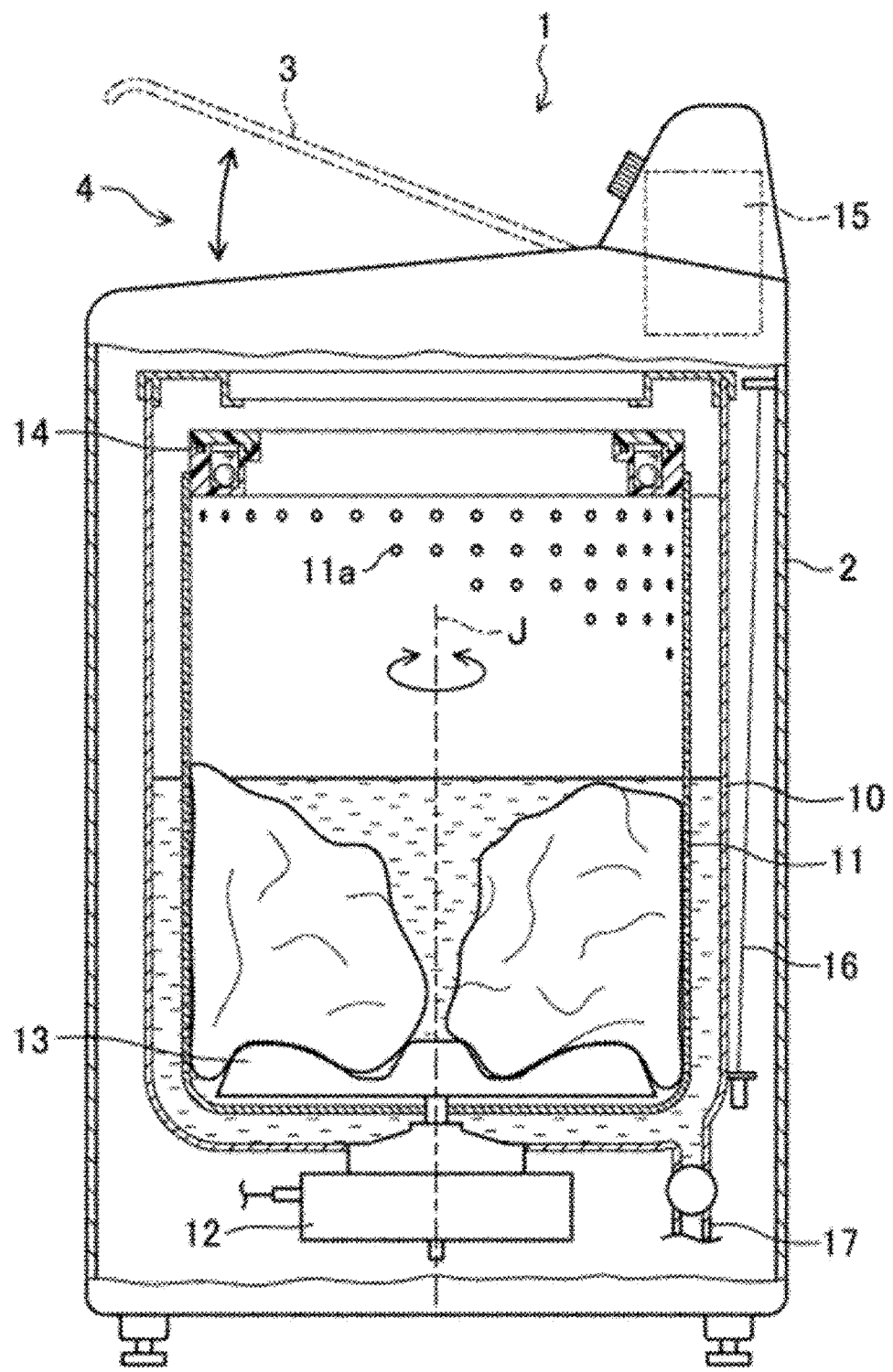
FIG. 2 illustrates a cross-sectional view of the washing machine of FIG. 1 taken along line X-X.

FIG. 2 illustrates a cross-sectional view of a washing machine according to some embodiments of the present disclosure and as illustrated in FIG. 1 taken along line X-X. As illustrated in FIG. 2, a laundry tub 10, a spin-dry tub 11, a motor 12, a pulsator 13 (an example of a stirring member), a balancer 14, a control device 15, and the like are installed inside the housing 2. Particularly, in the washing machine 1, because a technology according to some embodiments of the present disclosure embodied in motor 12, the size of the washing machine 1 may be reduced, and optimal performance may be exhibited for each of the processes of the washing machine 1.

According to some embodiments, the laundry tub 10 is a cylindrical container having a bottom and capable of storing water. The laundry tub 10 is suspended in the housing 2 by a plurality of suspension members 16 while an opening of the laundry tub 10 faces the inlet 4 above. Water may be fed through a water feeding mechanism (not illustrated) in the laundry tub 10. A drain pipe 17 whose opening and closing is controlled by a valve is connected to a lower portion of the laundry tub 10, and unwanted water is drained through the drain pipe 17 to the outside of the washing machine 1.

In the non-limiting example of FIG. 2, the spin-dry tub 11 is a cylindrical container having a smaller size than that of the laundry tub 10, having a bottom, and configured to accommodate laundry. The spin-dry tub 11 is accommodated in the laundry tub 10 while an opening of the spin-dry tub 11 is rotatable about a longitudinal axis J extending in a vertical direction toward the inlet 4. All of the processes for laundry are performed in the spin-dry tub 11. A plurality of drain holes 11a are formed throughout the entire surface of a cylindrical peripheral wall of the spin-dry tub 11 (only some of the drain holes 11a are illustrated in FIG. 2).

In the non-limiting example of FIG. 2, the balancer 14 is installed at the opening of the spin-dry tub 11. The balancer 14 is a ring-shaped member in which a plurality of balls or a viscous fluid is accommodated, and is configured to adjust imbalance of weight that occurs due to laundry being leaned toward one side when the spin-dry tub 11 rotates. The pulsator 13, formed in a disc shape and having a stirring blade at an upper surface thereof, is installed to be rotatable, at a lower portion of the spin-dry tub 11.

According to certain embodiments, the control device 15 (constituting a controller) includes hardware such as a central processing unit (CPU) or a read-only memory (ROM) and software such as a control program and controls an overall operation of the washing machine 1. The control device 15 is electrically connected to the various switches, the motor 12, or the like, and the control program performs each of the processes including washing, rinsing, and spin-drying according to a user's instruction.

In the non-limiting example of FIG. 2, control device 15 controls an operation of the motor 12. For example, in the washing process, the motor 12 rotates the pulsator 13 and the spin-dry tub 11 while reversing the pulsator 13 and the spin-dry tub 11 at a predetermined cycle, and stirs laundry along with water or detergent. In the spin-drying process, the motor 12 synchronizes the pulsator 13 and the spin-dry tub 11, rotates the pulsator 13 and the spin-dry tub 11 at a high speed in a predetermined direction, presses laundry toward the peripheral wall of the spin-dry tub 11 by the action of a centrifugal force, and spin-dries the laundry.

In the non-limiting example of FIG. 2, the control device 15 also controls a magnetization process of the motor 12. That is, the control device 15 performs control such as shifting magnetic poles (S-pole and N-pole) of magnets installed in the motor 12, or increasing and decreasing a magnetic force of the magnets.

<Motor>

In the non-limiting example of FIG. 2, motor 12 has an exterior having a flat cylindrical shape whose diameter is smaller than that of the laundry tub 10. The motor 12 is attached to a lower side of the laundry tub 10 such that the longitudinal axis J passes through the center of the motor 12.

Figure 3:
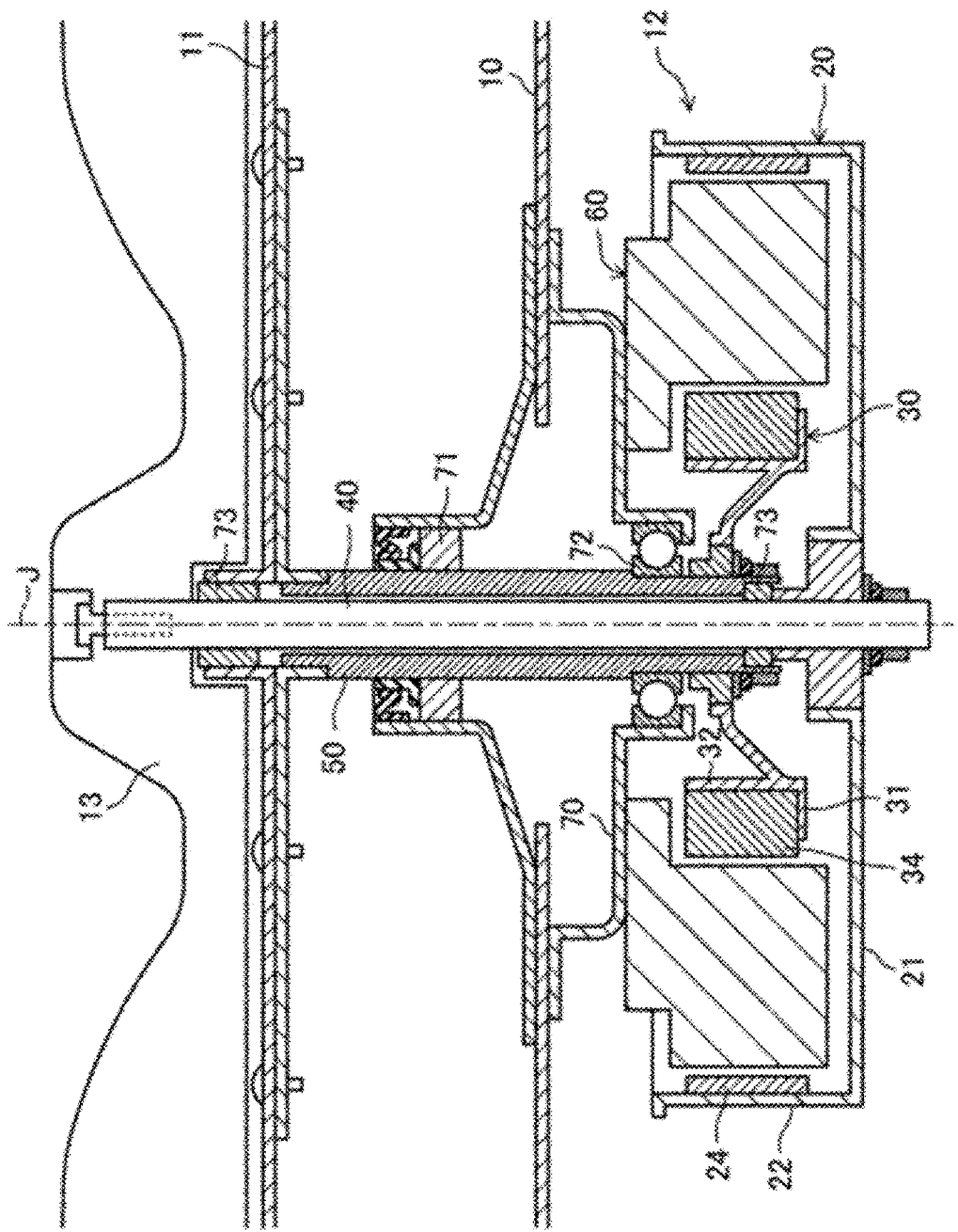
FIG. 3 illustrates a longitudinal cross-sectional view of a structure of a motor of the washing machine of FIG. 1.

FIG. 3 illustrates a structure of a motor of the washing machine according to certain embodiments of the present disclosure, such as illustrated in FIG. 1. As illustrated in FIG. 3, the motor 12 includes an outer rotor 20 (a second rotor), an inner rotor 30 (a first rotor), an inner shaft 40, an outer shaft 50, a stator 60, and the like. That is, the motor 12 is a so-called dual rotor motor in which the outer rotor 20 and the inner rotor 30 are respectively disposed outwardly and inwardly of a single stator 60 in a diametrical direction.

Because the outer rotor 20 and the inner rotor 30 are directly connected to the pulsator 13 or the spin-dry tub 11 without a clutch, an accelerator, a decelerator, or the like being interposed therebetween, the outer rotor 20 and the inner rotor 30 are configured to directly operate the pulsator 13 or the spin-dry tub 11.

According to certain embodiments, outer rotor 20 and the inner rotor 30 both use coils 63 (see FIG. 5) of the stator 60 and supply an operating current to the coils 63. Consequently, the motor 12 is able to independently control rotations of the outer rotor 20 and the inner rotor 30. The stator 60 is installed in a bearing bracket 70 installed at a lower surface of the laundry tub 10.

In the non-limiting example of FIG. 3, outer rotor 20 is a cylindrical member having a flat bottom. The outer rotor 20 includes a lower wall 21 having an open central portion, a rotor yoke 22 installed upright at a periphery of the lower wall 21, and a plurality of outer magnets 24 formed of arc-shaped permanent magnets. The lower wall 21 and the rotor yoke 22 of the outer rotor 20 are formed by press-processing a metal plate for the lower wall 21 and the rotor yoke 22 to serve as a back yoke.

In some embodiments of the present disclosure, the outer rotor 20 is a consequent-pole rotor not having a salient pole structure. In the outer rotor 20, sixteen outer magnets 24 are arranged at predetermined intervals in a circumferential direction and are fixed to an inner surface of the rotor yoke 22.

Magnetic poles of the outer magnets 24 may, in some embodiments, be reversed (reversed from an S-pole to an N-pole or reversed from an N-pole to an S-pole) by a magnetization process (shifting magnets which will be described below). Also, a magnetic force of the outer magnets 24 may be strengthened or weakened (increase in magnetic force, decrease in magnetic force). That is, in certain embodiments of the present disclosure, the outer rotor 20 is formed of a rotor corresponding to the magnetization process, and the number of poles of the rotor may be shifted between 16 and 32.

According to certain embodiments, inner rotor 30 is a cylindrical member having a flat bottom and an outer diameter which is smaller than that of the outer rotor 20. The inner rotor 30 includes an inner lower wall 31 having an open central portion, an inner peripheral wall 32 vertically installed around the inner lower wall 31, and a plurality of inner magnets 34 formed of rectangular plate-shaped permanent magnets (fixing magnets which will be described below).

The inner rotor 30 according to at least one embodiment of the present disclosure is a spoke type rotor. In the inner rotor 30, thirty-two inner magnets 34 are radially arranged at predetermined intervals in the circumferential direction and are fixed to the inner peripheral wall 32. Rotor cores 33 (see FIG. 5) are disposed in the circumferential direction between the inner magnets 34.

In some embodiments, inner shaft 40 is a cylindrical shaft member. The inner shaft 40 is supported to be rotatable by the bearing bracket 70 through inner bearings 73, the outer shaft 50, and ball bearings 71 and 72. A lower end of the inner shaft 40 is connected to the outer rotor 20. An upper end of the inner shaft 40 is connected to the pulsator 13.

According to various embodiments, outer shaft 50 is a cylindrical shaft member having shorter length than that of the inner shaft 40 and a larger inner diameter than the outer diameter of the inner shaft 40. The outer shaft 50 is supported to be rotatable by the bearing bracket 70 through the inner bearings 73 at upper and lower portions, the inner shaft 40, and the ball bearings 71 and 72. A lower end of the outer shaft 50 is connected to the inner rotor 30. An upper end of the outer shaft 50 is connected to the spin-dry tub 11.

In the non-limiting example of FIG. 3, stator 60 is formed of a ring-shaped member whose outer diameter is smaller than the inner diameter of the outer rotor 20 and whose inner diameter is larger than the outer diameter of the inner rotor 30.

Figure 4:
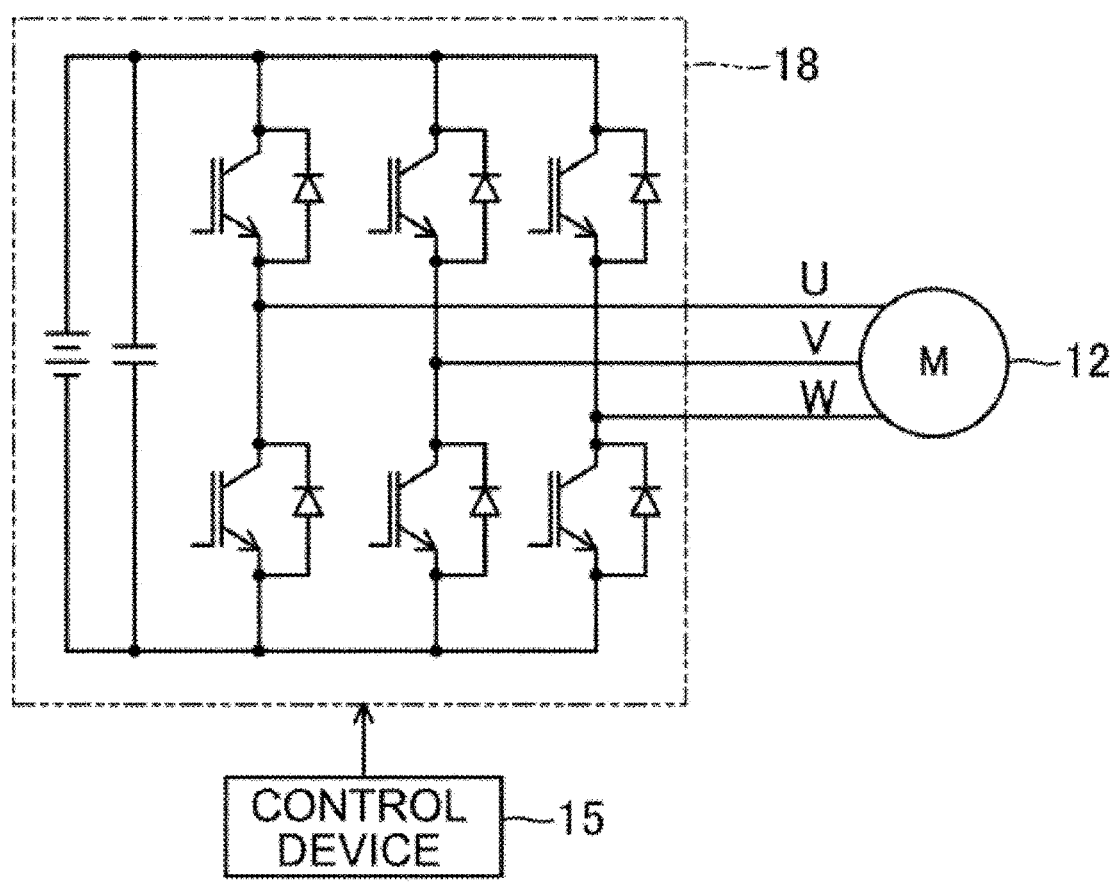
FIG. 4 illustrates a configuration of an inverter for operating the motor of the washing machine illustrated in FIG. 1 according to certain embodiments of the present disclosure.

FIG. 4 illustrates a configuration of an inverter for operating the motor of the washing machine according to certain embodiments of the present disclosure, such as illustrated in FIG. 1. As shown in the non-limiting example of FIG. 4, a three-phase inverter 18 is connected to the motor 12. As shifting of the inverter 18 is controlled by the control device 15, operating currents of three phases (U-phase, V-phase, W-phase) are conducted to the coils 63 at a predetermined timing. Different magnetic poles are simultaneously generated at an outer side and an inner side of teeth 61 due to the conduction of the operating currents. The outer rotor 20 and the inner rotor 30 independently rotate due to a rotating magnetic field. The teeth 61 form a number-of-magnetic-poles shifter along with the coils 63.

According to certain embodiments, in the motor 12, to set a standard of operation control, any one of the outer rotor 20 and the inner rotor 30 is set as a main rotor, and the other rotor is set as a sub-rotor. An operating current is controlled on the basis of the main rotor. In the motor 12 according to an embodiment of the present disclosure, the inner rotor 30 is set as the main rotor.

According to certain embodiments, because the control device 15 controls the inverter 18 of the motor 12, a magnetizing current, which is sufficiently larger than an operating current, is conducted to a predetermined coil 63 of the stator 60 at a predetermined timing. By the conduction of the magnetizing current, a predetermined outer magnet 24 of the outer rotor 20 is magnetized.

The motor 12 may operate in a plurality of rotation modes by the number of magnetic poles of the outer rotor 20 being shifted by the magnetization process. Because the motor 12 is a motor of the washing machine 1, main rotation modes include a mode in which the outer rotor 20 and the inner rotor 30 are synchronized and rotated in the same direction (synchronous rotation mode) and a mode in which the outer rotor 20 and the inner rotor 30 are rotated in opposite directions (counter rotation mode).

Figure 5:
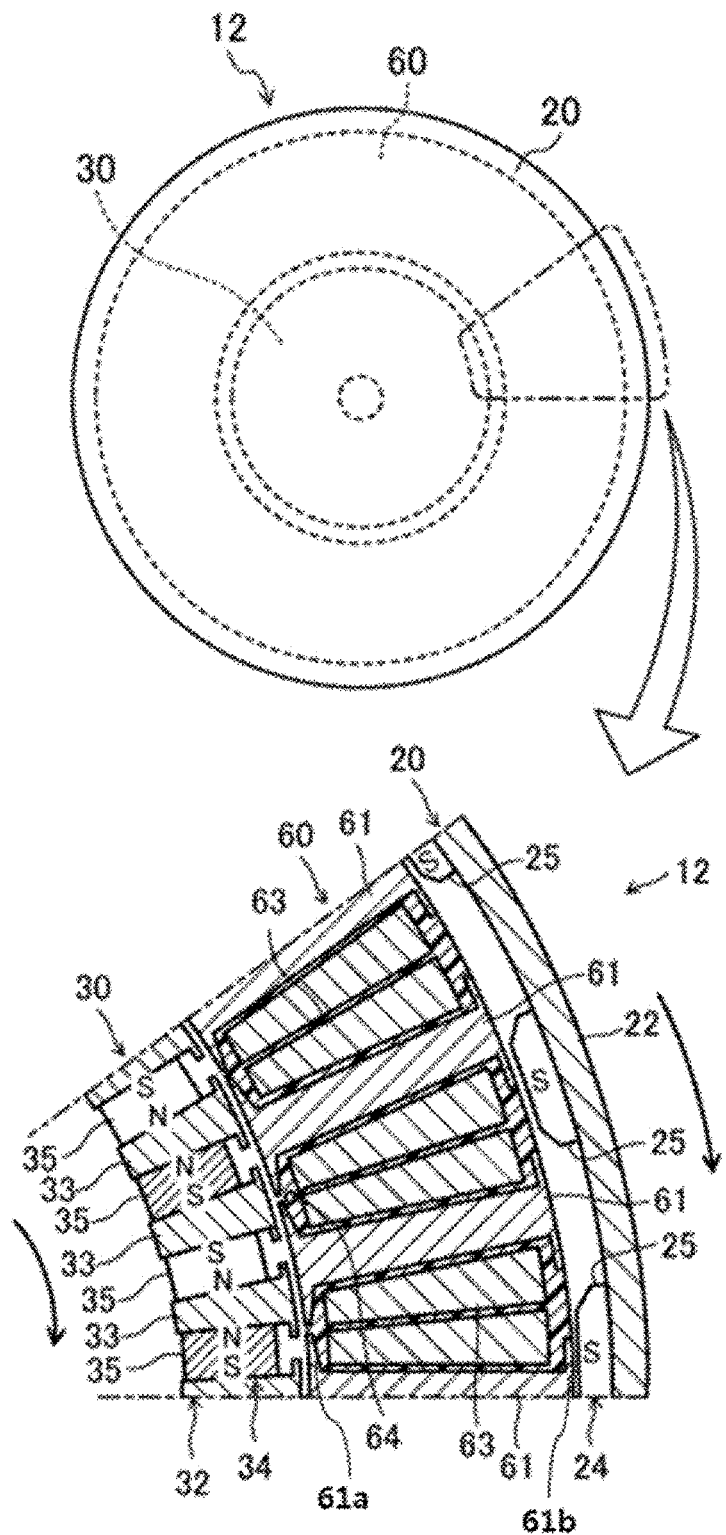
FIG. 5 illustrates a cross-sectional view of the structure of the motor of the washing machine illustrated in FIG. 1 according to certain embodiments of this disclosure.

FIG. 5 illustrates the structure of the motor of the washing machine according to certain embodiments of this disclosure, such as illustrated in FIG. 1, wherein the number of magnetic poles of an outer rotor is 32. As illustrated in FIG. 5, in the stator 60, the plurality of teeth 61, the coils 63, or the like are buried in a resin. In the stator 60 according to an embodiment of the present disclosure, twenty-four I-shaped teeth 61 and coils 63 are disposed.

According to certain embodiments, teeth 61 are metal members having an I-shaped cross-section in a direction in which the teeth 61 extend along the longitudinal axis J. The teeth 61 are radially arranged at equal intervals through slots and are disposed at an entire circumference of the stator 60. Side ends of an inner side and an outer side of the teeth 61 in the diametrical direction protrude in a flange shape from both side corners of the teeth 61 in the circumferential direction.

In the non-limiting example of FIG. 5, each of the teeth 61 has an inner flange 61a at the side end of the inner side thereof and has an outer flange 61b at the side end of the outer side thereof. In an embodiment of the present disclosure, outer portions of the plurality of teeth 61, including the outer flanges 61b at which the outer rotor 20 is disposed, form teeth corresponding to magnetization.

A clearance between the outer flanges 61b of two adjacent teeth 61 (an outer opening of the slot) is larger than a clearance between the inner flanges 61a of the two adjacent teeth 61 (an inner opening of the slot). In this way, by the outer opening of the slot being larger, the magnetization process of the outer rotor 20 is facilitated.

According to certain embodiments, a coil 63 is formed by continuously winding three wires coated with an insulating material in a predetermined order and with a predetermined configuration through the slot is disposed at each of the plurality of teeth 61 (so-called concentrated winding). Each of the teeth 61, at which the coil 63 is formed, exposes only an end surface of each of the inner flange 61a and the outer flange 61b and is buried in an insulated state in a thermosetting resin by mold formation.

The stator 60, the inner rotor 30, and the outer rotor 20 are, in some embodiments, attached so that the inner flanges 61a oppose the rotor cores 33 with a small clearance therebetween, and the outer flanges 61b oppose the outer magnets 24 with a small clearance therebetween.

In the non-limiting example of FIG. 5, position sensor 64 is disposed between adjacent teeth 61. The position sensor 64 is for determining a position of the inner rotor 30 and is disposed at an inner rotor 30-side.

Figure 6:
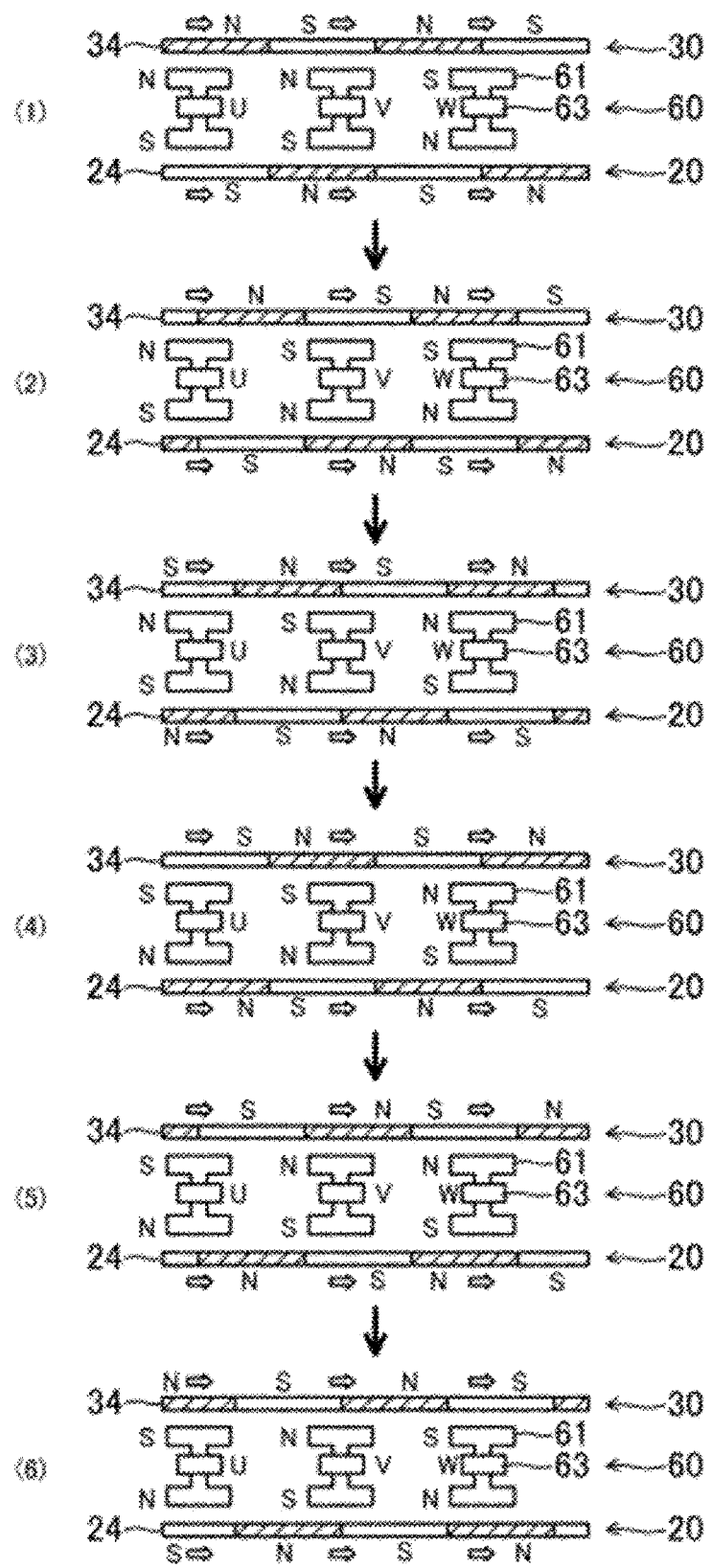
FIG. 6 illustrates operation of a motor according to certain embodiments of this disclosure in a synchronous rotation mode (the number of magnetic poles of the outer rotor is 32)
Figure 7:
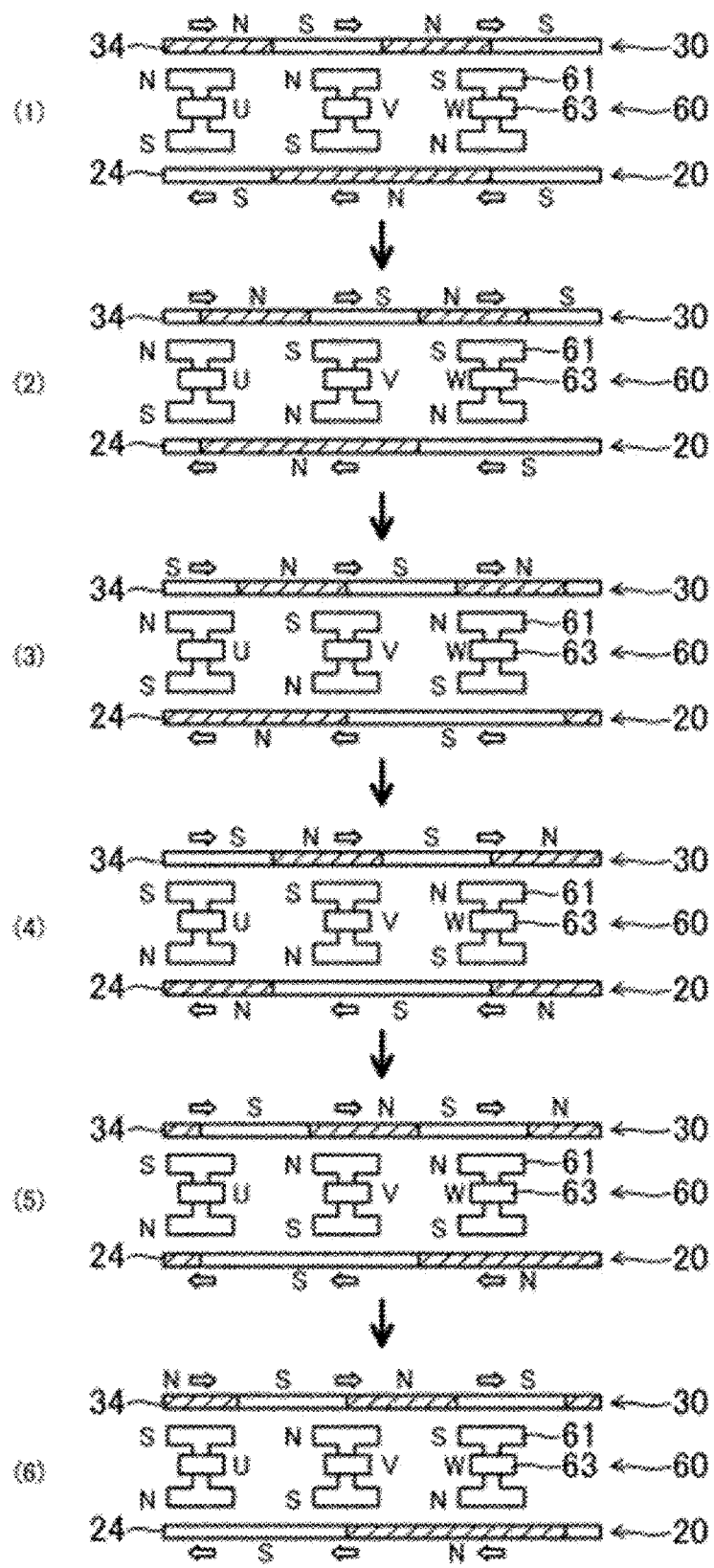
FIG. 7 illustrates operation of a motor according to certain embodiments of this disclosure in a counter rotation mode (the number of magnetic poles of the outer rotor is 16)

FIG. 6 illustrates operation of the motor according to certain embodiments of this disclosure in a synchronous rotation mode (the number of magnetic poles of the outer rotor is 32). FIG. 7 illustrates operation of the motor according to some embodiments in a counter rotation mode (the number of magnetic poles of the outer rotor is 16). That is, in the non-limiting examples of FIGS. 6 and 7, positions of the stator 60, the outer rotor 20, and the inner rotor 30 within a rotating electrical angle of 360° of the motor 12, are illustrated in six steps. FIGS. 6 and 7 schematically illustrate principles in which the outer rotor 20 and the inner rotor 30 according to certain embodiments rotate in the synchronous rotation mode and the counter rotation mode. The control of the operating current is performed by detecting the position of the inner rotor 30 using the position sensor 64 and specifying positions of the outer rotor 20 and the inner rotor 30 on the basis of the detected position of the inner rotor 30.

<Synchronous Rotation Mode>

According to certain embodiments, in the synchronous rotation mode, such as shown with reference to FIG. 6, the number of magnetic poles of the outer rotor 20 is 32, which is equal to that of the inner rotor 30. FIG. 6 illustrates only a portion corresponding to a mechanical angle of 45°. When an operating current is applied to the three-phase coils 63 of the U-phase, V-phase, and W-phase, magnetic poles are generated in the teeth 61. Opposite magnetic poles are generated at a portion adjacent to the inner rotor 30-side of the teeth 61 and a portion adjacent to the outer rotor 20-side. In the following description, only poles at the portion adjacent to the inner rotor 30 of the teeth 61 will be described. In the following description, the "portion adjacent to the inner rotor 30-side of the teeth 61" will be referred to as an "inner rotor 30-side of the teeth 61," and the "portion adjacent to the outer rotor 20-side of the teeth 61" will be referred to as an "outer rotor 20-side of the teeth 61.

In a first step (1) of the non-limiting example of FIG. 6, inner rotor 30-*sides* of the teeth 61 in the U-phase and the V-phase have N-poles, and the inner rotor 30-*sides* of the teeth 61 in the W-phase have S-poles. Because of this, the outer rotor 20-*sides* of the teeth 61 in the U-phase and the V-phase have S-poles, and the outer rotor 20-*sides* of the teeth 61 in the W-phase have N-poles.

In the first step (1), the outer rotor 20 and the inner rotor 30 receive a force for rotating rightward in FIG. 6 as torque while being misaligned by an electrical angle, 180°.

In a second step (2), magnetic poles of the teeth 61 in the V-phase are reversed. Because of this, the teeth 61 in the V-phase have S-poles while the teeth 61 in the U-phase at the inner rotor 30-side have N-poles, and the outer rotor 20 and the inner rotor 30 move rightward while the teeth 61 in the W-phase have S-poles.

In a third step (3), magnetic poles of the teeth 61 in the W-phase are reversed. Because of this, the teeth 61 in the W-phase have N-poles while the teeth 61 in the U-phase at the inner rotor 30-side have N-poles and the teeth 61 in the V-phase have S-poles, and the outer rotor 20 and the inner rotor 30 move rightward.

In a fourth step (4), magnetic poles of the teeth 61 in the U-phase are reversed. Because of this, the teeth 61 in the U-phase at the inner rotor 30-side have S-poles, and the outer rotor 20 and the inner rotor 30 move rightward while the teeth 61 in the V-phase have S-poles and the teeth 61 in the W-phase have N-poles.

In a fifth step (5), magnetic poles of the teeth 61 in the V-phase are reversed. Because of this, the teeth 61 in the V-phase have N-poles while the teeth 61 in the U-phase at the inner rotor 30-side have S-poles, and the outer rotor 20 and the inner rotor 30 move rightward while the teeth 61 in the W-phase have N-poles.

In a sixth step (6), magnetic poles of the teeth 61 in the W-phase are reversed. Because of this, the teeth 61 in the W-phase have S-poles while the teeth 61 in the U-phase at the inner rotor 30-side have S-poles and the teeth 61 in the V-phase have N-poles, and the outer rotor 20 and the inner rotor 30 move rightward.

In this way, the outer rotor 20 and the inner rotor 30 rotate at the same speed in the same direction (synchronous rotation mode). Although phases of the outer rotor 20 and the inner rotor 30 may actually be somewhat misaligned, it is assumed that the misalignment between the phases due to a load or a change in a load does not occur in certain embodiments of the present disclosure.

In some embodiments according to the present disclosure, although an operating current is controlled according to a position of the inner rotor 30 detected by the position sensor 64, embodiments are not limited to the position sensor 64. For example, a magnetic sensor configured to detect magnets at the inner rotor 30-side or the outer rotor 20-side may be used instead of the position sensor 64. Also, a so-called sensorless method, in which an organic voltage is used or a detected current is used, may also be employed. Other means such as an inverter may also be used to control an operating current.

<Counter Rotation Mode>

According to certain embodiments, in the counter rotation mode, such as shown in the non-limiting example of FIG. 7, the number of magnetic poles of the outer rotor 20 is 16. FIG. 7 illustrates only a portion corresponding to a mechanical angle 45°. When an operating current is applied to the three-phase coils 63 of the U-phase, V-phase, and W-phase, magnetic poles are generated in the teeth 61. Opposite magnetic poles are generated at a portion adjacent to the inner rotor 30-side of the teeth 61 and a portion adjacent to the outer rotor 20-side.

In a first step (1) of the non-limiting example of FIG. 7, inner rotor 30-*sides* of the teeth 61 in the U-phase and the V-phase have N-poles, and the inner rotor 30-*sides* of the teeth 61 in the W-phase have S-poles. Because of this, the outer rotor 20-*sides* of the teeth 61 in the U-phase and the V-phase have S-poles, and the outer rotor 20-*sides* of the teeth 61 in the W-phase have N-poles.

In the first step (1), the inner rotor 30 receive a force for rotating rightward in FIG. 7 as torque. The outer rotor 20 receives a torsional force for rotating leftward in FIG. 7.

In a second step (2), magnetic poles of the teeth 61 in the V-phase are reversed. Because of this, the teeth 61 in the V-phase have S-poles while the teeth 61 in the U-phase at the inner rotor 30-side have N-poles, and the outer rotor 20 moves rightward and the inner rotor 30 moves leftward while the teeth 61 in the W-phase have S-poles.

In a third step (3), magnetic poles of the teeth 61 in the W-phase are reversed. Because of this, the teeth 61 in the W-phase have N-poles while the teeth 61 in the U-phase at the inner rotor 30-side have N-poles and the teeth 61 in the V-phase have S-poles, the inner rotor 30 moves rightward, and the outer rotor 20 moves leftward.

In a fourth step (4), magnetic poles of the teeth 61 in the U-phase are reversed. Because of this, the teeth 61 in the U-phase at the inner rotor 30-side have S-poles, and the inner rotor 30 moves rightward and the outer rotor 20 moves leftward while the teeth 61 in the V-phase have S-poles and the teeth 61 in the W-phase have N-poles.

In a fifth step (5), magnetic poles of the teeth 61 in the V-phase are reversed. Because of this, the teeth 61 in the V-phase have N-poles while the teeth 61 in the U-phase at the inner rotor 30-side have S-poles, and the inner rotor 30 moves rightward and the outer rotor 20 moves leftward while the teeth 61 in the W-phase have N-poles.

In a sixth step (6), magnetic poles of the teeth 61 in the W-phase are reversed. Because of this, the teeth 61 in the W-phase have S-poles while the teeth 61 in the U-phase at the inner rotor 30-side have S-poles and the teeth 61 in the V-phase have N-poles, and the inner rotor 30 moves rightward and the outer rotor 20 moves leftward. Here, a movement amount of the outer rotor 20 is twice that of the inner rotor 30.

In this way, the outer rotor 20 and the inner rotor 30 rotate at different speeds and in different directions (counter rotation mode).

According to some embodiments, synchronous rotation mode and the counter rotation mode may also be configured with different number-of-magnetic-poles combination or different rotation ratio. That is, the synchronous rotation mode or the counter rotation mode may include a case in which the outer rotor 20 and the inner rotor 30 rotate in different rotation ratios or rotate with different torque.

In this way, the outer rotor 20 and the inner rotor 30 that use the single stator 60 in common may be independently rotated using the single inverter 18. As a result, in the washing machine 1 according to some embodiments of the present disclosure, the control device 15 may shift the operation of the motor 12 between the synchronous rotation mode and the counter rotation mode for the pulsator 13 and the spin-dry tub 11 to be rotated in the same direction or different directions.

Figure 8:
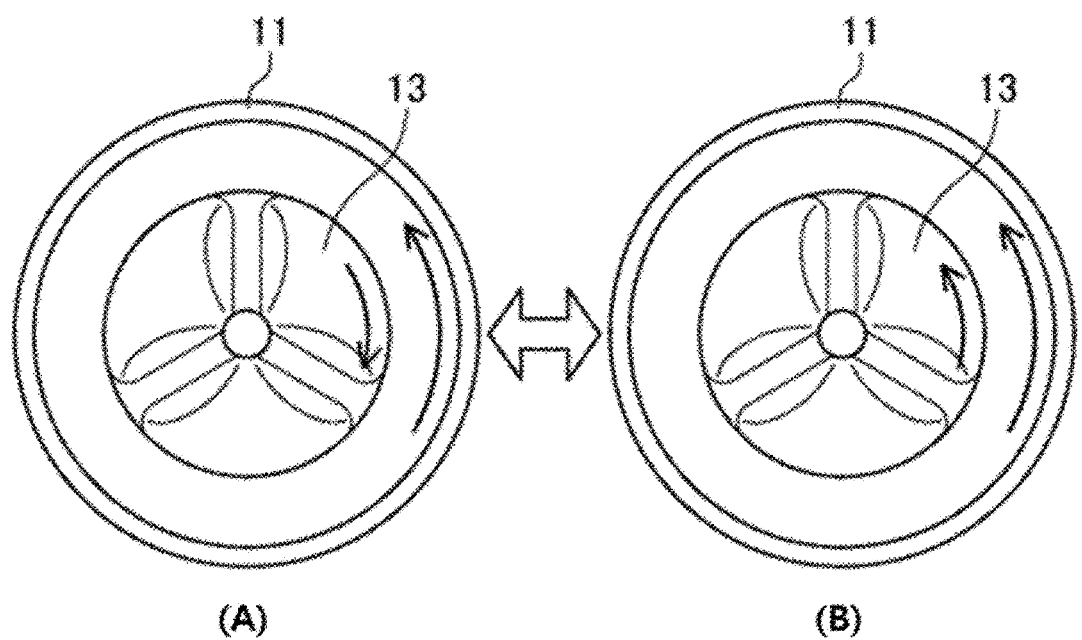
FIG. 8 illustrates rotation directions of a pulsator and a spin-dry tub according to certain embodiments of the present disclosure in the counter rotation mode and the synchronous rotation mode.

FIG. 8 illustrates rotation directions of a pulsator and a spin-dry tub according to certain embodiments of the present disclosure in the counter rotation mode and the synchronous rotation mode. As illustrated in the non-limiting example of FIG. 8(A), by the operation of the motor 12 being shifted to the counter rotation mode, the pulsator 13 and the spin-dry tub 11 rotate in directions opposite from each other. As illustrated in FIG. 8(B), by the operation of the motor 12 being shifted to the synchronous rotation mode, the pulsator 13 and the spin-dry tub 11 rotate in the same direction.

<Magnetization Process of Motor>

In the washing machine 1 according to certain embodiments of the present disclosure, to shift an operation mode between the synchronous rotation mode and the counter rotation mode, the number of magnetic poles is shifted by the control device 15 performing a magnetization process with respect to the outer rotor 20 during an operation, i.e., while a washing process is being performed.

Figure 9:
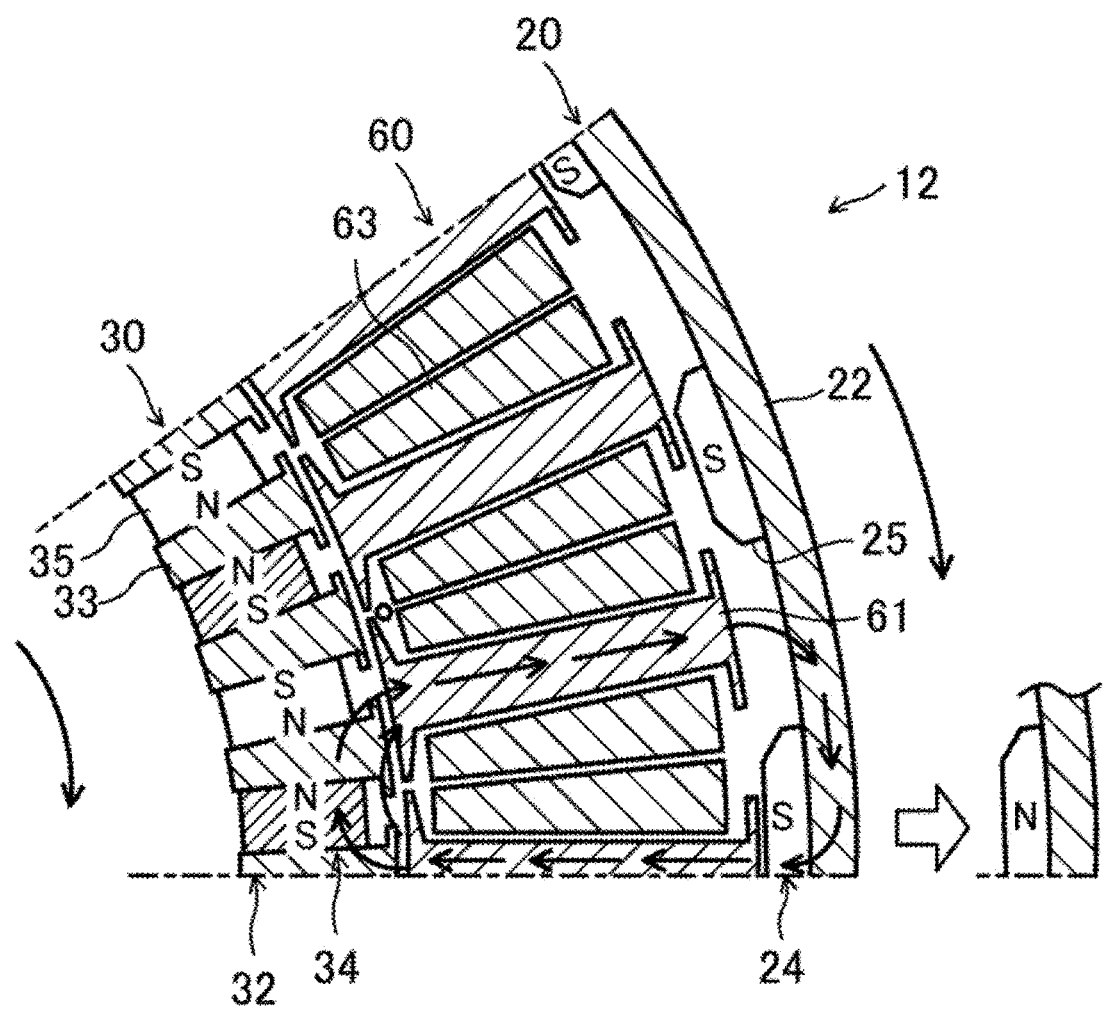
FIG. 9 illustrates a magnetization process from the synchronous rotation mode to the counter rotation mode according to certain embodiments of this disclosure.

FIG. 9 illustrates a magnetization process from the synchronous rotation mode to the counter rotation mode according to certain embodiments of the present disclosure. Specifically, FIG. 9 provides a cross-sectional view of a main portion of the motor 12. In this particular example, all of the outer magnets 24 are formed of shifting magnets 25. All of the inner magnets 34 are formed of fixing magnets 35.

In the non-limiting example of FIG. 9, shifting magnets 25 are magnets whose polarities are reversed when a magnetizing current is supplied to the coils 63, which form the number-of-magnetic-poles shifter. The fixing magnets 35 are magnets whose polarities are not reversed even when a magnetizing current is supplied to the coils 63. The shifting magnets 25 and the fixing magnets 35 are not required to depend on the magnitude of a coercive force, the type of magnets, or the like. In the shifting magnets 25 and the fixing magnets 35, "reversing" and "fixing" indicate polarities of the entire magnets, and the polarities are determined on the basis of an overall magnetic flux even when an opposite pole is present at a portion of the magnets.

For the purposes of this disclosure, "St" represents the number of poles of the stator 60, "Mi" represents the number of poles of the inner rotor 30, and "Mo" represents the number of poles of the outer rotor 20, the number of poles St of the stator 60 is 24, the number of poles Mi of the inner rotor 30 is 32, and the number of poles Mo of the outer rotor 20 may be shifted to be 32 or 16. The ratio of the magnetic poles, St:Mi:Mo, is 3:4:4 or 3:4:2.

Figure 10:
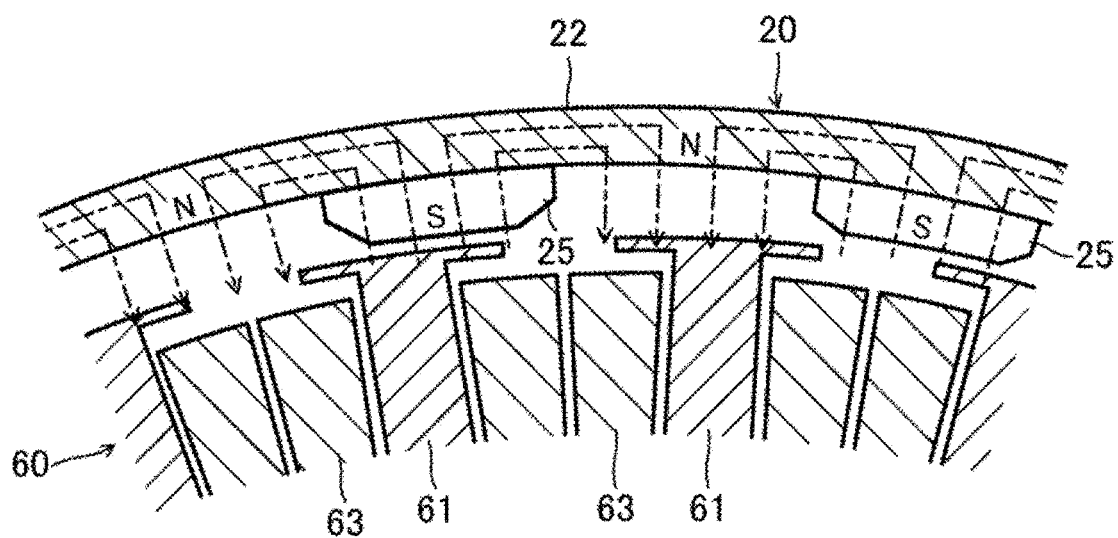
FIG. 10 illustrates a movement path of a magnetic flux in the synchronous rotation mode according to certain embodiments of this disclosure.

FIG. 10 illustrates a movement path of a magnetic flux of a motor according to certain embodiments of the instant disclosure operating in the synchronous rotation mode. As illustrated in FIG. 9 described above, all of the shifting magnets 25 have S-poles in the synchronous rotation mode. In this way, as illustrated in FIG. 10, the rotor yoke 22 of the outer rotor 20 between adjacent shifting magnets 25 have N-poles. Consequently, the number of poles of the outer rotor 20 in the non-limiting example of FIG. 10 is 32.

According to certain embodiments, because the N-pole portion of the rotor yoke 22 does not have a salient pole structure, magnetic resistances between the rotor yoke 22 and the teeth 61 becomes substantially equal. By using such a consequent pole rotor not having a salient pole structure, vibration or noise may be suppressed.

As illustrated in the non-limiting example of FIG. 10 with a two-dot chain line, a magnetic flux that exited from the N-pole portion of the rotor yoke 22 enters a tooth 61, and a magnetic flux that exited from an adjacent tooth 61 enters the shifting magnet 25 (S-pole).

In this case, because a clearance (an air gap) between the rotor yoke 22 (N-pole) and the teeth 61 is large, an organic voltage is decreased. This is advantageous for a spin-drying process that requires high-speed rotation and low torque.

Figure 11:
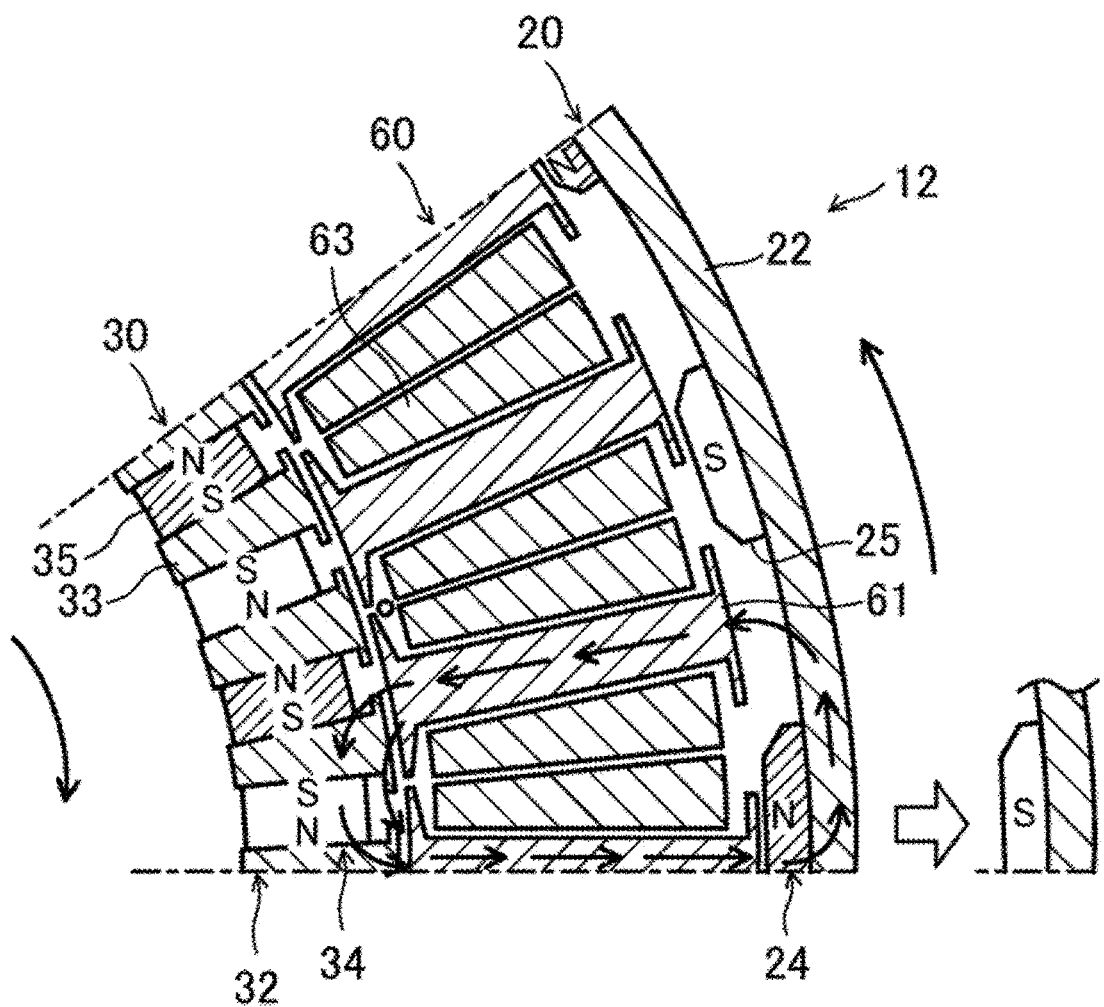
FIG. 11 illustrates a magnetization process from the counter rotation mode to the synchronous rotation mode according to certain embodiments of this disclosure.
Figure 12:
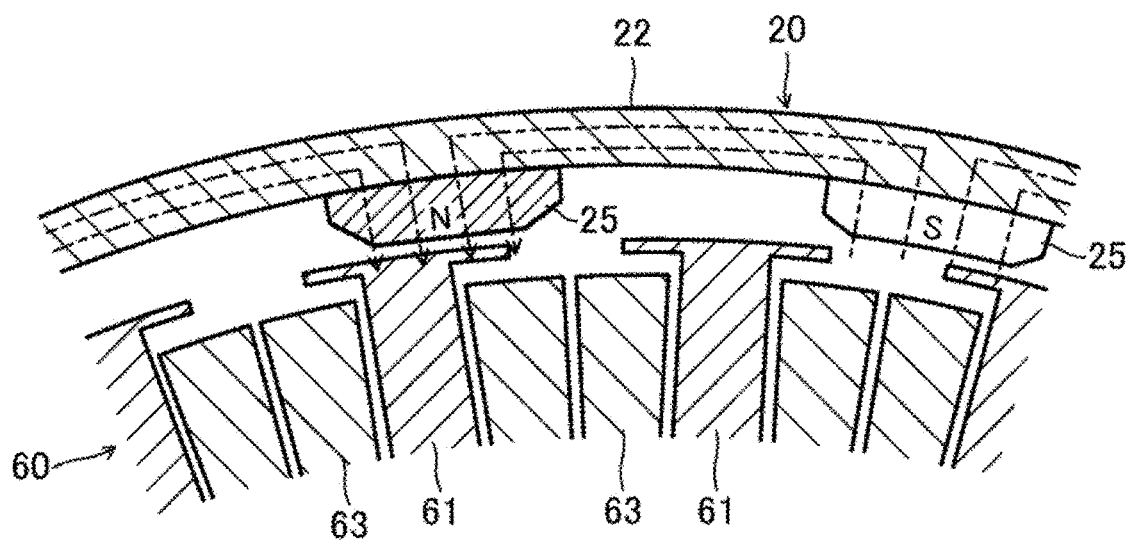
FIG. 12 illustrates a movement path of a magnetic flux in the counter rotation mode according to certain embodiments of this disclosure.

FIG. 11 illustrates a magnetization process according to certain embodiments, from the counter rotation mode to the synchronous rotation mode. FIG. 11 provides a cross-sectional view illustrating a main portion of the motor 12 and depicts only a portion corresponding to a mechanical angle of 45°. According to certain embodiments, such as illustrated in FIG. 11, the shifting magnets 25 are configured so that N-poles and S-poles are alternately arranged. By the shifting magnets 25 being configured in this way, as illustrated in FIG. 12 which will be described below, the rotor yoke 22 of the outer rotor 20 between the shifting magnets 25 does not constitute magnetic poles. Consequently, the number of magnetic poles of the outer rotor 20 is 16.

FIG. 12 illustrates a movement path of a magnetic flux in a motor according to certain embodiments, when the motor is in the counter rotation mode. As illustrated in FIG. 12 with a two-dot chain lie, a magnetic flux exited from the shifting magnet 25 (N-pole) enters the tooth 61, and a magnetic flux that exited from an adjacent tooth 61 enters the shifting magnet 25 (S-pole).

In this case, because a clearance (an air gap) between the shifting magnets 25 (N-poles) and the teeth 61 is relatively smaller in comparison to the case in which number of magnetic poles of the outer rotor 20 is 32, an organic voltage is increased. This can be advantageous for a washing process that requires low-speed rotation and high torque.

<Shifting Number of Magnetic Poles>

In the non-limiting example of FIG. 9, as described above, the magnetization process from the synchronous rotation mode to the counter rotation mode is illustrated. That is, FIG. 9 illustrates a case in which the number of magnetic poles of the outer rotor 20 is shifted from 32 to 16 (shifting from the synchronous rotation mode to the counter rotation mode). In FIG. 9, a magnetizing current is flowed to the coils 63 so that a magnetic force line (indicated by an arrow) is formed in a tooth 61 which is the first from the bottom, and a tooth 61 which is the second from the bottom, for a magnetic field to be generated. In this way, in some embodiments according to the present disclosure, a magnetic pole of the shifting magnet 25 which is the first from the bottom may be reversed from an S-pole to an N-pole.

FIG. 11 described above illustrates certain embodiments of a magnetization process from the counter rotation mode to the synchronous rotation mode. FIG. 11 illustrates a non-limiting case in which the number of magnetic poles of the outer rotor 20 is shifted from 16 to 32 (shifting from the counter rotation mode to the synchronous rotation mode). In FIG. 11, a magnetizing current is flowed to the coils 63 so that a magnetic force line indicated by an arrow is formed in a tooth 61 which is the first from the bottom and a tooth 61 which is the second from the bottom for a magnetic field to be generated. In this way, a magnetic pole of the shifting magnet 25 which is the first from the bottom may be reversed from an N-pole to an S-pole.

According to some embodiments, when the magnetic pole is shifted, the shifting of the magnetic pole is not completed in some cases due to a previous pole remaining in a portion of the shifting magnet 25 whose magnetic pole is reversed. In this case, shifting of the magnetic pole may be completed by properly adjusting an angle of the outer rotor 20 and a phase of a magnetizing current which is to be applied to the coils 63, and performing a magnetization process several times. An order of performing the magnetization process several times will be separately described below.

In some embodiments according to this disclosure, magnetic resistance of a path of a magnetic flux passing through the shifting magnet 25 between magnetized teeth 61 is higher than magnetic resistance of a path of a magnetic flux passing through the vicinity of the air gap of the inner rotor 30. That is, in the inner rotor 30, a portion of a magnetic flux passing through the fixing magnet 35 is branched to pass through the vicinity of the air gap.

Because of this, when a magnetizing current is supplied, a larger amount of magnetic flux flows in the shifting magnet 25 than in the fixing magnet 35, and a magnetizing force at a portion of the shifting magnet 25 is larger than a magnetizing force at a portion of the fixing magnet 35.

In certain embodiments according to this disclosure, by properly setting a magnetic path of a magnetic flux or magnetization, for example, even when the shifting magnet 25 and the fixing magnet 35 are formed of ferrite magnets whose coercive forces are equal, shifting of a magnetic pole of only the shifting magnet 25 may be stably performed.

In some embodiments, the shifting magnet 25 and the fixing magnet 35 may also be formed of two different types of magnets. For example, by setting a coercive force of the fixing magnet 35 to be larger than a coercive force of the shifting magnet 25, more stable magnetization may be obtained. Also, by using a rare earth magnet as the fixing magnet 35 of the inner rotor 30, torque balance between the inner rotor 30 and the outer rotor 20 may be more easily achieved.

Figure 13:
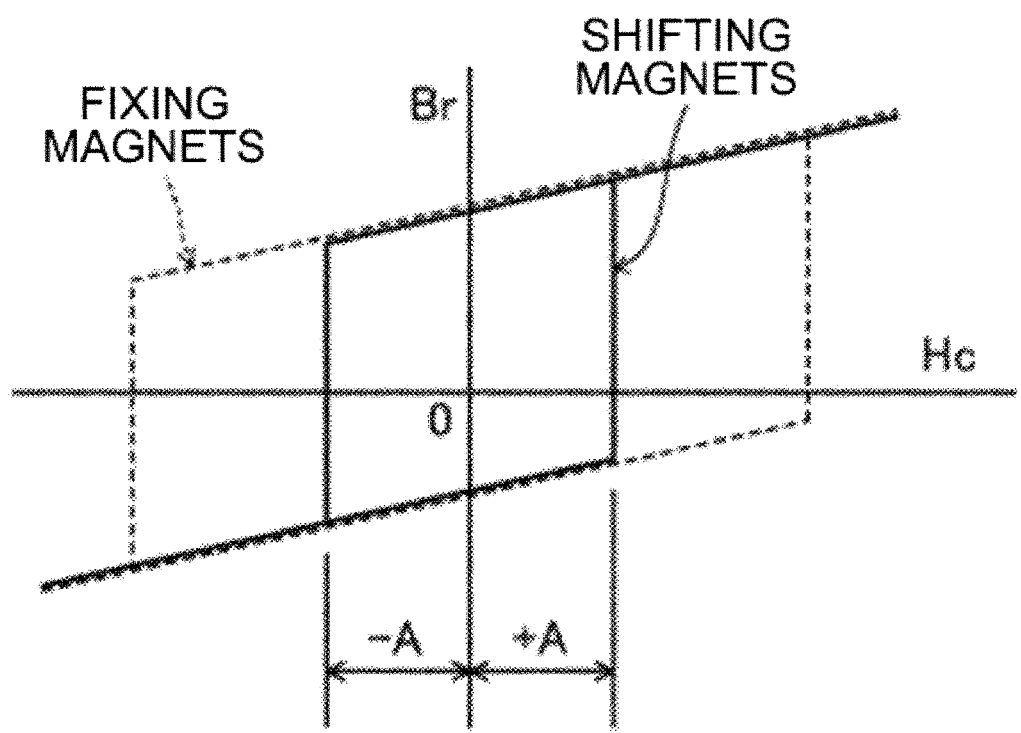
FIG. 13 illustrates a B-H curve in certain embodiments in which magnets having different coercive forces are used as fixing magnets and shifting magnets.

FIG. 13 illustrates a B-H curve (magnetic hysteresis loop) according to certain embodiments of the present disclosure in which magnets having different coercive forces are used as fixing magnets and shifting magnets. As illustrated in FIG. 13, by flowing a magnetizing current in the coils 63, a magnetic field may be generated within a range in which a coercive force is +A or higher, −A or lower, and does not exceed a coercive force of the fixing magnet 35. In this way, a magnetic pole of the shifting magnet 25 may be reversed. The magnetizing current may be a pulse current, and magnetization is possible within time of about several tens of milliseconds.

According to the non-limiting example of FIG. 13, in magnetizing the shifting magnet 25, a voltage applied to the coils 63 being high if possible is advantageous to increase a magnetizing current. Even when a high-speed rotation is performed with low torque as in a spin-drying process, a high voltage is preferable. However, when a low-speed rotation is performed with high torque as in a washing process, a rinsing process, or the like, efficiency of the inverter 18 is higher when the voltage is not too high.

Consequently, in the motor 12 according to some embodiments of the present disclosure, a voltage equal to that in a magnetization process is supplied to the inverter 18 when a high-speed rotation is performed with low torque, and a voltage lower than a voltage in a magnetization process is supplied to the inverter 18 when a low-speed rotation is performed with high torque. By supplying a voltage as above, power consumption may be reduced.

In the motor 12 according to at least one embodiment of the present disclosure, the outer rotor 20 and the inner rotor 30 may be rotated in a plurality of rotation modes without supplying a complex current. Consequently, because, a plurality of inverters 18 are not required, a dimension of the inverter 18 may be reduced such that the size of the product may be reduced or a cost thereof may be lowered.

In the motor 12 according to certain embodiments of the present disclosure, because separate current processing of a complex current is not required, an influence of a harmonic current may be reduced, and vibration or noise due to harmonic distortion may be suppressed.

Because a magnetizing current is supplied to the coils 63, and the magnetic pole of the shifting magnet 25 is shifted using a saturated magnetization region, an amount of magnetic flux is stable, and noise or vibration due to variations in the amount of magnetic flux may be suppressed.

Figure 14:
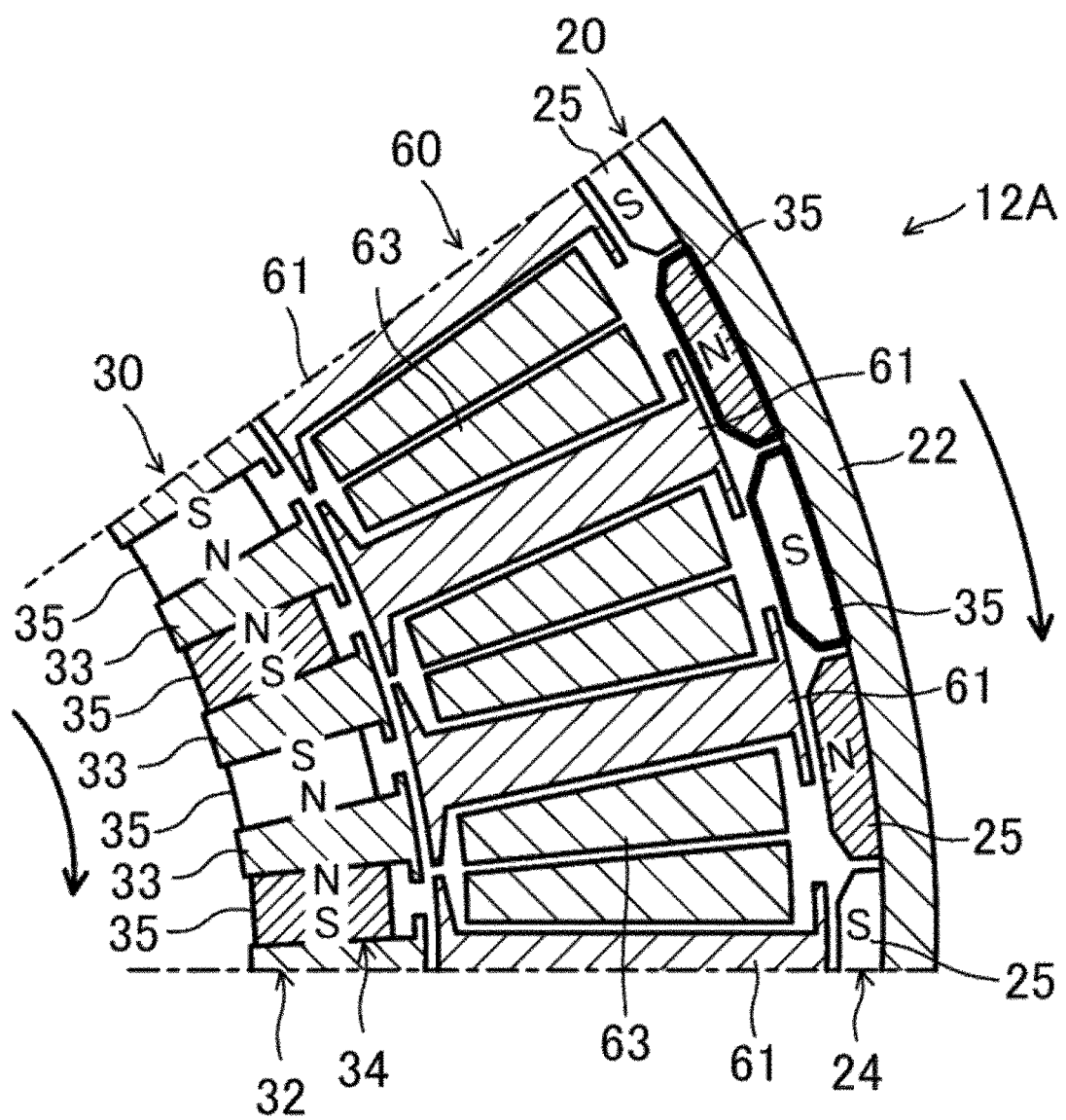
FIG. 14 illustrates a motor according to certain embodiments of the present disclosure in which the number of magnetic poles of an outer rotor is 32.

FIG. 14 is a plan cross-sectional view of a motor according to certain embodiments in which the number of magnetic poles of an outer rotor is 32. Hereinafter, parts which are the same as those in the above-described embodiment will be denoted by like reference numerals, descriptions thereof will be omitted, and only other aspects will be described (the same applies to other modified embodiments below).

In the non-limiting example of FIG. 14, the outer rotor 20 is a surface permanent magnet (SPM) type rotor and has thirty-two outer magnets 24 disposed in the circumferential direction so that S-poles and N-poles are alternately arranged and fixed to an inner surface of the rotor yoke 22.

According to certain embodiments, outer magnets 24 include the shifting magnets 25 and the fixing magnets 35. Specifically, among five outer magnets 24 illustrated in FIG. 14, the first, the second, and the fifth magnets from the bottom are shifting magnets 25. The third and the fourth magnets from the bottom are fixing magnets 35. That is, two adjacent magnets are the same type of magnets (either shifting or fixing).

Figure 15:
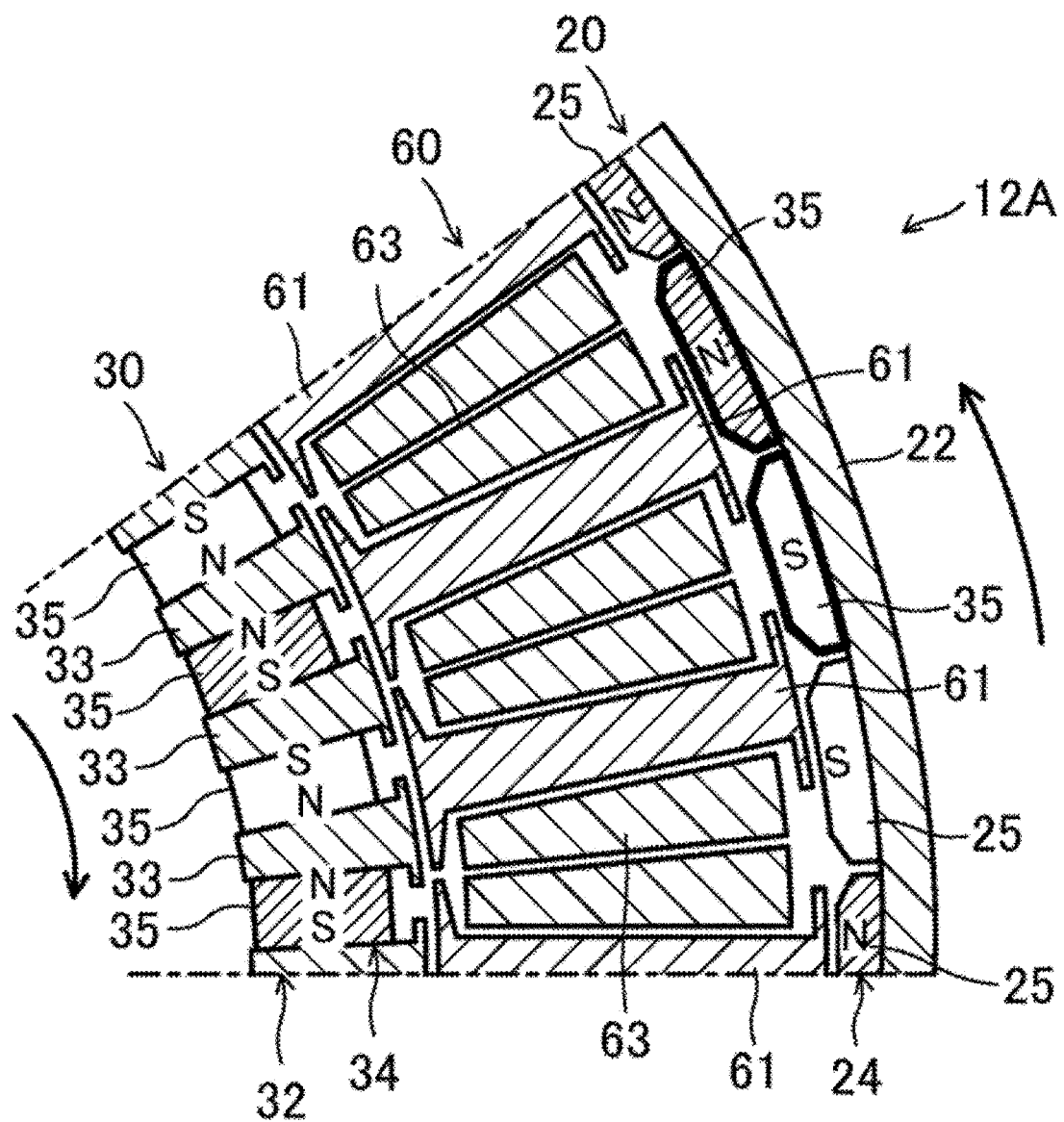
FIG. 15 illustrates a motor according to certain embodiments of the present disclosure in which the number of magnetic poles of the outer rotor is 16.

FIG. 15 provides a non-limiting example of a motor according to certain embodiments of the present disclosure in which the number of magnetic poles of the outer rotor is 16. When a magnetic current is supplied to the coils 63 and magnetic poles of all of the shifting magnets 25 are reversed, as illustrated in FIG. 15, magnetic poles of the first and the fifth shifting magnets 25 from the bottom are reversed from S-poles to N-poles, and a magnetic pole of the second shifting magnet 25 from the bottom is reversed from an N-pole to an S-pole. In this way, the magnetic poles are shifted so that a group of two adjacent S-pole magnets and a group of two adjacent N-pole magnets are alternately arranged in the circumferential direction, and the number of magnetic poles of the outer rotor 20 becomes 16.

In the non-limiting example of FIG. 15, when an operating current is supplied to the coils 63 in the case in which the number of magnetic poles of the outer rotor 20 is 32, as indicated by the arrows in FIG. 14, both the outer rotor 20 and the inner rotor 30 rotate clockwise. That is, the motor 12A may be rotated in the synchronous rotation mode.

According to certain embodiments, when an operating current is supplied to the coils 63 in the case in which the number of magnetic poles of the outer rotor 20 is 16, as indicated by the arrows in FIG. 15, the outer rotor 20 rotates counterclockwise while the inner rotor 30 rotates clockwise. That is, the motor 12A may be rotated in the counter rotation mode.

<Shifting Number of Magnetic Poles>

According to certain embodiments, such as motor 12A shown in FIG. 15, the number of magnetic poles is shifted by magnetizing the shifting magnets 25 several times. Hereinafter, a case in which the number of magnetic poles of the outer rotor 20 is shifted from 32 to 16 (shifting from the synchronous rotation mode to the counter rotation mode) will be described with reference to FIGS. 16 to 21. According to some embodiments, in the opposite case, i.e., when the number of magnetic poles of the outer rotor 20 is shifted from 16 to 32 (shifting from the counter rotation mode to the synchronous rotation mode), a method of shifting the number of magnetic poles of the outer rotor 20 from 32 to 16 which will be described below is performed in a reverse order.

Figure 16:
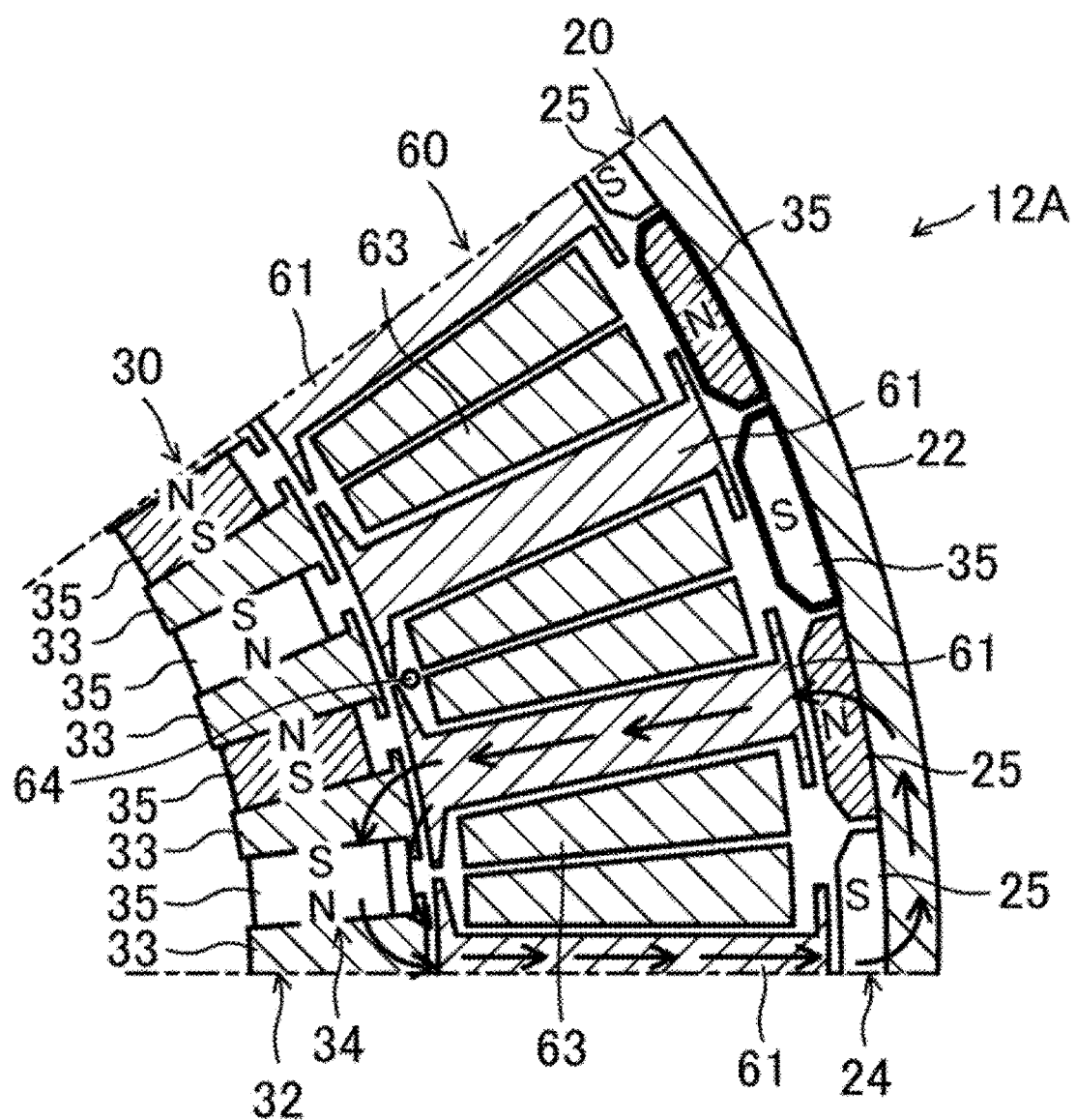
FIGS. 16 to 21 illustrate aspects a process of the magnetization process of the motor according to certain embodiments of the present disclosure.

FIGS. 16 to 21 illustrate aspects of a process of the magnetization process of the motor according certain embodiments of the present disclosure. As illustrated in the non-limiting example of FIG. 16, first, a position of the outer rotor 20 is determined. Specifically, a current is flowed to the coils 63 so that a magnetic force line indicated by arrows in FIG. 16 is formed in a tooth 61 (U-phase) which is the first from the bottom and a tooth 61 (W-phase) which is the second from the bottom in FIG. 16 for a magnetic field to be generated. A current of about 5 A (a position-determining current) is applied so that a magnetic field at an extent to which the outer rotor 20 is fixed to a position thereof in FIG. 16 is generated. Because of this, balance is maintained between magnetic poles of the outer rotor 20 and the inner rotor 30 opposing the teeth 61, and the outer rotor 20 is stopped at the position illustrated in FIG. 16.

Figure 17:
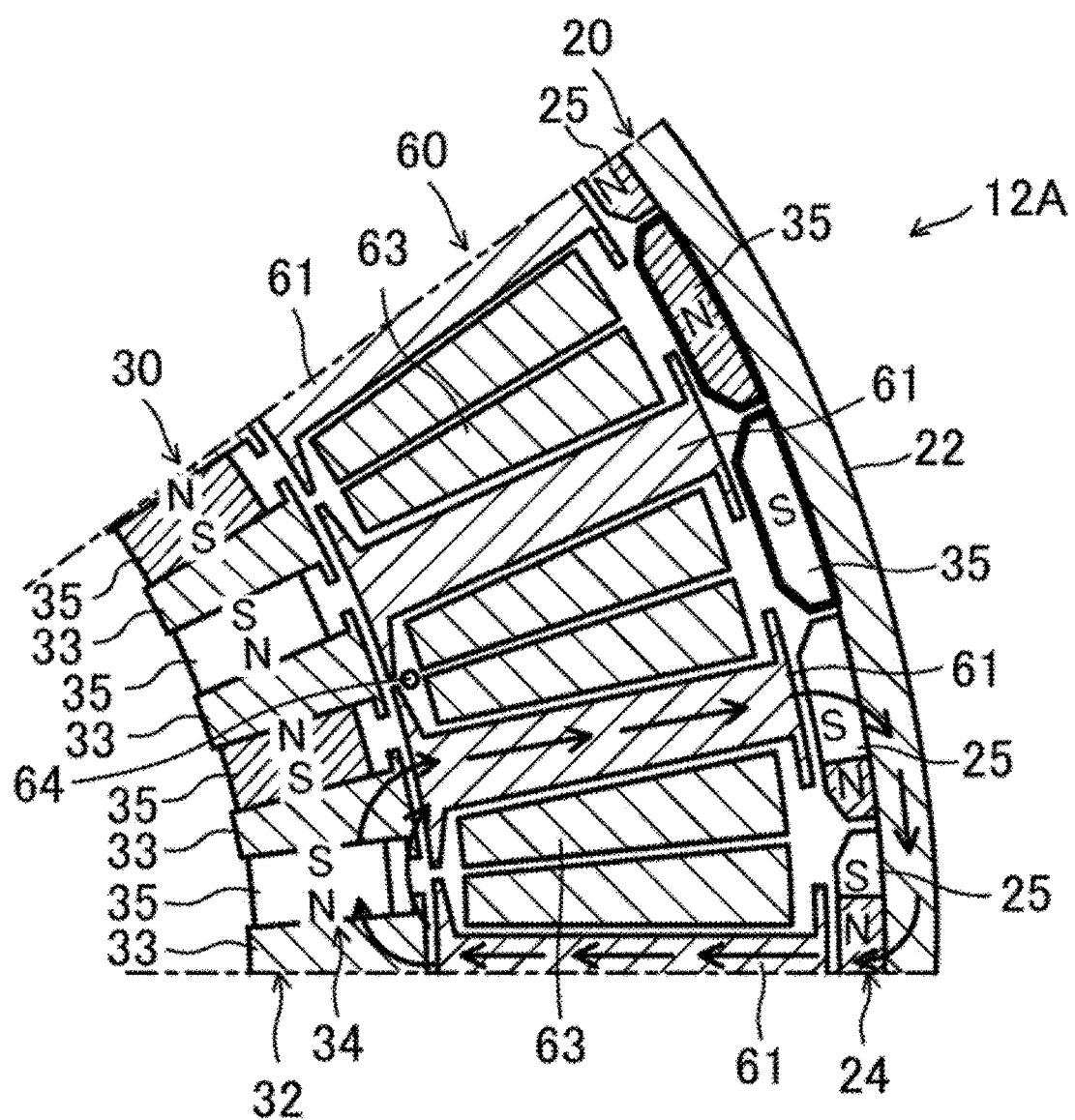

According to certain embodiments, such as illustrated in FIG. 17, a current is applied to the coils 63 so that a magnetic force line indicated by arrows in FIG. 17 is formed in a tooth 61 which is the first from the bottom and a tooth 61 which is the second from the bottom at the position at which the outer rotor 20 is stopped for a magnetic field to be generated. A current larger than that of when the position of the outer rotor 20 is determined, e.g., a magnetizing current of about 30 A is applied. In this way, as illustrated in FIG. 17, magnetic poles are partially reversed in the first and second shifting magnets 25 from the bottom.

Figure 18:
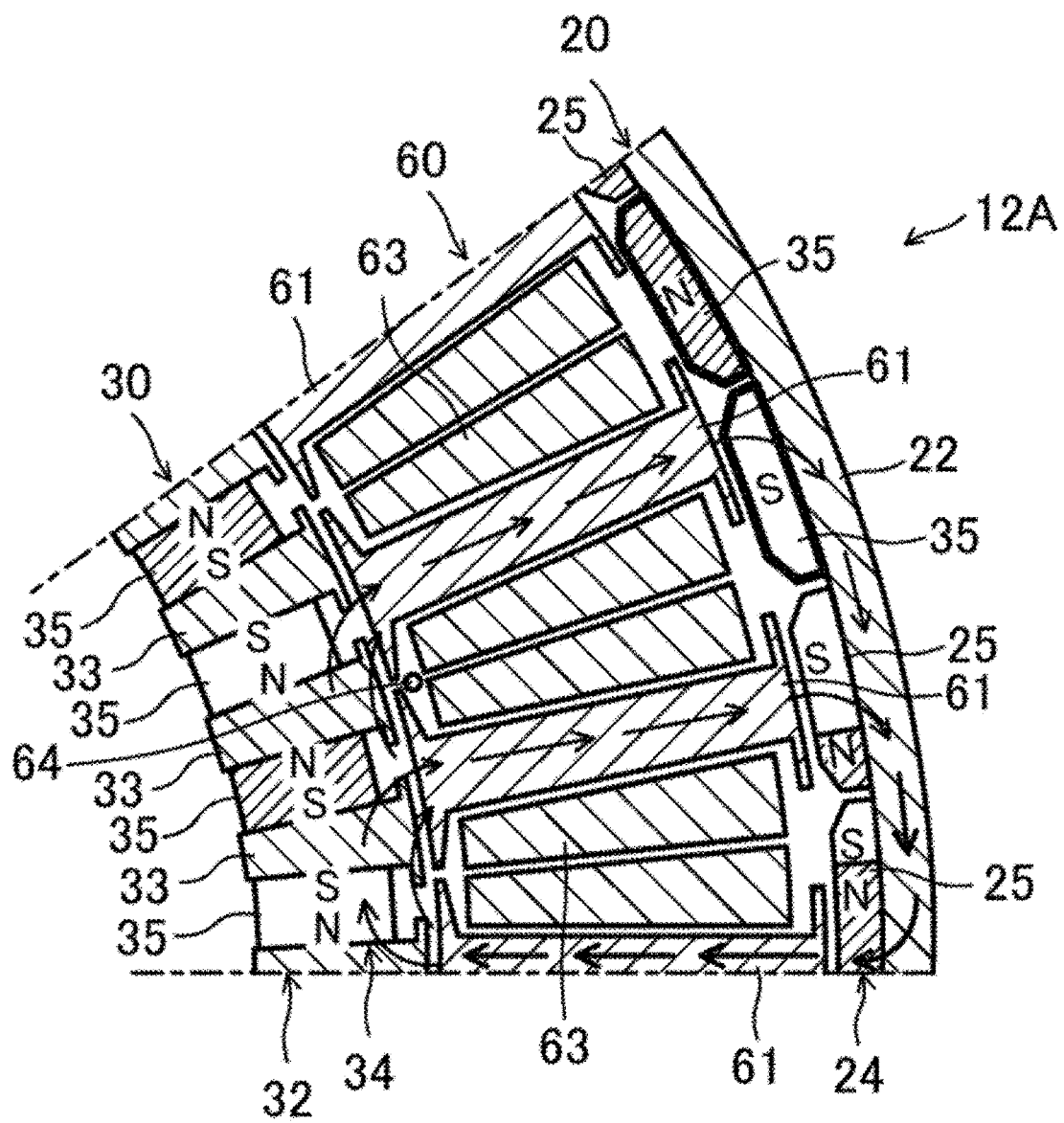

Then, as illustrated in FIG. 18, a position-determining current is applied to the coils 63 so that a magnetic force line indicated by arrows in FIG. 18 is formed in a tooth 61 (U-phase), a tooth 61 (W-phase), and a tooth 61 (V-phase), which are respectively the first, the second, and the third from the bottom for a magnetic field to be generated. In this way, balance between magnetic poles of the outer rotor 20 and the inner rotor 30 is maintained, and the outer rotor 20 is stopped at a position illustrated in FIG. 18.

Figure 19:
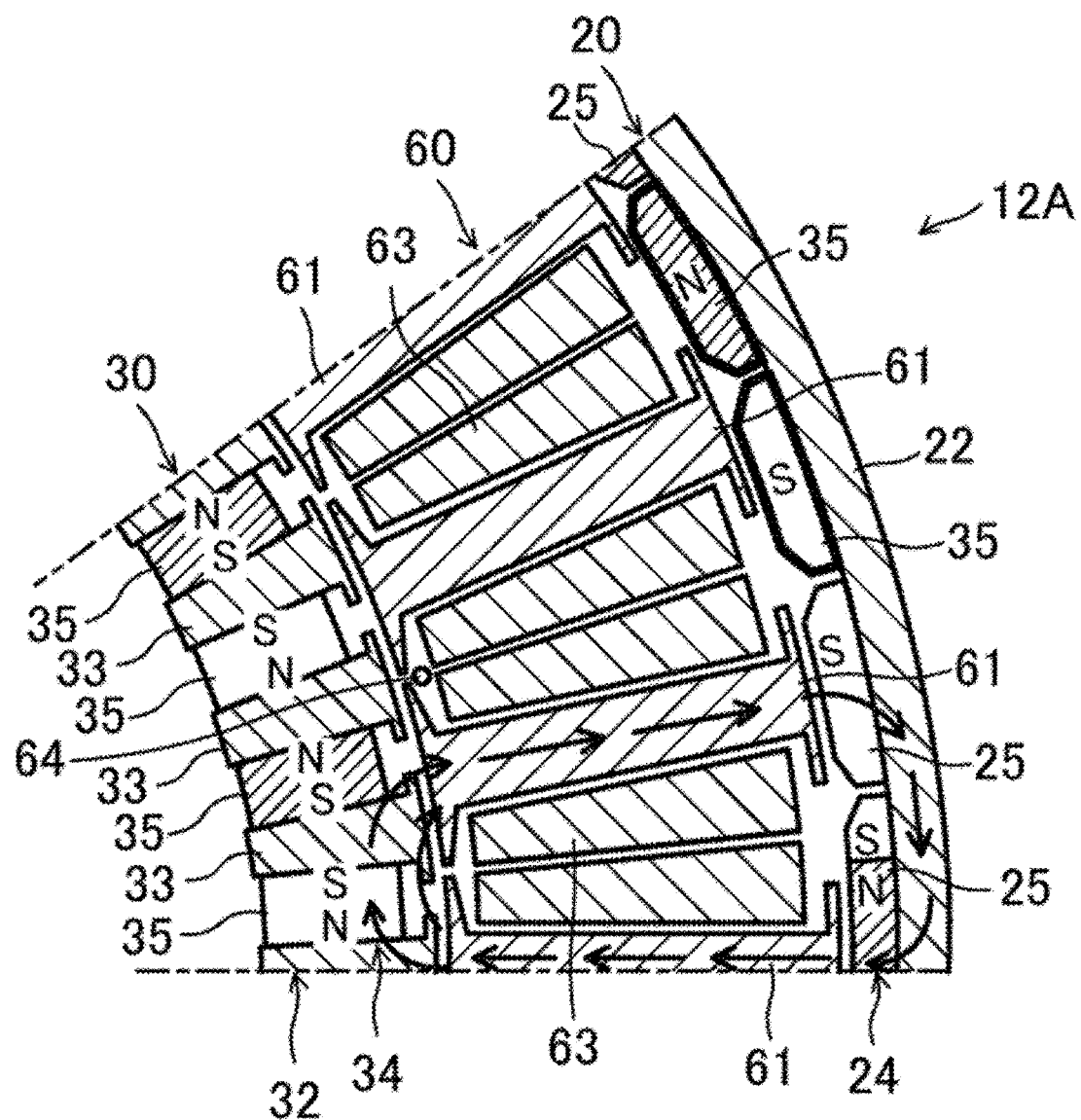

As illustrated in FIG. 19, according to certain embodiments, a magnetizing current is applied to the coils 63 so that a magnetic force line indicated by arrows in FIG. 19 is formed in a tooth 61 and a tooth 61, which are respectively the first and the second from the bottom at a position at which the outer rotor 20 is stopped, for a magnetic field to be generated. Here, because a region opposing the teeth 61 of the shifting magnet 25 which is the second from the bottom is spread, reversing a magnetic pole from an N-pole to an S-pole is completed.

Figure 20:
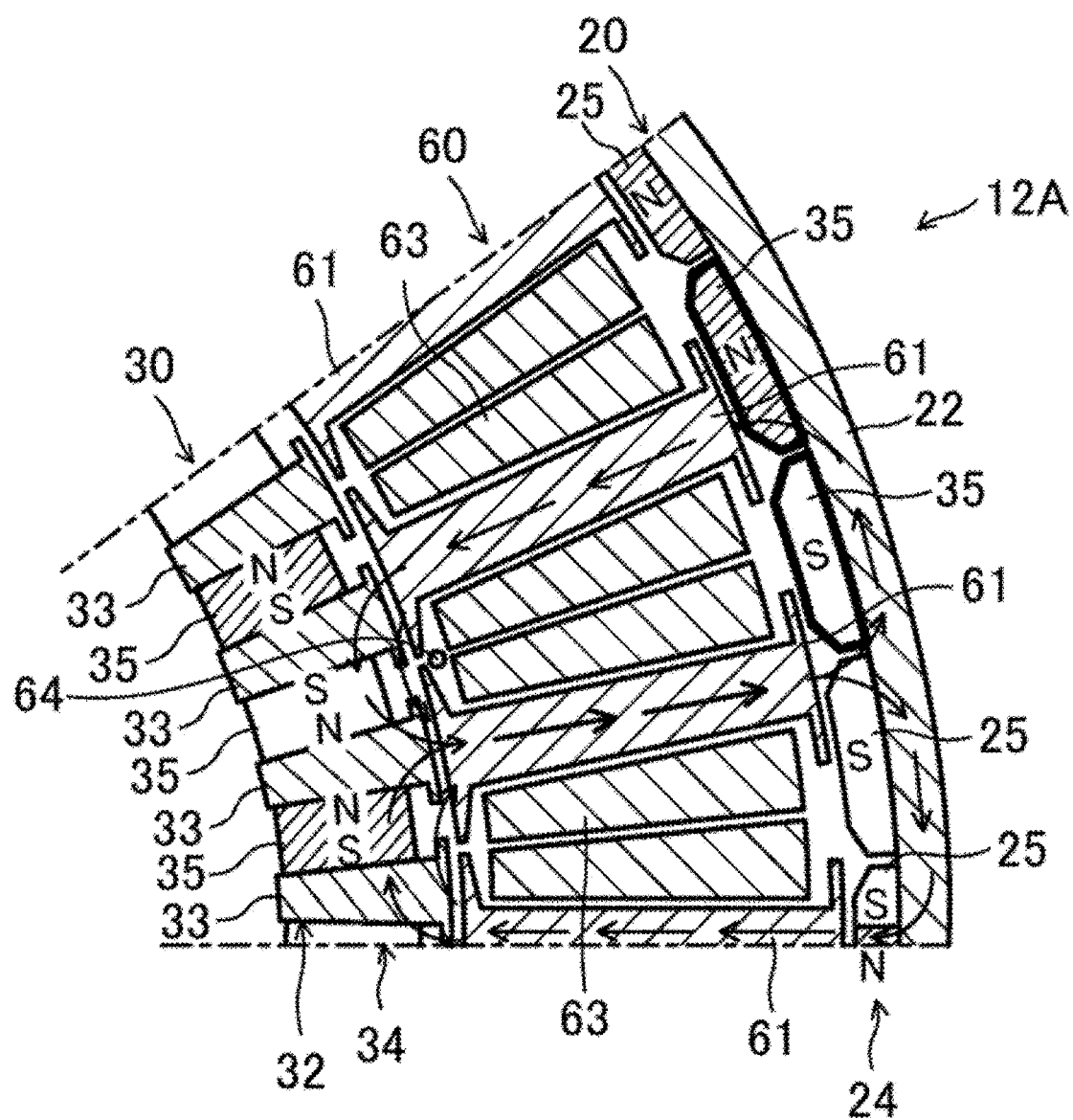

Then, as illustrated in the non-limiting example of FIG. 20, a position-determining current is applied to the coils 63 so that a magnetic force line indicated by arrows in FIG. 20 is formed in teeth 61, which are respectively the first, the second, and the third from the bottom, for a magnetic field to be generated. In this way, balance between magnetic poles of the outer rotor 20 and the inner rotor 30 opposing the teeth 61 is maintained, and the outer rotor 20 is stopped at a position illustrated in FIG. 20.

Figure 21:
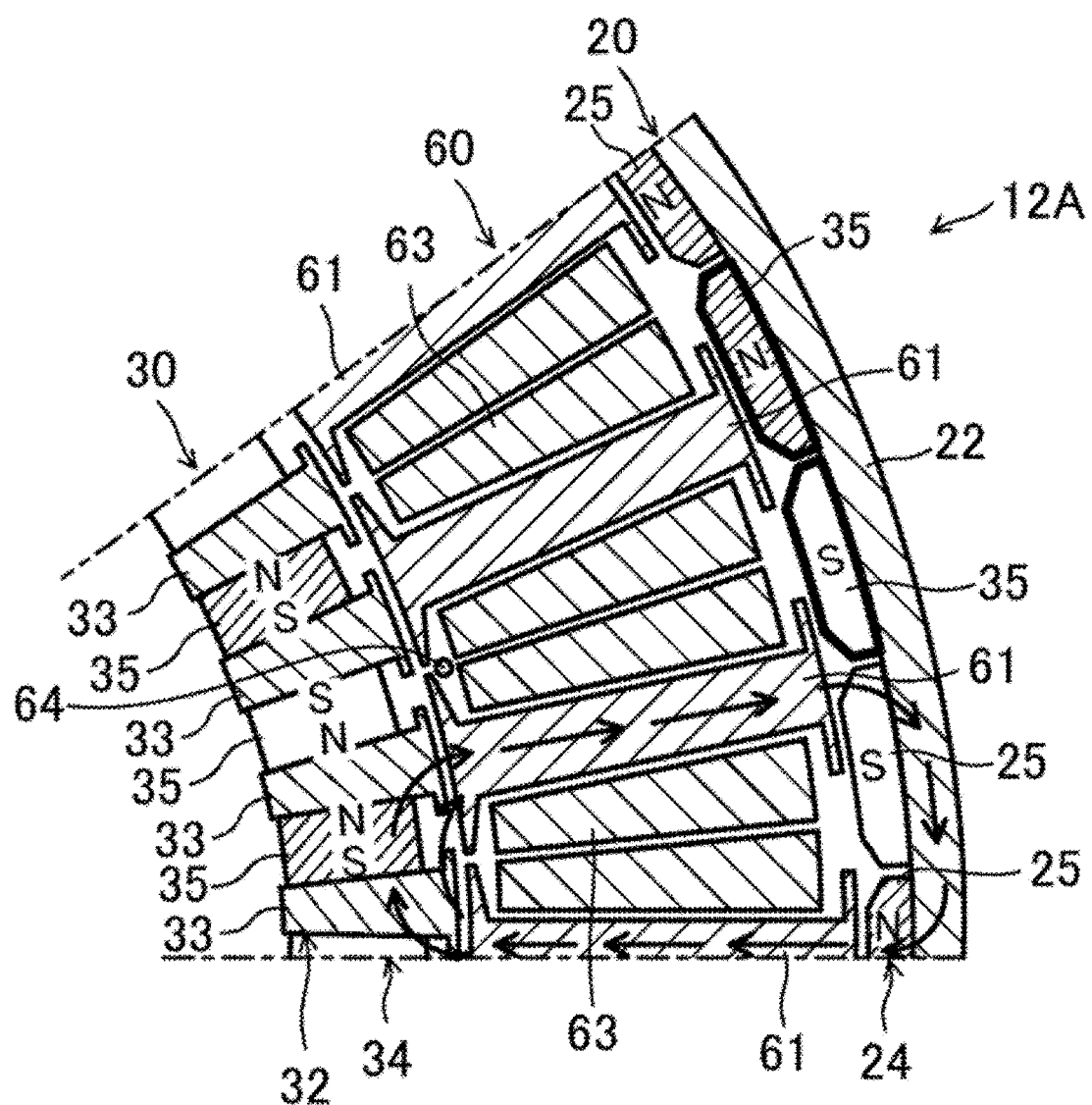

Then, as illustrated in FIG. 21, a magnetizing current is applied to the coils 63 so that a magnetic force line indicated by arrows in FIG. 21 is formed in a tooth 61 and a tooth 61, which are respectively the first and the second from the bottom at a position at which the outer rotor 20 is stopped, for a magnetic field to be generated. Here, because a region opposing the teeth 61 of the shifting magnet 25 which is the first from the bottom is spread, reversing a magnetic pole from an S-pole to an N-pole is completed.

<Application Prospect>

In the motor 12A according to certain embodiments of the present disclosure, although the magnetization process is performed while rotation of the outer rotor 20 is stopped, the magnetization process may also be performed while the outer rotor 20 is rotating at a low speed. In this case, the magnetization process may be performed one or more times before the start of the magnetization process (while the rotation is stopped), and then the remaining number of times of a partial magnetization process may be performed by rotating the outer rotor 20 at a low speed and changing relative positions of the teeth 61. That is, a magnetizing current may be applied at a time point at which the outer rotor 20, which is rotating at a low speed, should be magnetized. In this case, preferably, the magnetization process should be performed in the synchronous rotation mode.

According to some embodiments, a sensorless type position signal may be used or a position signal of the inner magnet 34 at the inner rotor 30-side by the position sensor 64 may be used for determining a position of the outer rotor 20. A processed position signal which is processed by, for example, averaging the inner rotor 30-side and the outer rotor 20-side, may also be used.

When the outer rotor 20 is rotating at a low speed, inertia moment of the outer rotor 20 may be used. Therefore, by using a position signal, a position of the shifting magnet 25 may be accurately determined even when the magnetization process is not completed. Also, it is effective because inertia moment may be used when all of the magnetization processes are performed during rotation of the outer rotor 20 while a change in the rotation of the outer rotor 20 is determined by rotation control by the control device 15.

Figure 22:
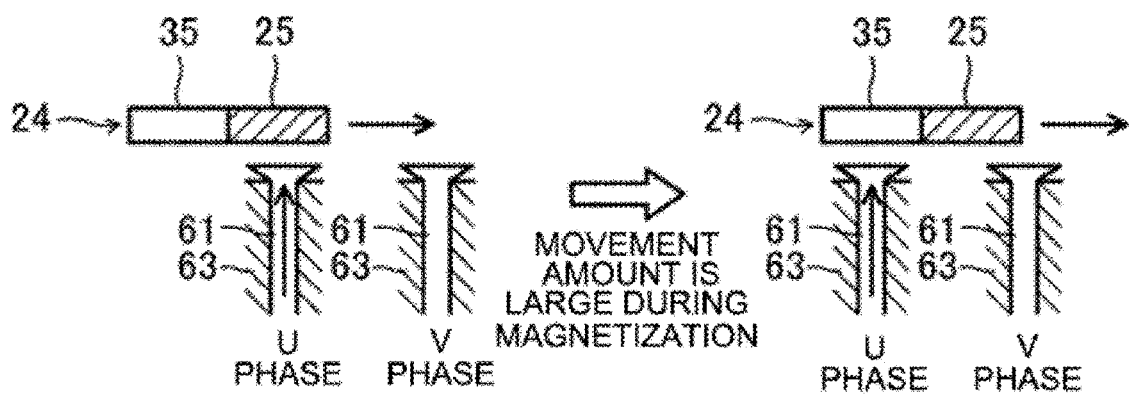
FIG. 22 illustrates a positional relationship between the shifting magnets and teeth of a motor according to certain embodiments of the present disclosure when a current-carrying phase is not shifted.

However, when the magnetization process is performed during rotation of the outer rotor 20, preferably, a current-carrying phase is shifted in accordance with movement of the outer rotor 20. FIG. 22 is a view illustrating a positional relationship between the shifting magnets and teeth when a current-carrying phase is not shifted. According to some embodiments in which magnetization is performed using only the teeth 61 in the U-phase, when a speed of rotation of the outer rotor 20 is high with respect to time in which a magnetizing current is conducted, as illustrated in the non-limiting example of FIG. 22, positions of the teeth 61 with respect to the shifting magnets 25 may be misaligned, and a proper magnetization process may not be performed. Although decreasing the speed of rotation of the outer rotor 20 may be taken into consideration, this is not preferable because this deteriorates the effect of the inertia moment of the outer rotor 20 and causes a decrease in positional precision or an increase in change in magnetization.

Figure 23:
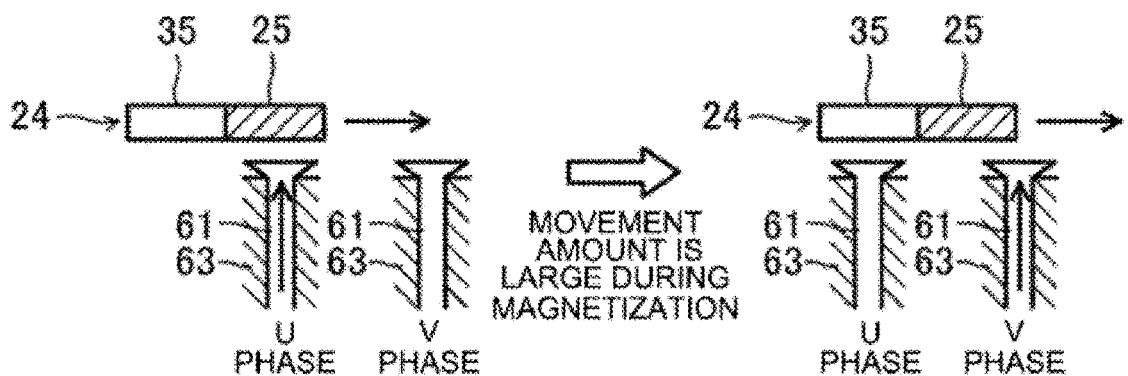
FIG. 23 illustrates a positional relationship between the shifting magnets and the teeth of a motor according to some embodiments of this disclosure when the current-carrying phase is shifted.

According to certain embodiments, as illustrated in FIG. 23, the teeth 61 performing the magnetization process are shifted from the U-phase to the V-phase in accordance with a rotation amount of the outer rotor 20. In this case, the shifting magnets 25 subject to the magnetization process may be properly magnetized. FIG. 23 illustrates, according to certain embodiments of this disclosure, a positional relationship between the shifting magnets and the teeth when the current-carrying phase is shifted.

In the non-limiting example of FIG. 23, a current-carrying phase during magnetization is performed by setting an initial phase of the outer rotor 20 as an initial value and adding a movement amount of the shifting magnet 25 to the initial value.

According to certain embodiments, an initial value of the initial phase refers to a current phase when a magnetizing current is applied. For example, an initial value when magnetizing in the U-phase is 0°+offset amount, an initial value when magnetizing in the W-phase is −120°+offset amount, and an initial value when magnetizing in the U-phase is 0°+offset amount, an initial value when magnetizing in the V-phase is 120°+offset amount. The offset amount refers to a parameter for adjusting a magnetizing current to reach a peak when the shifting magnet 25 is at a desired position.

However, to shift the number of magnetic poles by reversing a magnetic pole of the shifting magnet 25, positions of the shifting magnet 25 and the fixing magnet 35 are required to be determined. Consequently, in the motor 12A according to certain embodiments of the present disclosure, a position sensor or the magnetic sensor 65 is used as a magnet discriminator.

Figure 24:
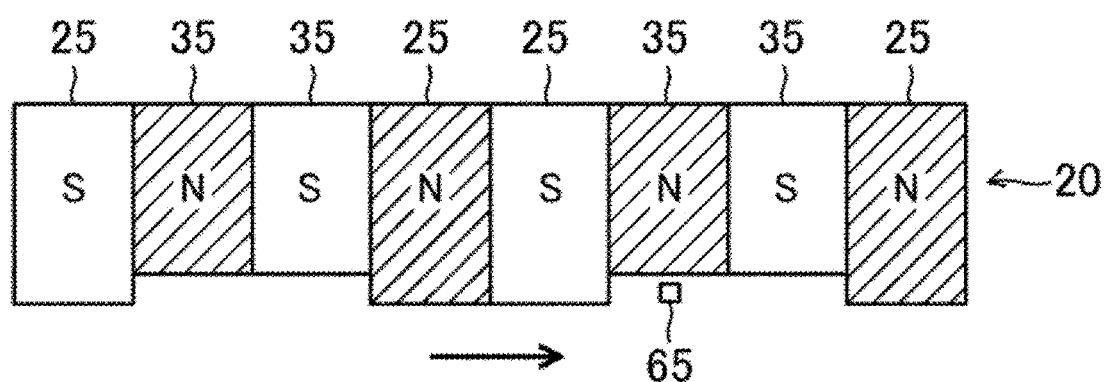
FIG. 24 illustrates a position of a magnetic sensor with respect to the shifting magnets and the fixing magnets according to certain embodiments of the present disclosure.

FIG. 24 illustrates aspects of a motor according to certain embodiments of this disclosure, and in particular, a position of a magnetic sensor with respect to the shifting magnets and the fixing magnets. As illustrated in FIG. 24, in the outer rotor 20, a group of two adjacent shifting magnets 25 and a group of two adjacent fixing magnets 35 are alternately arranged in the circumferential direction. A lower end of the shifting magnet 25 extends further downward than a lower end of the fixing magnet 35. That is, a length of the shifting magnet 25 is longer than that of the fixing magnet 35.

The magnetic sensor 65 is, in some embodiments, disposed opposite a portion of the shifting magnet 25 longer than the fixing magnet 35. For example, the magnetic sensor 65 is fixed to the stator 60 or other structures.

Figure 25:
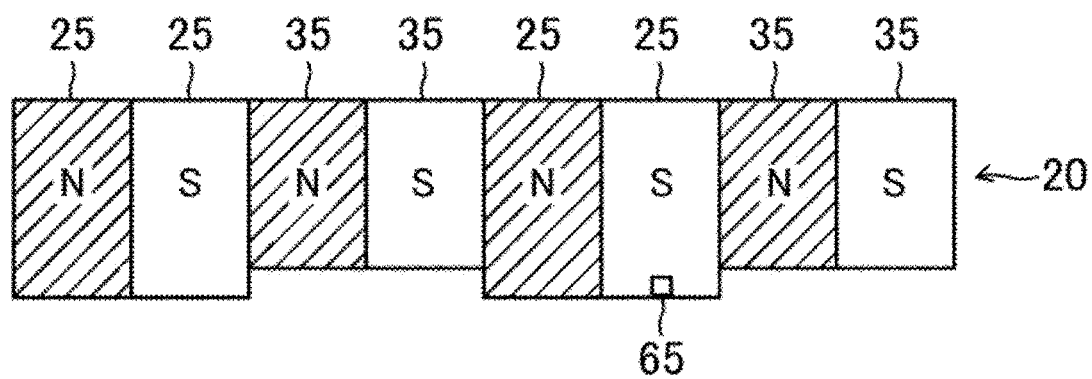
FIG. 25 illustrates a motor according to certain embodiments of the present disclosure in a state in which a shifting magnet is detected by the magnetic sensor.

At the position of the outer rotor 20 illustrated in FIG. 24, the magnetic sensor 65 is located below the fixing magnet 35. Here, when the outer rotor 20 rotates, as illustrated in FIG. 25, the magnetic sensor 65 opposes the shifting magnet 25 and receives a signal that is different from that in the state illustrated in FIG. 24. FIG. 25 illustrates a motor according to certain embodiments of this disclosure in a state in which a shifting magnet is detected by the magnetic sensor. The shifting magnet 25 and the fixing magnet 35 may be discriminated by the magnetic sensor 65 on the basis of the different signal. In the non-limiting example of FIG. 25, control device 15 controls rotations of the outer rotor 20 and the inner rotor 30 on the basis of the position of the fixing magnet 35.

The magnetic sensor 65 may, according to certain embodiments, be disposed at any one of outward or inward sides from the outer rotor 20. The same function may be obtained even when the magnetic sensor 65 is disposed at an end surface. The magnets may be discriminated by identically disposing the magnetic sensor 65 even in a structure in which the shifting magnet 25 is disposed at the inner rotor 30-side.

Although the shifting magnet 25 and the fixing magnet 35 may be discriminated using the magnetic sensor 65 by changing the lengths of the shifting magnet 25 and the fixing magnet 35, embodiments of the present disclosure are not limited thereto. For example, a magnetizing operation may be performed so that a magnetic force of the shifting magnet 25 is temporarily reduced, the position of the shifting magnet 25 may be determined on the basis of the change in the magnetic force, and the extent of magnetization may be restored to an original state.

Figure 26:
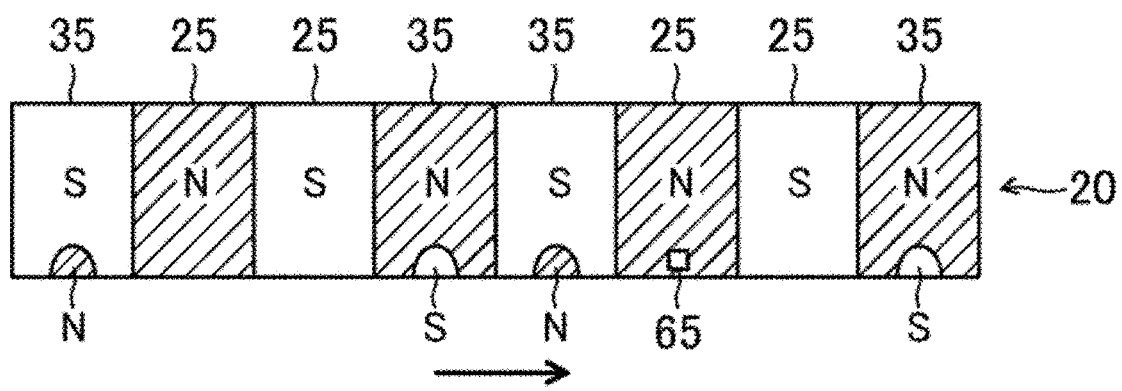
FIG. 26 illustrates a position of the magnetic sensor with respect to shifting magnets and fixing magnets according to certain embodiments of the present disclosure.
Figure 27:
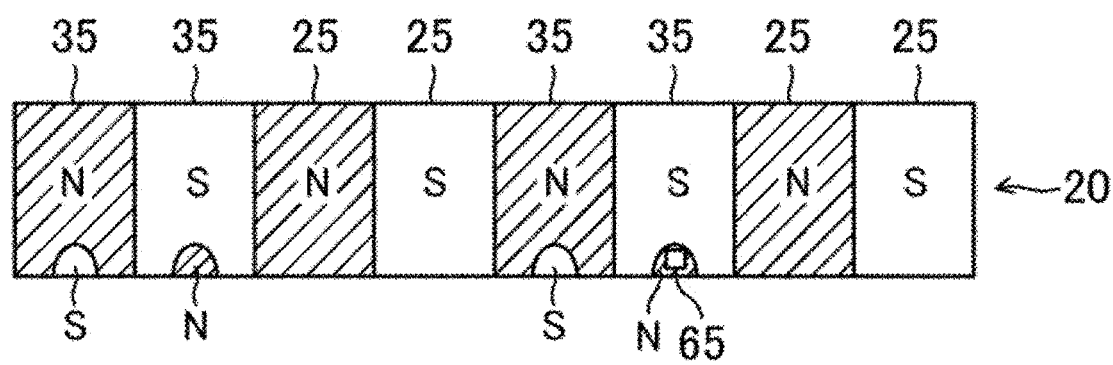
FIG. 27 illustrates a motor according to certain embodiments in a state in which a different-pole portion of a fixing magnet is detected using the magnetic sensor.

According to certain embodiments of the present disclosure, magnets may also be discriminated by changing magnetization states such as a magnetization amount and a magnetization shape of a portion opposing the magnetic sensor 65. FIG. 26 illustrates a non-limiting example of certain embodiments, in particular, in a position of the magnetic sensor with respect to shifting magnets and fixing magnets. As illustrated in the non-limiting example of FIG. 26, a different pole may be configured at a portion of the fixing magnet 35, and the magnetic sensor 65 may be disposed to oppose the different pole portion. Here, when the outer rotor 20 rotates, as illustrated in FIG. 27, because the magnetic sensor 65 opposes the different pole portion of the fixing magnet 35, a position of the fixing magnet 35 may be specified, and the shifting magnet 25 and the fixing magnet 35 may be discriminated by the magnetic sensor 65. FIG. 27 is a view illustrating a state of a motor according to certain embodiments in which a different-pole portion of a fixing magnet is detected using the magnetic sensor.

Although the outer magnets 24 include the shifting magnets 25 and the fixing magnets 35, all of the outer magnets 24 may be the shifting magnets 25. In this case, the number of magnetic poles may be shifted by reversing magnetic poles of any half of the shifting magnets 25. In this way, shifting of the number of magnetic poles may be performed regardless of the shifting magnets 25 and the fixing magnets 35.

Figure 28:
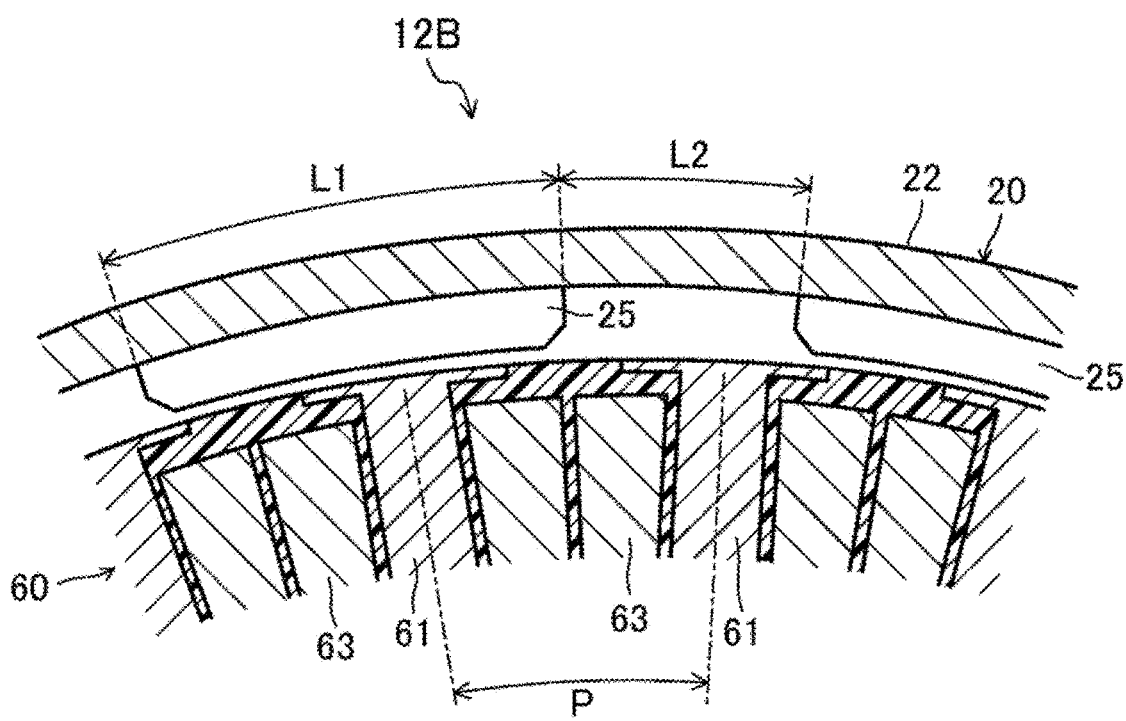
FIG. 28 illustrates part of a motor according some embodiments of this disclosure.

FIG. 28 illustrates part of a motor according to certain embodiments. As illustrated in FIG. 28, the outer rotor 20 of a motor 12B according to certain embodiments is a consequent pole rotor. The numbers of poles of the stator 60, the inner rotor 30, and the outer rotor 20 are also the same as in the above-described embodiment (the ratio of the magnetic poles, St:Mi:Mo, is 3:4:4 or 3:4:2).

Consequently, sixteen outer magnets 24 (all of them are the shifting magnets 25) are, in the non-limiting example of FIG. 28 disposed at predetermined intervals in the circumferential direction at the inner surface of the rotor yoke 22. In the motor 12B according to Modified Embodiment 2, a circumferential length of the shifting magnet 25 is longer.

According to certain embodiments, a circumferential length L1 of the shifting magnet 25 is longer than a length L2 between two adjacent shifting magnets 25, and a ratio therebetween, L1:L2, is about 2:1. Also, the circumferential length L1 of the shifting magnet 25 is larger than a pitch P at an outer flange portion 61b of two adjacent teeth 61 and 61 opposing the shifting magnet 25.

According to some embodiments wherein the circumferential length L1 of the shifting magnet 25 being larger as above, torque when the outer rotor 20 is rotated in the counter rotation mode may be higher in comparison to the motor 12 of the above-described embodiment. As a result, a stirring force in a washing process may be improved, and washing performance may be improved.

However, when the circumferential length L1 of the shifting magnet 25 is larger as above, magnetic poles of the entire shifting magnets 25 may not be shifted by the magnetization process performed one time. Consequently, in this case, as in the motor 12A according to certain embodiments as described herein, the magnetization process may be required to be performed several times.

According to certain embodiments of the present disclosure, a large amount of time may be required for shifting the number of magnetic poles when the magnetization process is performed while the rotation of the outer rotor 20 is stopped. Depending on embodiments, performing the magnetization process during the operation of the motor 12B may be practically difficult. Consequently, in the motor 12B according to certain embodiments, for the number of magnetic poles to be shifted within short time, the magnetization process is performed several times while the outer rotor 20 is simultaneously rotating with the inner rotor 30, on the basis of the application prospect of the motor 12A of Modified Embodiment 1 described above.

<Operation Example of Washing Machine>

Figure 29:
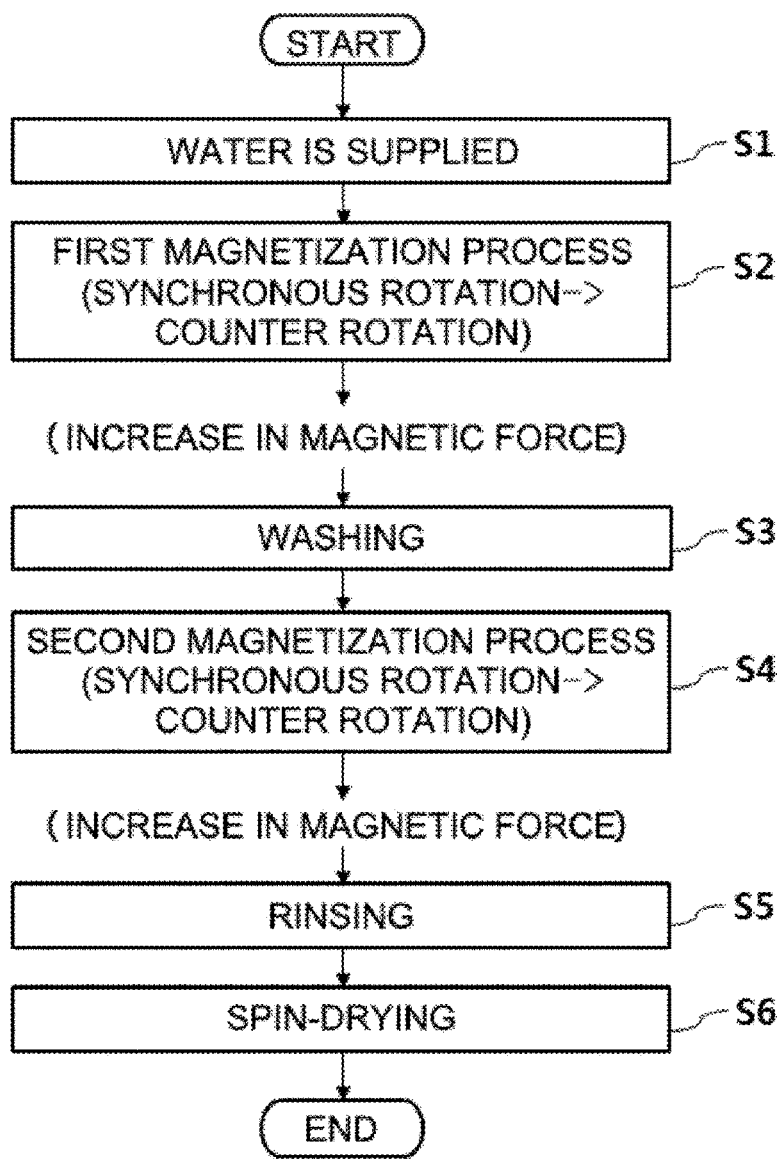
FIG. 29 illustrates operations of a washing machine using the motor certain embodiments of the present disclosure.

FIG. 29 illustrates, in flowchart format, operations of a basic method of operating a washing machine using the motor according to certain embodiments of the present disclosure. Prior to operation of the washing machine 1, a user puts laundry and detergent in the spin-dry tub 11. The cover 3 is locked after being closed. In this state, when a washing command is generated by the user's manipulation, the washing machine 1 begins operating.

When operation of the washing machine 1 begins, water is supplied to the laundry tub 10 and the spin-dry tub 11 until a predetermined water amount (generally, an extent to which laundry is submerged in water) is reached (S1). Then, the control device 15 controls the motor 12B and performs a first magnetization process (a process in which the synchronous rotation mode is shifted to the counter rotation mode) (S2). After the first magnetization process, a magnetic force-increasing process may be performed.

After the mode of the motor 12B is shifted to the counter rotation mode by the first magnetization process, a washing process is performed (S3). Specifically, the motor 12B operates by a predetermined operating current, the spin-dry tub 11 and the pulsator 13 rotate in reverse directions, and the laundry is stirred.

When the washing process is completed, water is drained, and the control device 15 controls the motor 12B and performs a second magnetization process (a process in which the counter rotation mode is shifted to the synchronous rotation mode) (S4). After the second magnetization process, the magnetic force-increasing process may be performed.

When the mode of the motor 12B is shifted to the synchronous rotation mode by the second magnetization process, a rinsing process is performed (S5). In the rinsing process, like the washing process, when water is supplied to the laundry tub 10 and the spin-dry tub 11, and a predetermined amount of water is stored therein, the motor 12B is operated by a predetermined operating current such that the spin-dry tub 11 and the pulsator 13 rotate at a low speed in the same direction for a predetermined amount of time, and the laundry is stirred. The rinsing process may be repeatedly performed several times.

When the rinsing process is completed, a spin-drying process is performed (S6). In the spin-drying process, the spin-dry tub 11 and the pulsator 13 are rotated at a higher speed in comparison to the rinsing process for a predetermined amount of time. In this way, water included in the laundry is spin-dried by an action of a centrifugal force and then drained through the drain pipe 17. When the spin-drying process is completed, the user is notified of the stop of the operation by a buzzer and the like, the locked cover 3 is unlocked, and the operation of the washing machine is finished.

<First Magnetization Process>

In the non-limiting example of FIG. 29, the first magnetization process is a process in which the synchronous rotation mode is shifted to the counter rotation mode. The shifting is stably performed within a short time.

According to embodiments, in the first magnetization process, a process (a reverse magnetization process) in which a magnetizing current that reverses a magnetic pole (a reverse magnetization current) is supplied to the shifting magnet 25 while the motor 12B is operated in the synchronous rotation mode, and the outer rotor 20 is simultaneously rotated with the inner rotor 30, is repeatedly performed several times.

In the non-limiting example of FIG. 29, the state in which the outer rotor 20 is simultaneously rotating with the inner rotor 30 refers to a state in which, when the inner rotor 30 (a rotor not corresponding to magnetization) is rotated by supply of a predetermined operating current, the outer rotor 20 is rotated due to action of the operating current.

In some embodiments, the first magnetization process is performed during operation of the washing machine 1, i.e., while the motor 12B is being operated. During the first magnetization process, laundry is placed in the spin-dry tub 11, and water is stored therein. Loads of the laundry and the water are acted on the pulsator 13 connected to the outer rotor 20. The loads of the laundry and the water are also acted on the spin-dry tub 11 connected to the inner rotor 30.

Consequently, because a large inertia moment acts on the outer rotor 20, even in the case of simultaneous rotations of the outer rotor 20 and the inner rotor 30, the rotations may be stably performed for a relatively long period. Because a reverse magnetization process may be performed over the long period, even when the reverse magnetization process is performed several times, the performance of the reverse magnetization process may be stable.

In some embodiments, a large torque is required for rotating the outer rotor 20.

Unlike the case in which the counter rotation mode is shifted to the synchronous rotation mode, in the case in which the synchronous rotation mode is shifted to the counter rotation mode, it is not easy to stably shift the mode. That is, although there is no problem when magnetic poles of all of the shifting magnets 25 may be shifted in optimal states by the reverse magnetization process performed one time, as described above, in the case of the motor 12B, the reverse magnetization process should be performed several times.

According to certain embodiments, while the reverse magnetization process is being performed, a halfway state in which magnetic poles of some of the shifting magnets 25 are reversed is reached. In this state, because a magnetic force is offset, the magnetic force of the shifting magnets 25 are weakened. When the magnetic force of the shifting magnets 25 are weakened, even when an operating current is flowed and the outer rotor 20 is rotated, only low torque may be obtained. Consequently, in the halfway state in which the magnetic poles of some of the shifting magnets 25 are reversed, when the rotation of the outer rotor 20 stops, the outer rotor 20 may not be able to be rotated. Consequently, the reverse magnetization process should be performed while the inner rotor 30, which is the main rotor, is rotated at a low speed, and the magnetic force of the shifting magnets 25 should be strengthened until the outer rotor 20, which is the sub-rotor, is unable to simultaneously rotate with the inner rotor 30.

According to certain embodiments, when the motor 12B is in a state of the counter rotation mode in which magnetization of the shifting magnets 25 is weak, the outer rotor 20 may be simultaneously rotated with the inner rotor 30. Consequently, in the motor 12B according to certain embodiments of the present disclosure, the magnetization process is performed several times and magnetic poles are reversed in stages while the outer rotor 20 is simultaneously rotating with the inner rotor 30, in order for the state of the counter rotation mode to be gradually strengthened.

In the case of the motor 12B according to some embodiments described herein, the reverse magnetization process is performed by repeating a process of supplying the reverse magnetization current to other portions of the shifting magnets 25 (a partial reverse magnetization process) several times. In this way, the shifting magnets 25, when the mode is shifted to the counter rotation mode, may be in a more suitable magnetization state, and the organic voltage may be considerably increased.

Figure 30:
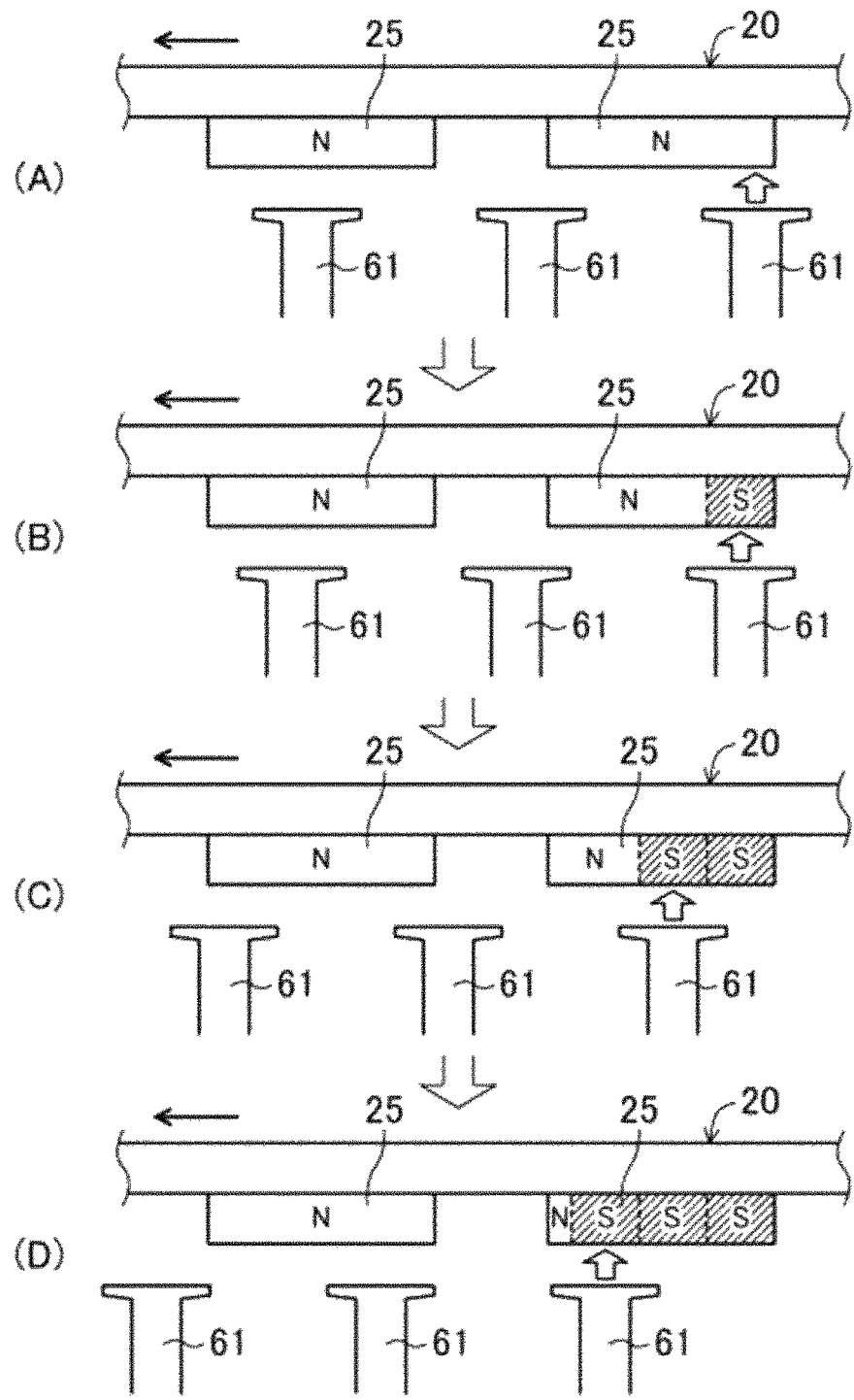
FIG. 30 illustrates a sequence of a first magnetization process of the motor according to certain embodiments.

The first magnetization process according to certain embodiments of the present disclosure will be described in detail with reference to FIGS. 30 and 31. FIG. 30 illustrates steps of a sequence of a first magnetization process of the motor according to certain embodiments. FIG. illustrates steps of a method of the first magnetization process of the motor according to some embodiments.

Figure 31:
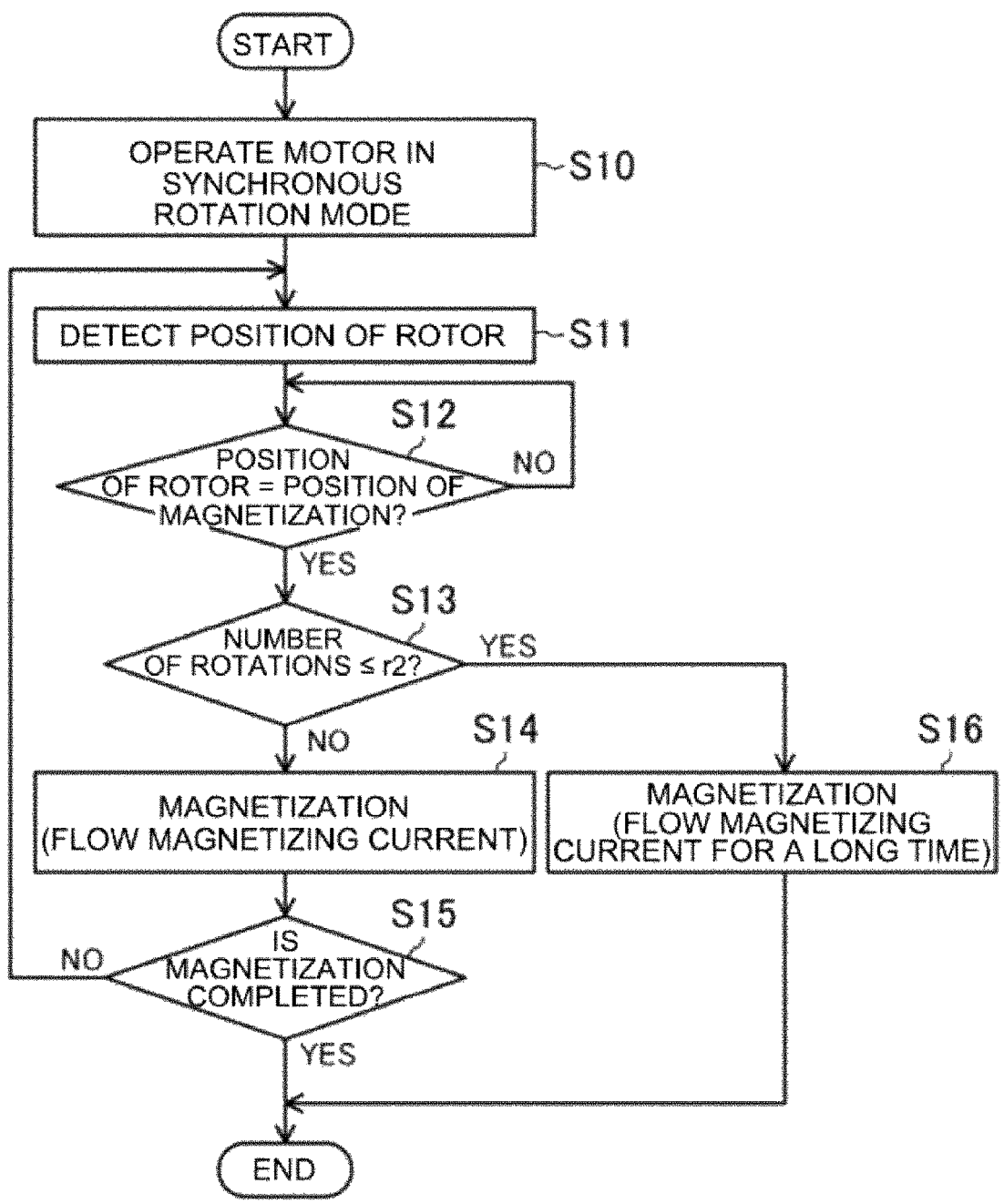
FIG. 31 illustrates a method of the first magnetization process of a motor according to certain embodiments of this disclosure.

First, as illustrated in the non-limiting example of FIG. 31, when the first magnetization process begins, the control device 15 supplies an operating current to the motor 12B and operates the motor 12B in the synchronous rotation mode (S10). The control device 15 supplies a controlled operating current to the motor 12B so that the inner rotor 30, which is the main rotor, rotates with a predetermined number of rotations r1 (for example, 50 rpm). In this way, the outer rotor 20 simultaneously rotates with the inner rotor 30, with a number of rotations almost equal to that of the inner rotor 30 in the same direction as the inner rotor 30.

According to certain embodiments, control device 15 detects the position of the outer rotor 20, specifically, the position of the shifting magnet 25 subject to shifting (S11). For detecting the position, various means such as the above-described position sensor 64, the magnetic sensor 65, a hall integrated circuit (IC) attached to the motor 12B, and magnetic flux estimation from a current waveform of the motor 12B may be used.

The control device 15 detects a timing at which the outer rotor 20 is located at a predetermined magnetization position with respect to the teeth 61 performing magnetization during simultaneous rotation of the outer rotor 20 with the inner rotor 30 (S12).

In some embodiments, the control device 15 determines, during the simultaneous rotation, whether the number of rotations of the outer rotor 20 is equal to or less than a predetermined number of rotations r2 (for example, 5 rpm) (S13). When the number of rotations of the outer rotor 20 exceeds the predetermined number of rotations r2 ("NO" to S13), the control device 15 supplies a pulse-form reverse magnetization current to predetermined teeth 61 at a specific timing and performs the partial reverse magnetization process (S14).

FIG. 30(A) illustrates, a state of a motor according to certain embodiments at a time point at which the partial reverse magnetization process is initially performed with respect to a certain shifting magnet 25. A thin arrow indicating the left side in FIG. 30 represents rotation of the outer rotor 20. In this non-limiting example, a partial reverse magnetization process is sequentially performed from one end (a rear end in a rotating direction) toward the other end in the circumferential direction of the shifting magnet 25. In the plurality of shifting magnets 25, the partial reverse magnetization process, which is the same as above, is performed either simultaneously or at different timings.

At the time point at which the outer rotor 20 simultaneously rotating with the inner rotor 30 is located at the position in shown in the non-limiting example of FIG. 30(A), the control device 15 supplies the reverse magnetization current (in the example in the drawing, a current that reverses an N-pole to an S-pole) to predetermined teeth 61 for about 3 seconds, for example. In this way, as in FIG. 30(B), an end of the shifting magnet 25 is magnetized, and a magnetic pole thereof is reversed.

According to certain embodiments, when the partial reverse magnetization process is performed from an end of the shifting magnet 25, because the shifting magnet 25 is not present at a rear side in a rotating direction thereof, a strong magnetic force that decelerates the simultaneous rotation is not generated. Here, the simultaneous rotation may be accelerated using a magnetic field formed by the reverse magnetization current supplied from the teeth 61. Consequently, the simultaneous rotation may be maintained for a longer period. Conversely, when the partial reverse magnetization process is performed at a middle portion of the shifting magnet 25, because the shifting magnet 25 is not present at the rear side in the rotating direction thereof, a strong magnetic force that decelerates the simultaneous rotation may be generated. Consequently, the simultaneous rotation may not necessarily be maintained for a long period.

When the magnetization state of the shifting magnet 25 is changed due to the partial reverse magnetization process, the position of the outer rotor r20 is unable to be detected with high precision. Thus, when the partial reverse magnetization process is completed ("NO" to S15), the process returns to S11, and the position of the outer rotor 20 is detected again.

According to certain embodiments, the control device 15 detects a timing at which the predetermined teeth 61 are located at a portion adjacent to an end at which a magnetic pole of the shifting magnet 25, which is subsequently subject to magnetization, is reversed. Then, the control device 15 supplies the reverse magnetization current to the predetermined teeth 61 at the detected timing. Accordingly, as illustrated in the non-limiting example marked as FIG. 30(C), a magnetic pole at a portion adjacent to the end, at which the magnetic pole of the shifting magnet 25 is reversed.

According to some embodiments, while the outer rotor 20 is simultaneously rotating with the inner rotor 30, the control device 15 repeatedly performs the partial reverse magnetization process which is the same as above (S11 to S14). For example, while the outer rotor 20 is simultaneously rotating with the inner rotor 30, the partial reverse magnetization process is performed 10 to 30 times. In this way, as illustrated in FIG. 30(D), the partial reverse magnetization process is performed for a wide region of each of the shifting magnets 25, and the reverse magnetization process is ended (S15).

In some embodiments, because the magnetic pole of the shifting magnet 25 is reversed in stages, unstable simultaneous rotation may be maintained for a long period while avoiding the risk of causing the outer rotor 20 to be out-of-phase. Because the partial reverse magnetization process is continuously performed while the outer rotor 20 is rotated, the reverse magnetization process may be completed within short time. Because time taken for washing is not excessively long, user convenience is not degraded.

When most of the magnetic poles of the shifting magnets 25 are reversed using the above method, high torque may be obtained through operation in the counter rotation mode. Consequently, by supplying an operating current, the outer rotor 20 may be rotated without causing the outer rotor 20 to be out-of-phase. When the outer rotor 20 may be stably rotated in the counter rotation mode, the partial reverse magnetization process may be easily performed on magnetic poles at an unprocessed portion as necessary, and a magnetic force of the shifting magnet 25 may also be easily increased.

According to certain embodiments, while the partial reverse magnetization process is being performed, when the number of rotations of the outer rotor 20 reaches the number of rotations r2 or less ("YES" to S13), the simultaneous rotation of the outer rotor 20 may be stopped before the reverse magnetization process is completed. When the simultaneous rotation of the outer rotor 20 stops while the magnetization state of the shifting magnet 25 is in the halfway state, because required torque is not obtained even when an operating current is supplied, the outer rotor 20 may be unable to rotate.

In some embodiments, when the number of rotations of the outer rotor 20 reaches the number of rotations r2 or less while the partial reverse magnetization process is being performed ("YES" to S13), the control device 15 forcibly ends the reverse magnetization process.

In the non-limiting example of FIG. 31, as the last partial reverse magnetization process, a magnetizing current is supplied for a longer period in comparison to a general partial reverse magnetization process, and a wide range of magnetic poles of the shifting magnets 25 are reversed (S16). In this way, because relatively high torque may be obtained when the outer rotor 20 is rotated in the counter rotation mode, the outer rotor 20 may be rotated without causing the outer rotor 20 to be out-of-phase.

According to certain embodiments, after the simultaneous rotation of the outer rotor 20 is stopped, the partial reverse magnetization process is performed on a portion in which magnetization is not completed while the outer rotor 20 is rotated in the counter rotation mode. The magnetic force-increasing process is performed as necessary, and an additional magnetization process is performed so that a magnetization state of each of the shifting magnets 25 is suitable for the counter rotation mode.

<Second Magnetization Process>

As described above, the second magnetization process is, according to certain embodiments, a process of shifting the counter rotation mode to the synchronous rotation mode. In comparison to the first magnetization process, the second magnetization process may be relatively easily performed. That is, because a magnetic pole in each of the shifting magnets 25 is shifted in a direction in which the outer rotor 20 rotates by an operation in the synchronous rotation mode, as the magnetic pole is shifted, the magnetization state in the counter rotation mode is weakened (the magnetization state in the synchronous rotation mode is strengthened). Consequently, in the state in which the magnetization state in the counter rotation mode is weakened, even when the outer rotor 20 is stopped, the outer rotor 20 may be easily rotated when operated in the synchronous rotation mode.

Figure 32:
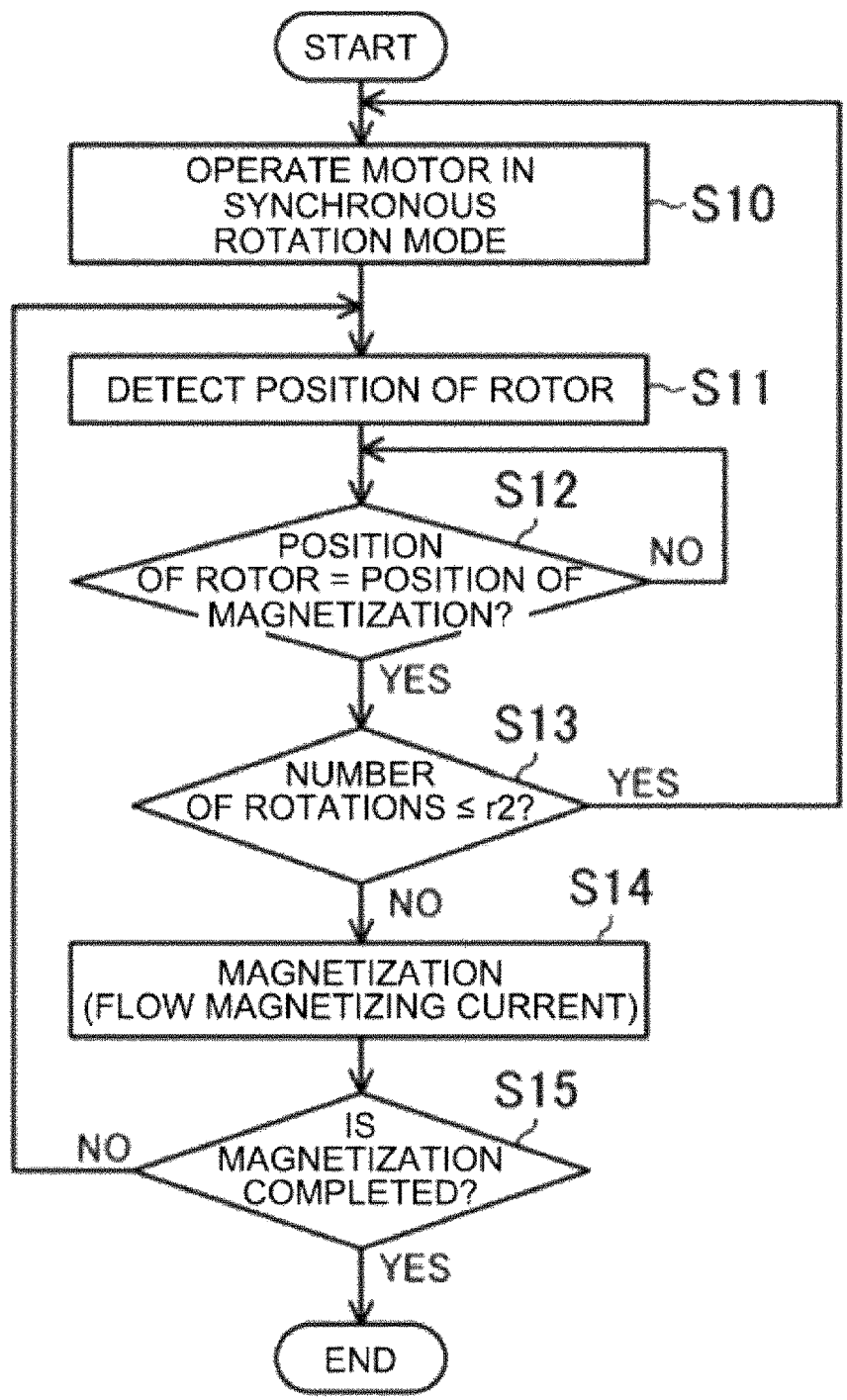
FIG. 32 illustrates aspects of a method of a second magnetization process of the motor according to certain embodiments of this disclosure.

The second magnetization process will be described in detail with reference to FIG. 32. FIG. 32 is a view illustrating a method of a second magnetization process of the motor according to Modified Embodiment 2. Main steps of the second magnetization process illustrated in FIG. 32 are the same as those in the first magnetization process. While the outer rotor 20 is simultaneously rotating with the inner rotor 30, the control device 15 repeatedly performs the partial reverse magnetization process in which the counter rotation mode is shifted to the synchronous rotation mode. Consequently, the same steps will be denoted by like reference numerals, descriptions thereof will be omitted, and other steps will be described.

In some embodiments, the reverse magnetization process is forcibly ended when the number of rotations of the outer rotor 20 is equal to or less than the number of rotations r2 in the first magnetization process illustrated in the non-limiting example of FIG. 31. However, in the second magnetization process, as illustrated in FIG. 32, because the outer rotor 20 may be easily rotated even when the outer rotor 20 is stopped while the partial reverse magnetization process is being performed, the reverse magnetization process is not required to be forcibly ended.

According to certain embodiments, when the number of rotations of the outer rotor 20 is equal to or less than the number of rotations r2 while the partial reverse magnetization process is being performed ("YES" to S13), the process returns to S10 and the operating current is supplied again to increase the number of rotations. In this way, the partial reverse magnetization process may be resumed.

The shifting from the counter rotation mode to the synchronous rotation mode can, according to certain embodiments, avoid problems of the shifting from the synchronous rotation mode to the counter rotation mode such as a decrease in torque and causing to be out-of-phase. Consequently, the second magnetization process may be relatively freely performed. In the second magnetization process, the position or the order in which the partial reverse magnetization process is performed may be properly changed according to specifications of the motor 12B.

Application Example 1 of Partial Reverse Magnetization Process

Figure 33:
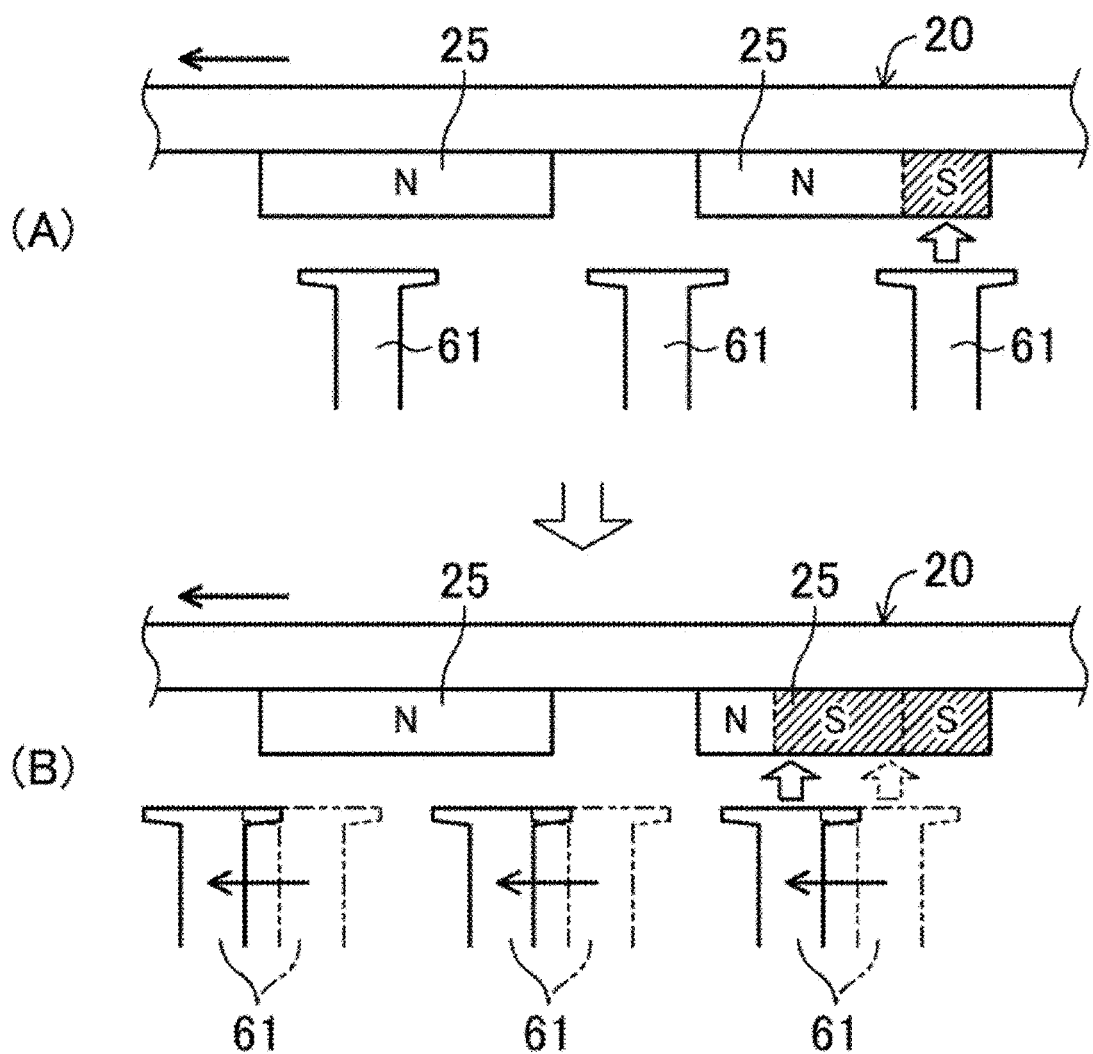
FIG. 33 illustrates operations of a sequence of a partial reverse magnetization process according to certain embodiments of this disclosure.

FIG. 33 illustrates a sequence of a partial reverse magnetization process according to certain embodiments.

According to certain embodiments, such as illustrated in FIG. 33, a long reverse magnetization process (long magnetization process) in which a length of time during which the magnetizing current is supplied is long and a short reverse magnetization process (short magnetization process) in which a length of time during which the magnetizing current is supplied is short are included, and the long magnetization process may be performed at a position closer to a central portion in the circumferential direction of the shifting magnets 25 in comparison to the short magnetization process.

As illustrated in the non-limiting example of FIG. 33(A), in the partial reverse magnetization process of according to certain embodiments, a first partial reverse magnetization process is performed at an end side in the circumferential direction of the shifting magnet 25. In a second or later partial reverse magnetization process, because a length of time during which the reverse magnetization current is supplied is long at a central portion in the circumferential direction of the shifting magnet 25, magnetic poles in a relatively wide region of the shifting magnet 25 are reversed as illustrated in FIG. 33(B) (corresponds to the long magnetization process).

In certain embodiments utilizing a short magnetization process, a reverse magnetization current having a triangular current waveform having a peak (a triangular-wave reverse magnetization current) is supplied, and in the long magnetization process, a reverse magnetization current having a trapezoidal current waveform in which a peak extends (a trapezoidal-wave reverse magnetization current) is supplied. The maximum value of the current is the same for both of the currents. In comparison to the above-described partial reverse magnetization process in which the control device 15 performs the partial reverse magnetization process with a plurality of triangular-wave reverse magnetization currents. According to certain embodiments, the partial reverse magnetization process is performed with a combination of a plurality of triangular-wave reverse magnetization currents and one or more trapezoidal-wave reverse magnetization currents.

In the central portion side in the circumferential direction of the shifting magnet 25, because the partial reverse magnetization process may be reliably performed on a target shifting magnet 25 even when a region in which the partial reverse magnetization process is widened as above, the number of times of performing the partial reverse magnetization process may be reduced.

In some embodiments, the partial reverse magnetization process described above may be effectively used when there is a concern that the simultaneous rotation of the outer rotor 20 may be stopped due to the partial reverse magnetization process when the synchronous rotation mode is shifted to the counter rotation mode.

Figure 34:
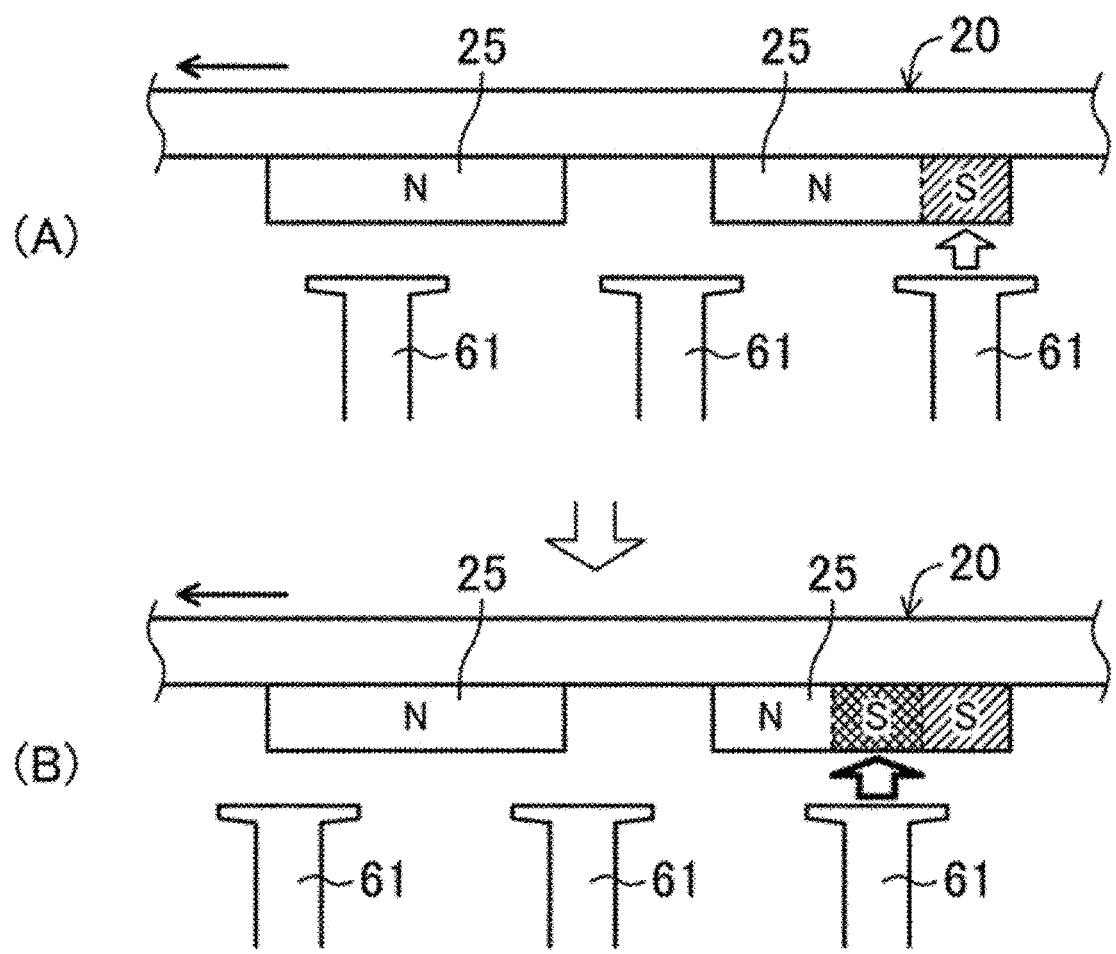
FIG. 34 illustrates operations of a sequence of a partial reverse magnetization process according to some embodiments of the instant disclosure.

FIG. 34 illustrates a sequence of a partial reverse magnetization process according to certain embodiments of the present disclosure.

In comparison to certain embodiments utilizing a partial reverse magnetization process in which lengths of reverse magnetization currents supplied by the partial reverse magnetization processes are substantially constant, in some embodiments, such as illustrated in FIG. 34, a reverse magnetization process (a strong magnetization process) in which the reverse magnetization current is large and a reverse magnetization process (a weak magnetization process) in which the reverse magnetization current is small, are included, and the weak magnetization process may be performed at a position closer to an end side in the circumferential direction of the shifting magnets 25 in comparison to the strong magnetization process.

In both embodiments utilizing the weak magnetization process and the strong magnetization process, a reverse magnetization current having a triangular current waveform having a peak (a triangular-wave reverse magnetization current) can be supplied. Depending on embodiments, a length of time during which the current is supplied is the same for both of the magnetization processes, and the peak in the strong magnetization process is higher (larger) than the peak in the weak magnetization process.

Figure 35:
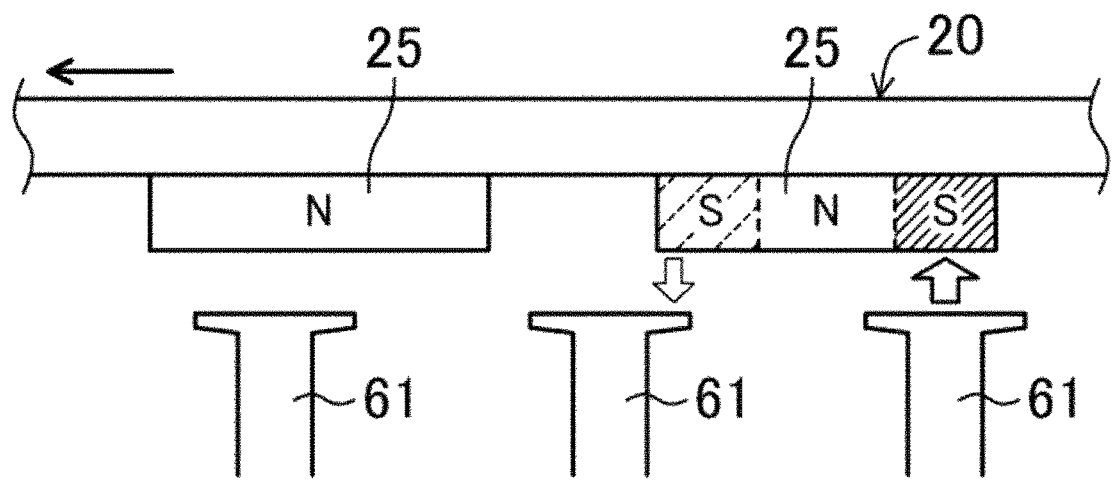
FIG. 35 illustrates aspects of the partial reverse magnetization process according to some embodiments of the present disclosure.

According to certain embodiments, because the length in the circumferential direction of the shifting magnet 25 is large, when the teeth 61 performing the magnetization process performs the reverse magnetization process on one end of the shifting magnet 25, as illustrated in the non-limiting example of FIG. 35, teeth 61 adjacent to the above teeth 61 are disposed in the vicinity of the other end of the shifting magnet 25. FIG. 35 illustrates aspects of a partial reverse magnetization process according to certain embodiments.

In some embodiments, when a reverse magnetization current that reverses an N-pole to an S-pole is supplied to the teeth 61 for the reverse magnetization process to be performed on the one end of the shifting magnet 25, the other end of the shifting magnet 25 tends to be magnetized toward the N-pole due to the action of the supplied reverse magnetization current. Consequently, when the other end of the shifting magnet 25 has the N-pole, the magnetic force is increased, and there is no problem. However, when the other end of the shifting magnet 25 has the S-pole the magnetic force may be reduced.

Consequently, as illustrated in the non-limiting example of FIG. 34(A) described above, like the above-described partial reverse magnetization process, in certain embodiments utilizing a partial reverse magnetization process, a first partial reverse magnetization process is performed at an end side in the circumferential direction of the shifting magnet 25 (corresponds to the weak magnetization process). In a second or later partial reverse magnetization process, because the reverse magnetization current is large at a central portion in the circumferential direction of the shifting magnet 25, magnetic poles in a central region of the shifting magnet 25 are strongly reversed, such as illustrated in FIG. 34(B) (corresponds to the strong magnetization process).

According to certain embodiments, in the central portion side in the circumferential direction of the shifting magnet 25, other portions are not negatively affected even when the partial reverse magnetization process is strengthened. Because the magnetic force of the shifting magnet 25 is increased, the organic voltage is increased, and high torque is obtained. Thus, the outer rotor 20 may be stably rotated.

Although embodiments in which the shifting magnet 25 is partially reversely magnetized in the motor 12B have been described above, in other embodiments, each of the shifting magnets 25 may be reversely magnetized in stages while the outer rotor 20 is simultaneously rotating with the inner rotor 30.

Figure 36:
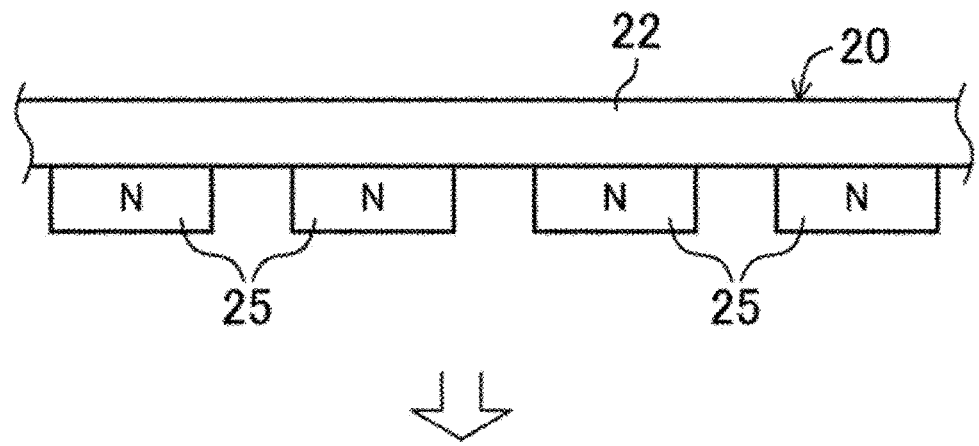
FIG. 36 illustrates aspects of a sequence of a reverse magnetization process according to some embodiments of this disclosure.
Figure 36:
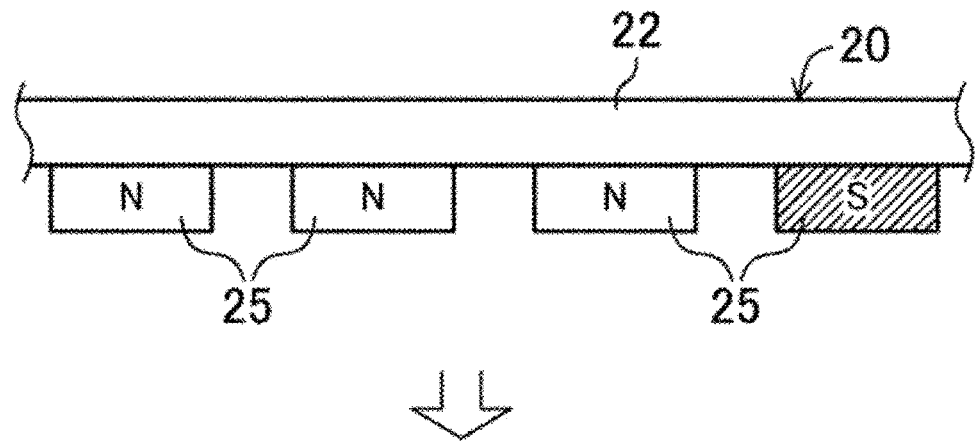
Figure 36:
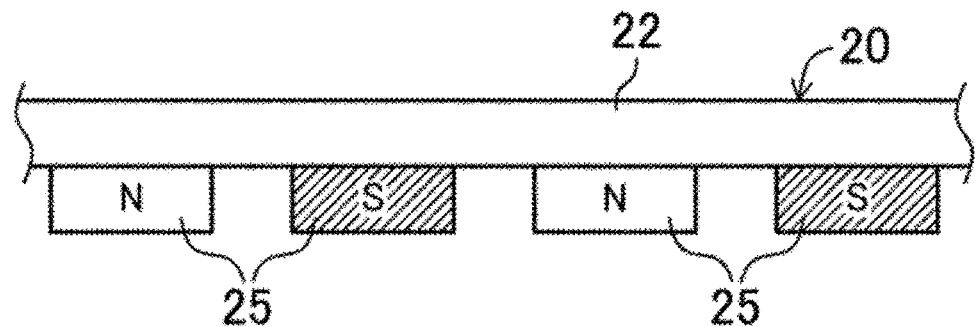

Specifically, as illustrated in the illustrative examples of FIGS. 36(A), 36(B), and 36(C), entire magnetic poles of a single shifting magnet 25 subject to the reverse magnetization process are reversed by the reverse magnetization process performed one time. The number of magnetic poles is shifted by repeatedly performing the above process while the outer rotor 20 simultaneously rotates with the inner rotor 30. FIG. 36 is a view illustrating a sequence of a reverse magnetization process according to certain embodiments of the present disclosure.

Figure 37:
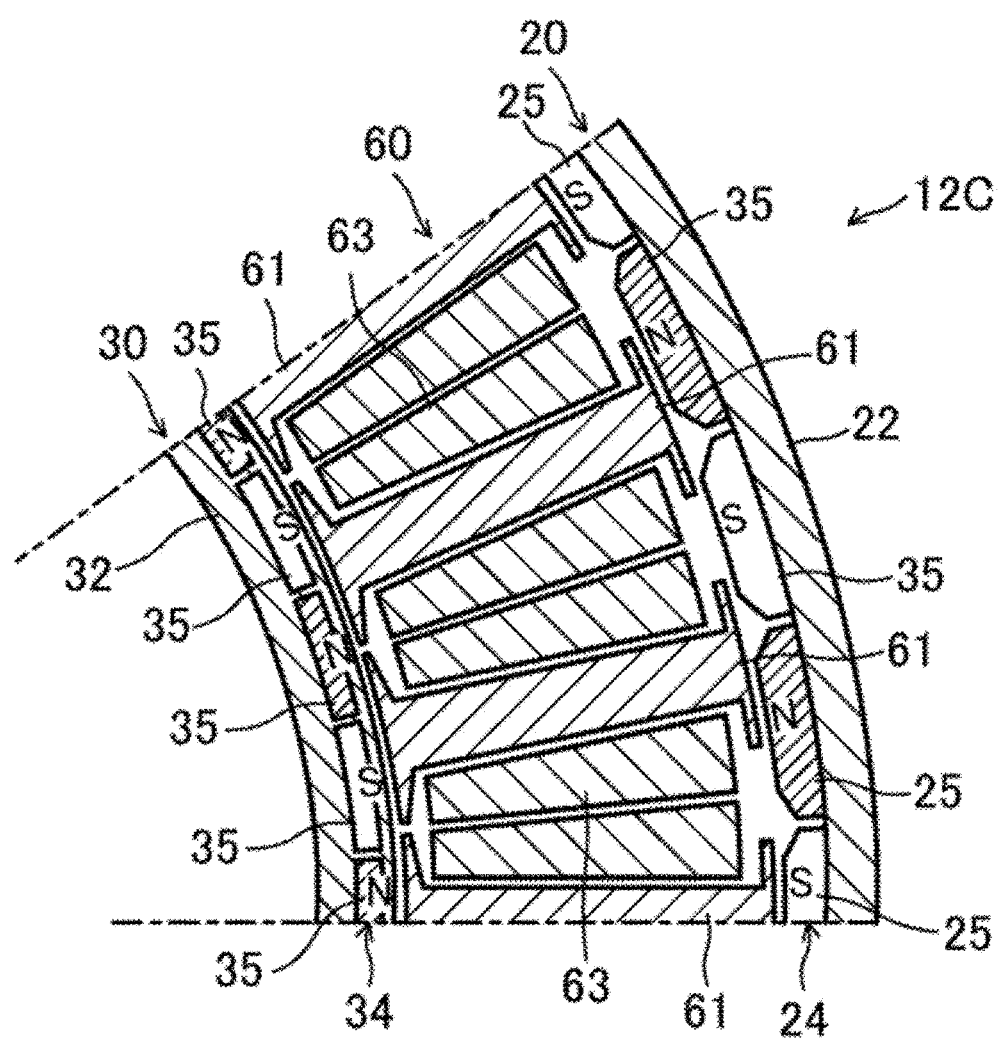
FIG. 37 illustrates a structure of a motor according to some embodiments of this disclosure.

FIG. 37 illustrating a structure of a motor according certain embodiments. As illustrated in the non-limiting example of FIG. 37, the inner rotor 30 is a buried type surface permanent magnet (SPM) type rotor, has the inner magnets 34 disposed so that S-poles and N-poles are alternately arranged in the circumferential direction, and is buried in the inner peripheral wall 32. In some embodiments, all of the inner magnets 34 are the fixing magnets 35.

According to some embodiments, the outer rotor 20 is an SPM type rotor, has thirty-two outer magnets 24 disposed so that S-poles and N-poles are alternately arranged in the circumferential direction, and is fixed to the inner surface of the rotor yoke 22. The outer magnets 24 include the shifting magnets 25 and the fixing magnets 35. Because the arrangement thereof is the same as that in the motor 12A according to certain embodiments previously discussed herein, description thereof will be omitted.

Figure 38:
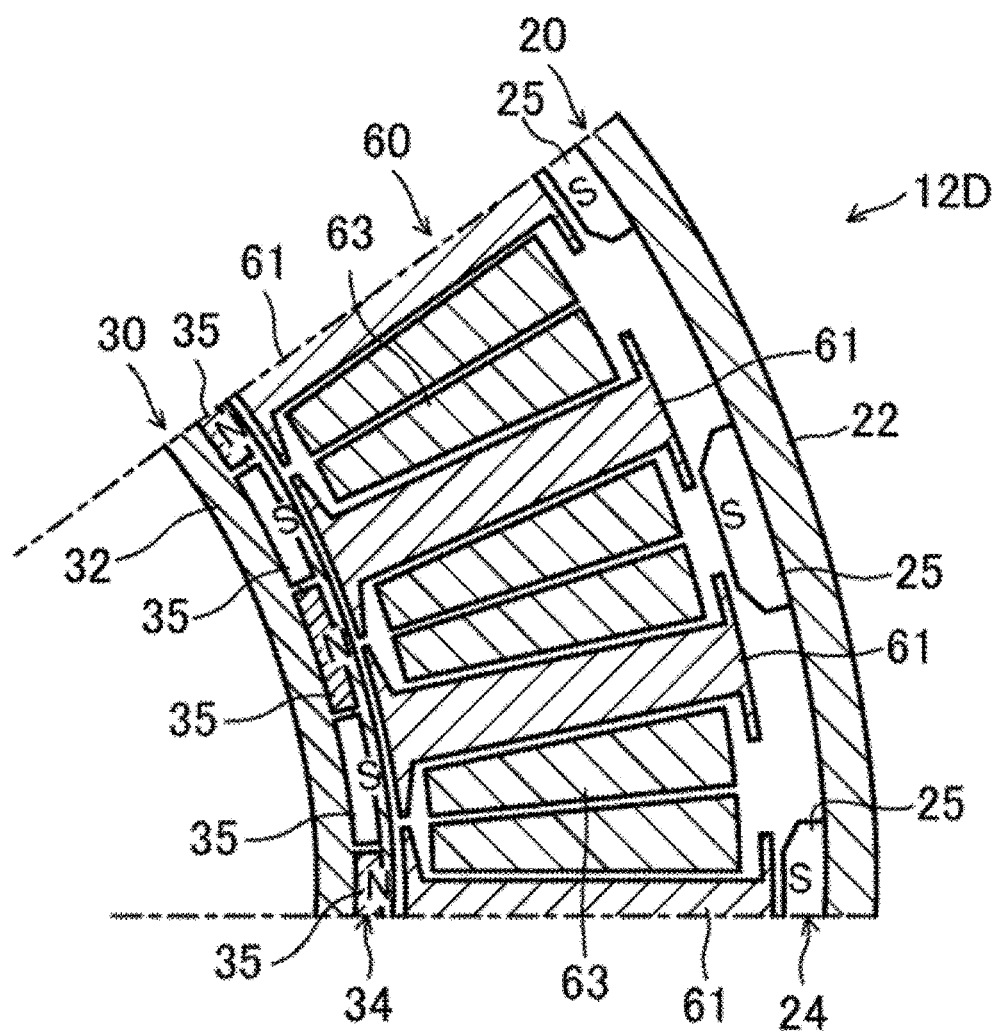
FIG. 38 illustrates a structure of a motor according to certain embodiments of the current disclosure.

FIG. 38 illustrates a structure of a motor according to certain embodiments of the present disclosure. As illustrated in the non-limiting example of FIG. 38, the inner rotor 30 is a buried type SPM type rotor, has thirty-two inner magnets 34 disposed so that S-poles and N-poles are alternately arranged in the circumferential direction, and is buried in the inner peripheral wall 32. All of the inner magnets 34 are the fixing magnets 35.

In some embodiments, the outer rotor 20 is a consequent pole rotor, has sixteen outer magnets 24 disposed so that S-poles are arranged at predetermined intervals in the circumferential direction, and is fixed to the inner surface of the rotor yoke 22. In the nonlimiting example of FIG. 38, all of the outer magnets 24 are the shifting magnets 25, the number of magnetic poles of the outer rotor 20 may be shifted to be 16 or 32 by reversing the magnetic poles of the shifting magnets 25. Because the operation of reversing the magnetic poles of the shifting magnets 25 is, in this example, the same as that in the motor 12 according to the above embodiment, description thereof will be omitted.

Figure 39:
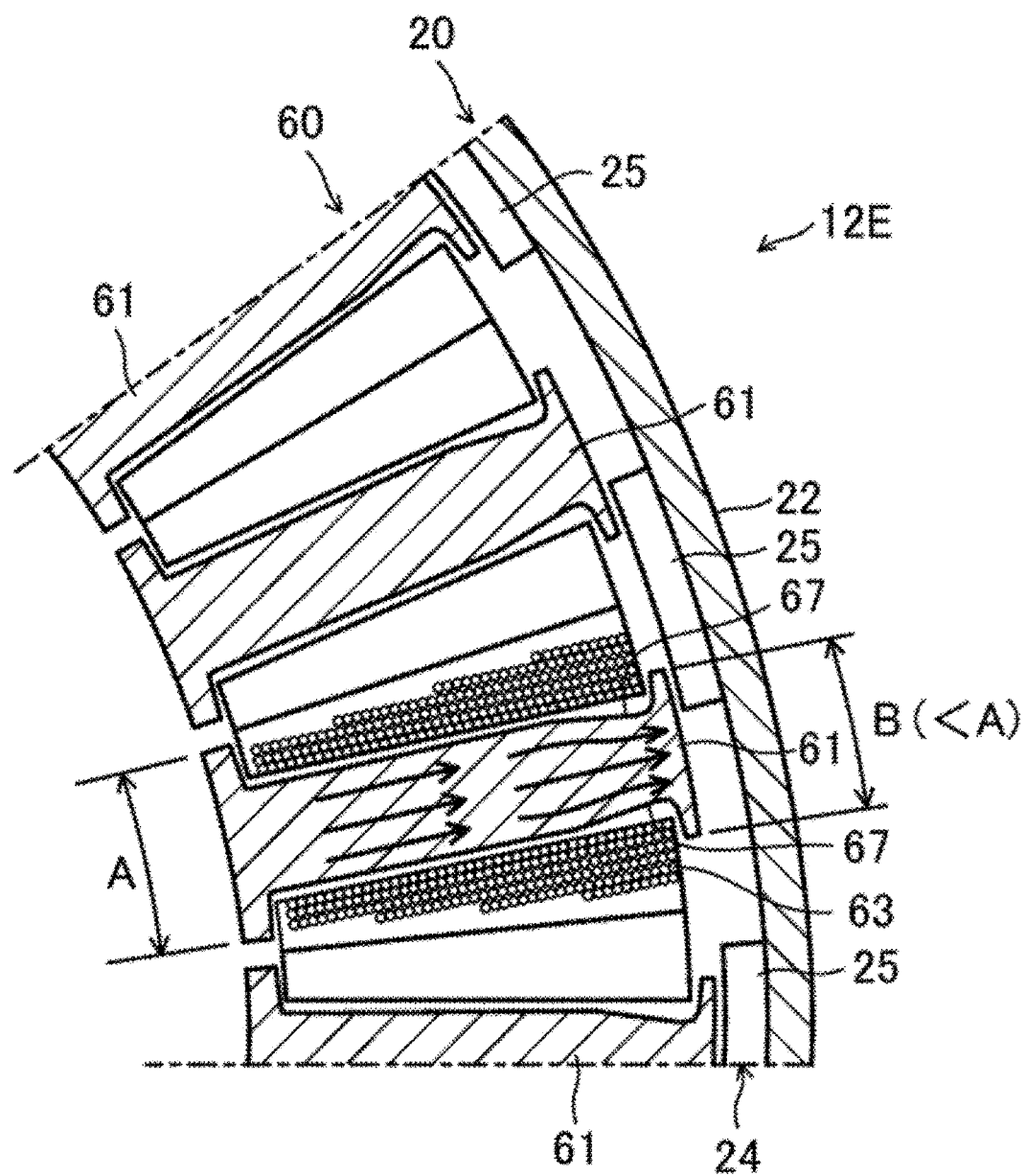
FIG. 39 illustrates a structure of a motor according to certain embodiments of this disclosure.

FIG. 39 illustrates a structure of a motor according to certain embodiments. In this non-limiting example, a fine width portion 67 is installed in the teeth 61 so that a width of the teeth 61 at the outer rotor 20-side having the shifting magnets 25 is smaller than a width of the teeth 61 at the inner rotor 30-side. The fine width portion 67 is formed so that the width of the teeth 61 gradually narrows toward the outer rotor 20-side.

According to certain embodiments, by installing the fine width portion 67 at the teeth 61 and decreasing the width of the teeth 61 at the outer rotor 20-side, magnetic flux density may be increased. That is, a magnetizing magnetic flux generated by the current flowed to the coils 63 may be intensively flowed toward the shifting magnet 25, and magnetic poles of the shifting magnet 25 may be stably performed with a small amount of current. The shape of the fine width portion 67 is not particularly limited, and for example, may be a step shape in which the width of the teeth 61 at the outer rotor 20-side is small.

In some embodiments, the number of times of winding of the coils 63 wound about the teeth 61 is larger at the outer rotor 20-side than at the inner rotor 30-side. Consequently, the magnetic flux at the shifting magnet 25-side may be more concentrated in comparison to the opposite side.

With respect to an angular width of a front end of the teeth 61, an angular width B at the outer rotor 20-side having the shifting magnet 25 is smaller than an angular width A at the inner rotor 30-side (B>A). Consequently, the magnetic flux at the shifting magnet 25-side may be more concentrated in comparison to the opposite side.

Even in embodiments when the angular width of the front end of the teeth 61 is the same at the outer rotor 20-side and the inner rotor 30-side, by making a cross-sectional area of the front end of the teeth 61 to be smaller at the outer rotor 20-side having the shifting magnet 25 in comparison to the inner rotor 30-side, the same function may be obtained.

Figure 40:
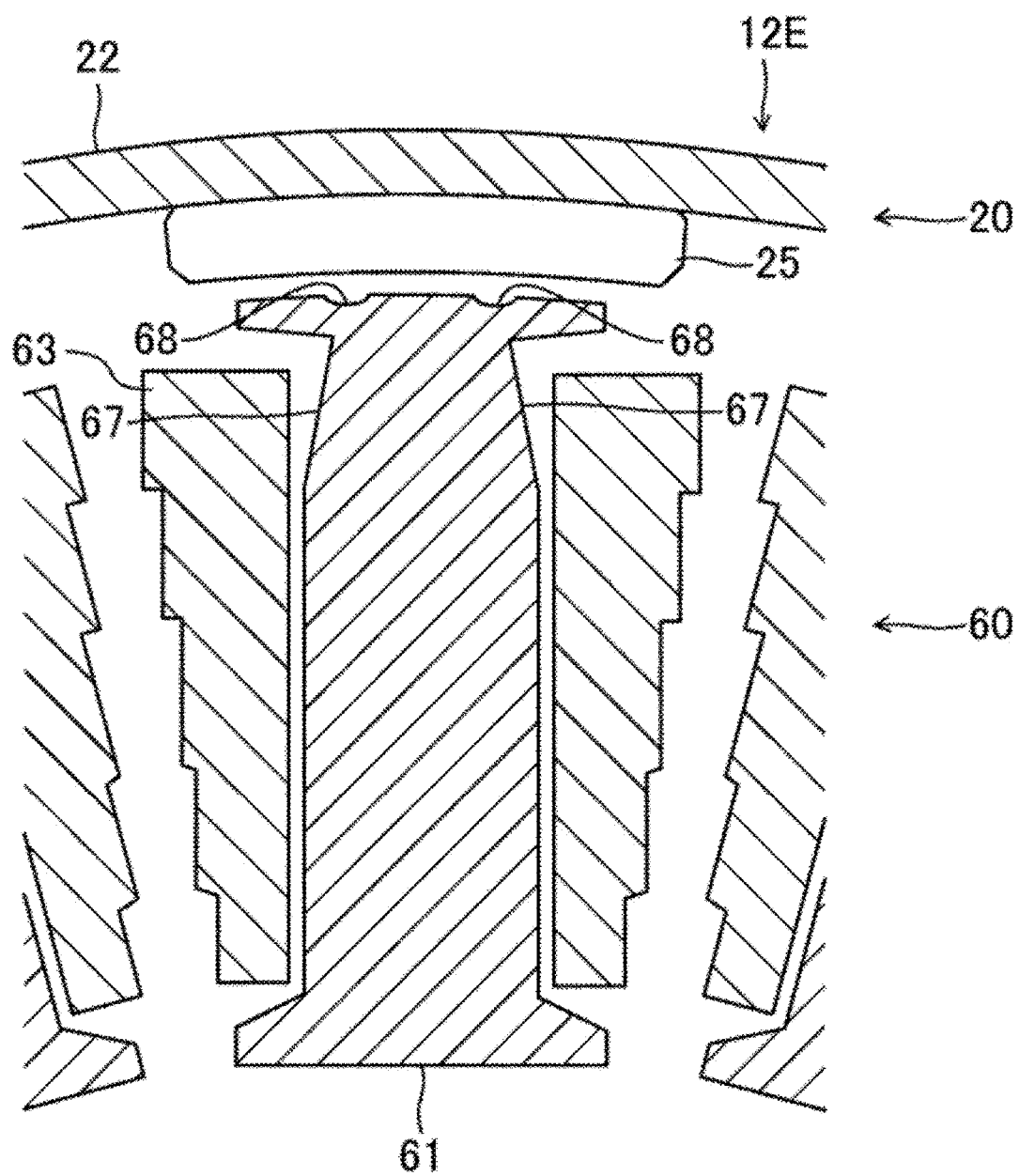
FIG. 40 illustrates a motor according to certain embodiments of the present disclosure in which a groove is formed in a front end of a tooth.

FIG. 40 illustrates certain embodiments in which a groove is formed in a front end of a tooth. As shown in the non-limiting example of FIG. 40, a groove 68 extending in an axial direction is formed in a surface of the front end of the tooth 61 opposing the outer rotor 20. Two grooves 68 are formed at a predetermined interval in the circumferential direction. In the front end of the tooth 61, by making an actual air gap area opposing the outer magnet 24 except for the groove 68 to be smaller than an air gap area at the inner rotor 30-side, the magnetic flux at the shifting magnet 25-side may be more concentrated in comparison to the opposite side.

In some embodiments disclosed herein, a configuration in which magnetic poles of the shifting magnet 25 are reversed by supplying a magnetizing current to the coils 63 using the coils 63 of the stator 60 as the number-of-magnetic-poles shifter has been described. However, for example, a magnetizing coil for supplying a magnetizing current to the shifting magnet 25 and reversing the magnetic poles may be installed separately from the coils 63 of the stator 60.

Although an inverter for a motor is, in some embodiments, used as the control device 15 configured to supply a magnetizing current to the coils 63, for example, a separate dedicated control device may also be used.

A method for rotating the outer rotor 20 and the inner rotor 30 may be arbitrarily selected from methods such as conducting a rectangular wave, operating a sinusoidal wave, and controlling a vector.

The number of poles of the stator 60, the outer rotor 20, and the inner rotor 30 may be properly selected according to specifications of the motor. For example, when the number of magnetic poles at the inner rotor 30 is 2N (N is a natural number equal to or greater than 2), the number of magnetic poles of the outer rotor 20 may be shifted to be 2N or N.

Although the configuration in which the inner rotor 30 at a high-speed rotation side is connected to the spin-dry tub 11 while the outer rotor 20 at a low-speed rotation side is connected to the pulsator 13 has been described above, the inner rotor 30 may be connected to the spin-dry tub 11 and the outer rotor 20 may be connected to a rotating shaft having other functions, thereby improving marketability by improving spin-drying performance, washing performance, or the like.

Although the shifting magnet 25 is installed in the outer rotor 20 to shift the number of magnetic poles of the outer rotor 20 above, the shifting magnet 25 may also be installed in the inner rotor 30 to shift the number of magnetic poles of the inner rotor 30.

The washing machine according to the present disclosure is not limited to a vertical type washing machine and may also be a drum type washing machine. When the washing machine is a drum type washing machine, for example, the spin-dry tub 11 corresponds to a basket, and the pulsator 13 corresponds to a stirring wing disposed in the basket.

As is apparent from the above description, according to certain embodiments of the present disclosure, a motor in which a structure is simple and two rotors are independently operated using a single inverter without being supplied with a complex current can be provided.

According to another aspect, a dual rotor motor capable of shifting a rotation direction of each of two rotors can be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of controlling a motor, the method comprising:

performing, at the motor including a stator, a first rotor and a second rotor disposed around the stator and independently rotatable, a plurality of shifting magnets disposed in at least one of the first rotor and the second rotor and whose magnetic poles are reversed by a magnetizing current, and a number-of-magnetic-poles shifter configured to receive the magnetizing current, reverse the magnetic poles of the plurality of shifting magnets, and shift the a number of magnetic poles of at least one of the first rotor and the second rotor, a magnetizing operation one time and reversing polarities of the plurality of shifting magnets when a mode of the motor is shifted from a synchronous mode in which the first rotor and the second rotor rotate in the same direction to a counter mode in which the first rotor and the second rotor rotate in opposite directions; and shifting the mode of the motor to the counter mode while the magnetizing operation is performed one or more times and relative positions of the first rotor and the second rotor are changed when the first rotor and the second rotor inertially rotate in the synchronous mode.

2. The method of claim 1, wherein the magnetizing operation performed one time includes repeating a partial magnetization process, in which the magnetizing current is supplied to a portion of the plurality of shifting magnets.

3. The method of claim 2, wherein the partial magnetization process begins from an end at any one side in a circumferential direction of the plurality of shifting magnets.

4. The method of claim 2, wherein:

the partial magnetization process includes a long magnetization process in which a length of time during which the magnetizing current is supplied is long and a short magnetization process in which a length of time during which the magnetizing current is supplied is short; and in the plurality of shifting magnets, the long magnetization process is performed at a position closer to a central portion in a circumferential direction of the plurality of shifting magnets in comparison to the short magnetization process.

5. The method of claim 4, wherein the long magnetization process is performed when a number of simultaneous rotations of a rotor corresponding to magnetization, which is subject to the magnetizing operation, of the first rotor and the second rotor exceeds a predetermined number of rotations.

6. The method of claim 5, wherein the short magnetization process is repeatedly performed when the number of simultaneous rotations of the rotor corresponding to magnetization, which is subject to the magnetizing operation, of the first rotor and the second rotor is equal to or less than the predetermined number of rotations.

7. The method of claim 2, wherein:

the partial magnetization process includes a strong magnetization process in which the magnetizing current is relatively large and a weak magnetization process in which the magnetizing current is relatively small; and in the plurality of shifting magnets, the weak magnetization process is performed at a position closer to an end in a circumferential direction of the plurality of shifting magnets in comparison to the strong magnetization process.

8. The method of claim 1, wherein, by an initial phase of a rotor corresponding to magnetization, which is subject to the magnetizing operation, of the first rotor and the second rotor being set as an initial value and a movement amount of the plurality of shifting magnets being calculated, the magnetizing operation is performed while a current-carrying phase of the magnetizing current is shifted in accordance with movement of the rotor corresponding to magnetization.

9. The method of claim 1, wherein:

a rotor corresponding to magnetization, which is subject to the magnetizing operation, of the first rotor and the second rotor includes a plurality of fixing magnets whose magnetic poles are not reversed when the magnetizing current is supplied; and the plurality of shifting magnets and the plurality of fixing magnets are differentiated by reduction in magnetic force of the plurality of shifting magnets being detected when the plurality of shifting magnets are magnetized so that a magnetic force thereof is temporarily reduced.

* * * * *